(12) United States Patent
Tabaaloute et al.

(10) Patent No.: US 10,691,636 B2
(45) Date of Patent: Jun. 23, 2020

(54) METHOD, SYSTEM AND COMPUTER PROGRAM PRODUCT FOR REPLICATING FILE SYSTEM OBJECTS FROM A SOURCE FILE SYSTEM TO A TARGET FILE SYSTEM AND FOR DE-CLONING SNAPSHOT-FILES IN A FILE SYSTEM

(71) Applicant: Hitachi Vantara LLC, Santa Clara, CA (US)

(72) Inventors: Zahra Tabaaloute, Southampton (GB); Daniel Picken, Bracknell (GB)

(73) Assignee: HITACHI VANTARA LLC, Santa Clara, CA (US)

( * ) Notice: Subject to any disclaimer, the term of this patent is extended or adjusted under 35 U.S.C. 154(b) by 1009 days.

(21) Appl. No.: 15/112,466

(22) PCT Filed: Jan. 24, 2014

(86) PCT No.: PCT/EP2014/051428
§ 371 (c)(1),
(2) Date: Jul. 19, 2016

(87) PCT Pub. No.: WO2015/110171
PCT Pub. Date: Jul. 30, 2015

(65) Prior Publication Data
US 2016/0335278 A1 Nov. 17, 2016

(51) Int. Cl.
*G06F 16/00* (2019.01)
*G06F 16/11* (2019.01)
*G06F 16/182* (2019.01)

(52) U.S. Cl.
CPC .......... *G06F 16/128* (2019.01); *G06F 16/184* (2019.01)

(58) Field of Classification Search
CPC .............................. G06F 16/128; G06F 16/184
See application file for complete search history.

(56) References Cited

U.S. PATENT DOCUMENTS

| | | |
|---|---|---|
| 2005/0246503 A1 | 11/2005 | Fair |
| 2007/0185938 A1* | 8/2007 | Prahlad .............. G06F 16/2365 |
| 2009/0182785 A1 | 7/2009 | Aston et al. |
| 2012/0130949 A1* | 5/2012 | Picken ................. G06F 16/178 707/626 |
| 2013/0159257 A1 | 6/2013 | Rao et al. |

OTHER PUBLICATIONS

International Search Report of PCT/EP2014/051428 dated Jul. 22, 2014.

* cited by examiner

*Primary Examiner* — Dinku W Gebresenbet
(74) *Attorney, Agent, or Firm* — Mattingly & Malur, PC

(57) ABSTRACT

At the target side, a first instruction to replicate a first target snapshot-file of a target snapshot-file tree of the target file system is received, the first target snapshot-file of the target file system being associated with a first source snapshot-file of the source file system which has been modified in the source file system. One or more data blocks which are owned by a second target snapshot-file and which are shared between the first target snapshot-file and the second target snapshot-file are identified, the second target snapshot-file being an ancestor of the first target snapshot-file in the target snapshot-file tree. Then, at the target side, ownership of the one or more identified data blocks is transferred from the second target snapshot-file to the first target snapshot-file.

15 Claims, 25 Drawing Sheets

METHOD, SYSTEM AND COMPUTER PROGRAM PRODUCT FOR REPLICATING FILE SYSTEM OBJECTS FROM A SOURCE FILE SYSTEM TO A TARGET FILE SYSTEM AND FOR DE-CLONING SNAPSHOT-FILES IN A FILE SYSTEM

Some embodiments relate to replication of one or more file system objects from a source file system of a source side to a target file system of a target side in a data storage system. Some embodiments relate to de-cloning of snapshot-files in a file system, e.g. de-cloning of snapshot-files in the source file system and/or de-cloning of snapshot-files in the target file system. Some embodiments relate to removing and/or changing parent snapshot-files of snapshot-files in a file system, e.g. removing and/or changing parent snapshot-files of snapshot-files in the source file system and/or removing and/or changing parent snapshot-files of snapshot-files in the target file system.

BACKGROUND

Recently, an approach for cloning (and de-cloning of files in a file system) was described in US 2012/0130949 A1 which relates to a file cloning mechanism that allows for quickly creating copies (clones) of files within a file system, such as when a user makes a copy of a file. A clone of a source object can be at least initially represented by a structure containing references to various elements of the source object (e.g., indirect nodes, direct nodes, and data blocks). Both read-only and mutable clones can be created. The source file and the clone initially share such elements and continue to share unmodified elements as changes are made to the source file or mutable clone. None of the user data blocks or the metadata blocks describing the data stream (i.e., the indirect/direct nodes) associated with the source file need to be copied at the time the clone is created. Also, at appropriate times, cloned files may be "de-cloned." The contents of US 2012/0130949 A1 are herewith incorporated by reference and the mechanism will be summarized in more detail below.

In a data storage system, some or all objects of a file system (e.g. a source file system) may be replicated to another file system (exemplarily referred to herein as the "target file system"), for example, to allow for archiving, backup, maintenance, or disaster recovery. Unlike data mirroring, where data is stored in two separate locations, replication of data may generally involve the creation of a copy of a source object in the target file system, wherein the target object may be stored in a manner that is quite different from the manner in which the source object is stored.

For example, the source object may be stored in non-contiguous blocks while the target object may be stored in contiguous blocks because all blocks for the target object may be allocated at one time whereas the blocks for the source object may have been allocated over an extended period of time and hence may have been allocated from different areas of storage.

Generally speaking, file system replication can be performed at the file level or at the object (sub-file) level. Examples of file-level and object-level replication are discussed generally in Hitachi NAS Platform Software: BlueArc® JetMirror datasheet available from Hitachi Data Systems.

Clone files may often be handled like any other regular files during an object-based replication and therefore may be replicated as a deep copy on the target file system. Such deep copying of the clone files results in creating clone files that do not share any data blocks with their snapshot-files, thus increasing their storage cost on the target file system.

SUMMARY

Some embodiments may relate to replication of file system objects including clones and cloned objects such as files, clone files and snapshot-files, which are file system objects that may be hidden and read-only objects and be associated with clones and files clones.

Some embodiments may relate to de-cloning of snapshot-files in a file system or, more generally, with removing and/or changing one or more parent/ancestor snapshot-files of a snapshot-file object in a file system.

Some embodiments may relate to replication of file system objects including de-cloned objects such as de-cloned files and/or clone files and de-cloned snapshot-files or generally with replication of snapshot-files which have one or more parent snapshot-files thereof removed and/or changed in a source file system.

According to preferred embodiments and exemplary aspects of the present invention, there are proposed computer-program products, methods and data storage systems for replication of one or more file system objects from a source file system of a source side to a target file system of a target side in a data storage system, for de-cloning of snapshot-files in a file system and/or for removing and/or changing parent snapshot-files of snapshot-files in a file system.

According to a first aspect, there may be provided a computer program product comprising computer-readable program instructions which, when running on or loaded into a computer or when being executed by one or more processors of the computer, cause the computer to execute a method for replicating one or more file system objects from a source file system of a source side to a target file system of a target side in a data storage system.

According to a second aspect, there may be provided a method for replicating one or more file system objects from a source file system of a source side to a target file system of a target side in a data storage system.

According to a third aspect, there may be provided a data storage system configured to manage a source file system at a source side and a target file system at a target side, the data storage system being configured to execute replication of one or more file system objects from the source file system to the target file system, the data storage system comprising a first file server configured to manage the source file system and/or a second file server configured to manage the target file system.

According to some embodiments, in the first, second and/or third aspects, replication of one or more file system objects from the source file system to the target file system may comprise, at the target side, execution of: receiving, at the target side, a first instruction to replicate a first target snapshot-file of a target snapshot-file tree of the target file system, the first target snapshot-file of the target file system being associated with a first source snapshot-file of the source file system which has been modified in the source file system; identifying, at the target side, one or more data blocks which are owned by a second target snapshot-file and which are shared between the first target snapshot-file and the second target snapshot-file, the second target snapshot-file being an ancestor of the first target snapshot-file in the target snapshot-file tree; and/or transferring ownership, at the target side, of the one or more identified data blocks from the second target snapshot-file to the first target snapshot-file.

According to some embodiments, in the first, second and/or third aspects, replication of one or more file system objects from the source file system to the target file system may comprise, at the source side, execution of: performing, at the source side, a first source file system scan for identifying one or more source file system objects having changed in the source file system; identifying, at the source side and among the identified one or more changed source file system objects, one or more source snapshot-files which have been modified in the source file system; creating, at the source side and for each of the identified one or more source snapshot-files, a respective first instruction to replicate a respective associated target snapshot-file in the target file system; transmitting the one or more created first instructions to the target side; performing, at the source side, a second source file system scan for identifying, at the source side and among the identified one or more changed source file system objects, one or more changed second source file system objects other than the source snapshot-files which have been modified in the source file system; creating, at the source side and for each of the identified one or more changed second source file system objects, a second instruction to replicate a respective associated target file system object in the target file system; and transmitting the one or more created second instructions to the target side after transmitting the one or more created first instructions to the target side.

According to a fourth aspect, there may be provided a computer program product comprising computer-readable program instructions which, when running on or loaded into a computer or when being executed by one or more processors of the computer, cause the computer to execute a method for removing a snapshot-file and/or changing parent snapshot-files of snapshot-files in a file system, in particular for de-cloning of snapshot-files in a file system.

According to a fifth aspect, there may be provided a method for removing a snapshot-file and/or changing parent snapshot-files of snapshot-files in a file system, in particular for de-cloning of snapshot-files in a file system.

According to a sixth aspect, there may be provided a data storage system configured to manage a file system, the data storage system being configured to execute removing a snapshot-file and/or changing parent snapshot-files of snapshot-files in the file system, in particular for de-cloning of snapshot-files in the file system.

According to some embodiments, in the fourth, fifth and/or sixth aspects, removing a snapshot-file and/or changing parent snapshot-files of snapshot-files in the file system, in particular for de-cloning of snapshot-files in the file system, may comprise: identifying one or more data blocks which are owned by a second snapshot-file and which are shared between a first snapshot-file and the second snapshot-file, the second snapshot-file being an ancestor of the first snapshot-file in a snapshot-file tree in the file system; and transferring ownership of the one or more identified data blocks from the second snapshot-file to the first snapshot-file.

The above-described embodiments and aspects can be combined or provided as independent aspects. In particular, the present specification discloses various independent aspects and embodiments in connection with removing a snapshot-file and/or changing parent snapshot-files of snapshot-files in the file system, in particular for de-cloning of snapshot-files in the file system, independent of whether replication is involved or not. Furthermore, the present specification discloses various independent aspects and embodiments in connection with performing a transfer of ownership in the file system independent of whether replication is involved or not, and independent of whether the ownership is transferred from a snapshot-file to another snapshot-file or to a live file/clone.

DETAILED DESCRIPTION OF EMBODIMENTS AND THE ACCOMPANYING DRAWINGS

Figure 1:
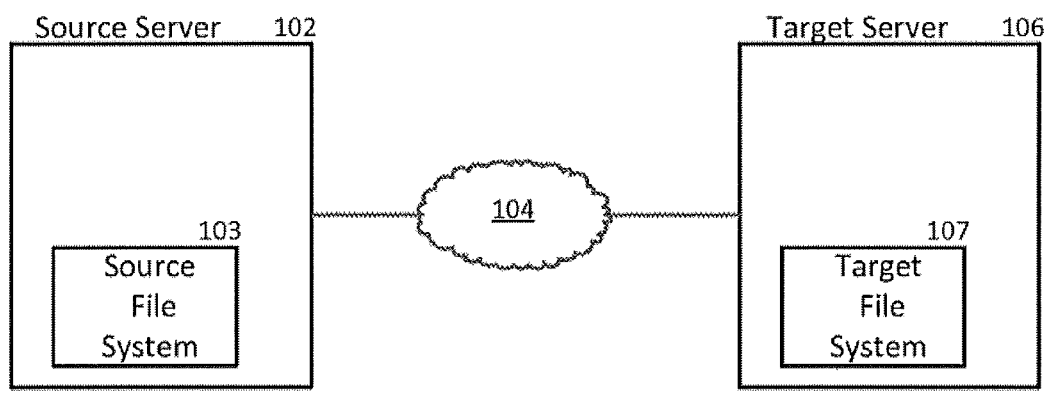
FIG. 1 is an exemplary schematic block diagram of a file storage system in accordance with exemplary embodiments.

In the following, preferred aspects and embodiments of the present invention will be described in more detail with reference to the accompanying figures. Same or similar features in different drawings and embodiments are referred to by similar reference numerals. It is to be understood that the detailed description below relating to various preferred aspects and preferred embodiments are not to be meant as limiting the scope of the present invention.

1. TERMINOLOGY

As used in this description and the accompanying claims, the following terms shall have the meanings indicated, unless the context otherwise requires:

A "storage device" is a device or system that is used to store data. A storage device may include one or more magnetic or magneto-optical or optical disk drives, solid state storage devices, or magnetic tapes. For convenience, a storage device is sometimes referred to as a "disk" or a "hard disk." A data storage system may include the same or different types of storage devices having the same or different storage capacities.

A "RAID controller" is a device or system that combines the storage capacity of several storage devices into a virtual piece of storage space that may be referred to alternatively as a "system drive" ("SD"), a "logical unit" ("LU" or "LUN"), or a "volume." Typically, an SD is larger than a single storage device, drawing space from several storage devices, and includes redundant information so that it can withstand the failure of a certain number of disks without data loss. In exemplary embodiments, each SD is associated with a unique identifier that is referred to hereinafter as a "logical unit identifier" or "LUID," and each SD will be no larger than a predetermined maximum size, e.g., 2 TB-64 TB or more.

When commands are sent to an SD, the RAID controller typically forwards the commands to all storage devices of the SD at the same time. The RAID controller helps to overcome three of the main limitations of typical storage devices, namely that the storage devices are typically the slowest components of the storage system, they are typically the most likely to suffer catastrophic failure, and they typically have relatively small storage capacity.

A "RAID system" is a device or system that includes one or more RAID controllers and a number of storage devices. Typically, a RAID system will contain two RAID controllers (so that one can keep working if the other fails, and also to share the load while both are healthy) and a few dozen storage devices. In exemplary embodiments, the RAID system is typically configured with between two and thirty-two SDs. When a file server needs to store or retrieve data, it sends commands to the RAID controllers of the RAID system, which in turn are responsible for routing commands onwards to individual storage devices and storing or retrieving the data as necessary.

With some RAID systems, mirror relationships can be established between SDs such that data written to one SD (referred to as the "primary SD") is automatically written by the RAID system to another SD (referred to herein as the "secondary SD" or "mirror SD") for redundancy purposes. The secondary SD may be managed by the same RAID system as the primary SD or by a different local or remote RAID system. Mirroring SDs effectively provides RAID 1+0 functionality across SDs in order to provide recovery from the loss or corruption of an SD or possibly even multiple SDs in some situations.

A "file system" is a structure of files and directories (folders) stored in a file storage system. Within a file storage system, file systems are typically managed using a number of virtual storage constructs, and in exemplary embodiments, file systems are managed using a hierarchy of virtual storage constructs referred to as ranges, stripesets, and spans.

A "range" is composed of either a primary SD on its own or a primary/secondary SD pair that are supposed to contain identical data and therefore offer the same storage capacity as a single SD.

A "stripeset" is composed of one or more ranges.

A "span" is composed of one or more stripesets. Thus, a span is ultimately composed of one or more SDs (typically four to fifty SDs). A span can be divided into one or more file systems, with each file system having a separate name and identifier and potentially different characteristics (e.g., one file system may be formatted with 32 KB blocks and another with 4 KB blocks, one file system may be Worm and another not, etc.). Each file system on the span is formatted, mounted, and unmounted separately. File systems may be created and deleted in any order and at any time. File systems typically can be configured to expand automatically (or alternatively to prevent or restrict auto-expansion) or can be expanded manually.

A "block" or "data block" is a unit of storage in the file system that corresponds to portion of physical storage in which user data and/or system data is stored. A file system object (discussed below) generally includes one or more blocks.

A "snapshot-file" or "SF" is a file system object that is created as part of an object cloning process e.g. as described in U.S. Patent Application Publication No. US 2012/0130949 which is hereby incorporated herein by reference in its entirety, and as used in some embodiments of the present invention. A snapshot-file is a data stream snapshot object generated during the cloning process which takes ownership of the shared user/metadata blocks and is referenced by the clones sharing these user/metadata blocks. In embodiments, snapshot-files are hidden file system objects and/or snapshot-files are read-only file system objects.

A "successor" or "child" of a snapshot-file is either a regular file clone (also referred to as a live-file) or another snapshot-file referencing the snapshot-file. If a snapshot-file is the "child" of another snapshot-file, it may be referred to as "child snapshot-file". A child snapshot-file of a child snapshot-file of a certain snapshot-file may be referred to as "indirect successor" of the certain snapshot-file A "parent" or "parent snapshot-file" of a clone or of another snapshot-file is the snapshot-file referenced to by the clone or the other snapshot-file. Accordingly, if a first snapshot-file in a snapshot-file tree references a second snapshot-file, the first snapshot-file represents the "child snapshot-file" and the second snapshot-file represents the "parent snapshot-file". Typically, in embodiments, a "parent snapshot-file" may have no, one or two "child snapshot-files". But other embodiments in which three or more "child snapshot-files" can be supported are feasible.

A "root snapshot-file" is a snapshot-file without a parent. Accordingly, while the "root snapshot-file" may be typically referenced by no, one or two other snapshot-files, the "root snapshot-file" itself does not reference any other snapshot-files.

Since a "child snapshot-file" of a certain "parent snapshot-file" may itself have other respective "child snapshot-file(s)" and/or the "parent snapshot-file" may itself have another respective "parent snapshot-file", multiple snapshot-files may be structured according to a snapshot-file tree having at least two snapshot-files including the single "root snapshot-file" having at least one "child snapshot-file", which may be referenced by another snapshot-file, live-file and/or clone.

An "ancestor snapshot-file" of a certain snapshot-file is an "older" snapshot-file that is directly referenced or indirectly referenced though one or more other snapshot-files by the certain snapshot-file. Accordingly, while the parent of a certain snapshot-file represents an "ancestor snapshot-file" or "ancestor" of the certain snapshot-file, so does the parent of the parent etc, so that the "root snapshot-file" is an ancestor for all other snapshot-files of the snapshot-file tree.

A "new snapshot" is the snapshot taken on the source that is being replicated to the target.

A "previous snapshot" is the latest snapshot that has been replicated to the target file system.

A "new object" or "created object" is an object with a creation checkpoint number greater than the checkpoint number of the previous snapshot.

An "old object" or "unmodified object" is an object with a creation checkpoint number less than or equal to the checkpoint number of the previous snapshot.

A "modified object" is an object having a last modified checkpoint number (representing the last checkpoint in which the object was created or modified) higher than the checkpoint number of the previous snapshot.

A "deleted object" is an object that existed in the previous snapshot and was deleted in the new snapshot.

In the context of this specification, the term "clone" will refer to an object of type regular file or snapshot-file that references a parent snapshot-file.

With respect to a given replication cycle, a "cloned object" is an object that existed as a clone object in the previous replication cycle (and may have been modified, deleted, de-cloned, or gained a new parent snapshot-file object since the previous replication cycle) or has become a clone object since the previous replication cycle (e.g., a newly created clone object or a previously replicated object that has gained the properties of a clone).

A "set" of values may include one or more values.

Headings are used below for convenience and are not to be construed as limiting the present invention in any way.

2. EXEMPLARY FILE STORAGE SYSTEM

Exemplary embodiments of the present invention are described with reference to an exemplary file system of the type used in various file servers e.g. as sold by Hitachi Data Systems and known generally as BlueArc Titan™ and Mercury™ file servers, although it should be noted that various concepts may be applied to other types of file systems.

FIG. 1 is an exemplary schematic block diagram of a file storage system in accordance with an exemplary embodiment of the present invention. Among possible other components, the file storage system includes a source file server 102 (often referred to herein simply as "the source" or "source side") in communication with a target file server 106 (often referred to herein simply as "the target" or "target side") over a communication network 104. The source server 102 manages a source file system 103, while the target server 106 manages a target file system 107.

Each server is typically in communication with various client devices over a communication network such as an Internet Protocol network (e.g., the Internet) and also in communication with various RAID systems over a storage network such as a FibreChannel network. The client devices and the file servers communicate using one or more network file protocols, such as CIFS and/or NFS. The file servers and the RAID systems communicate using a storage protocol, such as SCSI.

Each file server can include one or more storage processors configured to manage its respective file system(s). The file servers can be configured to allow client access to portions of the file systems, such as trees or sub-trees of files and/or folder (directories) under designated names. In CIFS parlance, such access may be referred to as a "share" while in NFS parlance, such access may be referred to as an "export."

Internally, each file server may include various hardware-implemented and/or hardware-accelerated subsystems, for example, as described in U.S. Pat. Nos. 6,826,615 and 8,180,897, each of which is hereby incorporated herein by reference in its entirety, and/or may include a hardware-based file system including a plurality of linked sub-modules, for example, as described in U.S. Pat. Nos. 7,457,822 and 8,224,877, each of which is hereby incorporated herein by reference in its entirety.

Each RAID system typically includes at least one RAID controller (and usually two RAID controllers for redundancy) as well as a number of physical storage devices (e.g., disks, disk drives and/or solid state drives etc.) that are managed by the RAID controller(s). The RAID system aggregates its storage resources into a number of SDs. For example, each RAID system may be configured with between 2 and 32 SDs. Each SD may be limited to a predetermined maximum size (e.g., 2 TB-64 TB or more).

Combining several storage devices into an SD can provide a number of benefits, including increased speed (individual storage devices are relatively slow, but data can be striped across several storage devices to widen the bottleneck), increased capacity (individual storage devices are comparatively small, but several storage devices can be combined to provide more usable space), abstraction (the amount of space used can be either larger or smaller than the size of a single storage device), and resilience (parity or redundancy information can be stored on each storage device so that the SD can withstand the loss of a storage device).

Each file server can be configured to use one or more SDs from its respective RAID system(s). A file server can normally interrogate its RAID systems to find out whether each SD is primary or secondary. The method of controlling which SDs are used by the file server may be referred to as "licensing." Thus, in practice, the file server 102 will typically be licensed for some SDs and unlicensed for others.

Internally, each file server can be capable of combining several SDs into a larger storage pool referred to herein as a "span." A span is essentially a RAID 0 array of several SDs. Combining several SDs into a span can provide a number of benefits similar to those obtained by combining multiple physical disks into an SD, including increased speed (spreading I/O between multiple SDs on multiple RAID systems can widen the storage bottleneck further), increased storage capacity (the span can be larger than a single SD, which may be limited to two terabytes), and additional abstraction, which allows for more flexible storage space allocation.

Each file server can store various types of objects in the file system. The objects may be classified generally as system objects and file objects. File objects are created for storage of user data and associated attributes, such as a word processor or spreadsheet files. System objects are created by the file storage system for managing information and include such things as root directory objects, free-space allocation objects, modified checkpoint objects list objects, modified retained objects list objects, and software metadata objects, to name but a few.

More particularly, directory objects are created for storage of directory information. Free-space allocation objects are created for storage of free-space allocation information. Modified checkpoint objects list objects and modified retained objects list objects (both of which are described in more detail below) are created for storage of information relating to checkpoints and retained checkpoints, respectively.

A software metadata object (which is described in more detail below) is a special object for holding excess file attributes associated with a file or directory object (i.e., file attributes that cannot fit within pre-designated areas within the file or directory object as described below, such as CIFS security attributes), and is created by the creator of the file or directory object, which includes a reference to the software metadata object within the file or directory object.

In certain embodiments, an instantiation of the file system is managed using a tree structure having a root node (which may also be referred to as a dynamic superblock, DSB or root onode). Each file server may maintain multiple DSBs to store different versions of the file system representing different checkpoints (e.g., a current "working" version and one or more "checkpoint" versions). In one exemplary embodiment, the DSB includes a pointer to an indirection object, which in turn includes pointers to other objects.

Each object referenced by the indirection object is associated with an object number. System objects typically have fixed, predefined object numbers, since they generally always exist in the system. File objects are typically assigned object numbers dynamically from a pool of available object numbers, and these file object numbers may be reused in some circumstances (e.g., when a file is deleted, its object number may be freed for reuse by a subsequent file object). The indirection object can be indexed by object number in order to obtain a pointer to the corresponding object.

Figure 2:
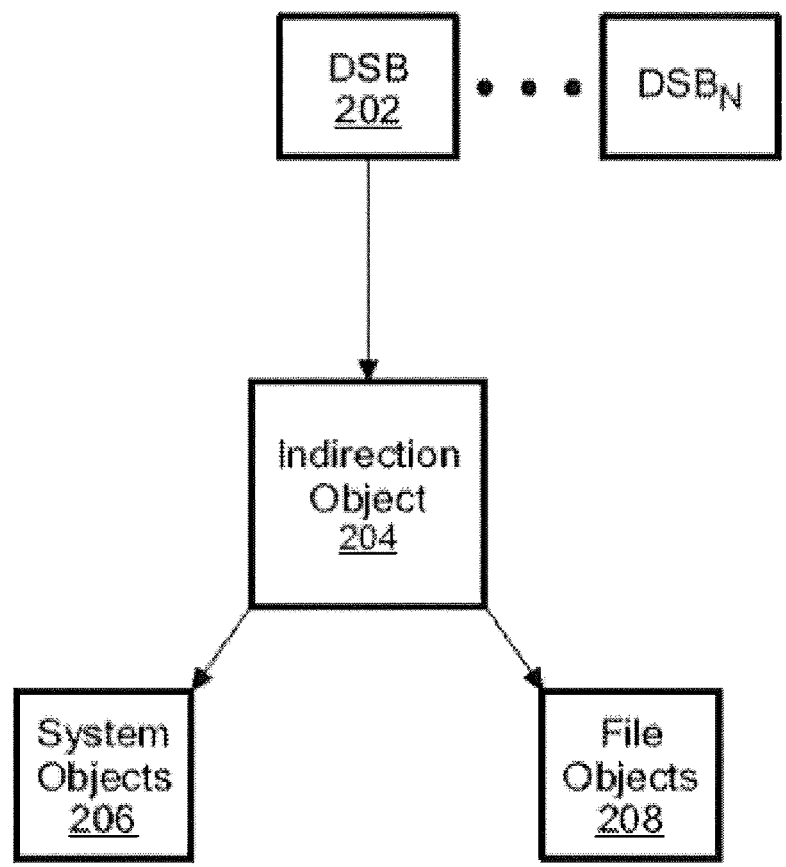
FIG. 2 is an exemplary schematic block diagram showing the general format of a file system instantiation in accordance with exemplary embodiments.

FIG. 2 is an exemplary schematic block diagram showing the general format of a file system instantiation in accordance with an exemplary embodiment of the present invention. The DSB 202 is a special structure that represents the root of the file system tree structure (file system root node, not to be confused with the object root nodes describe below, because each file system may typically have multiple object root nodes, one for each file system object such as files, snapshot-files, folders etc., while each file system typically has only one single file system root node).

Among other things, the DSB 202 includes a pointer to an indirection object 204, which in turn includes pointers to other objects in the file system including system objects 206 and file objects 208.

Generally speaking, each object in the file system, including the indirection object 204, each of the system objects 206, and each of the file objects 208, is implemented using a separate tree structure that includes a separate object root node (sometimes referred to as a root onode) and optionally includes a number of indirect nodes (sometimes referred to as an indirect onode), direct nodes (sometimes referred to as a direct onode), and storage blocks. The DSB 202 includes a pointer to the root node of the indirection object 204. The indirection object includes pointers to the root nodes of the other objects 206, 208.

Figure 3:
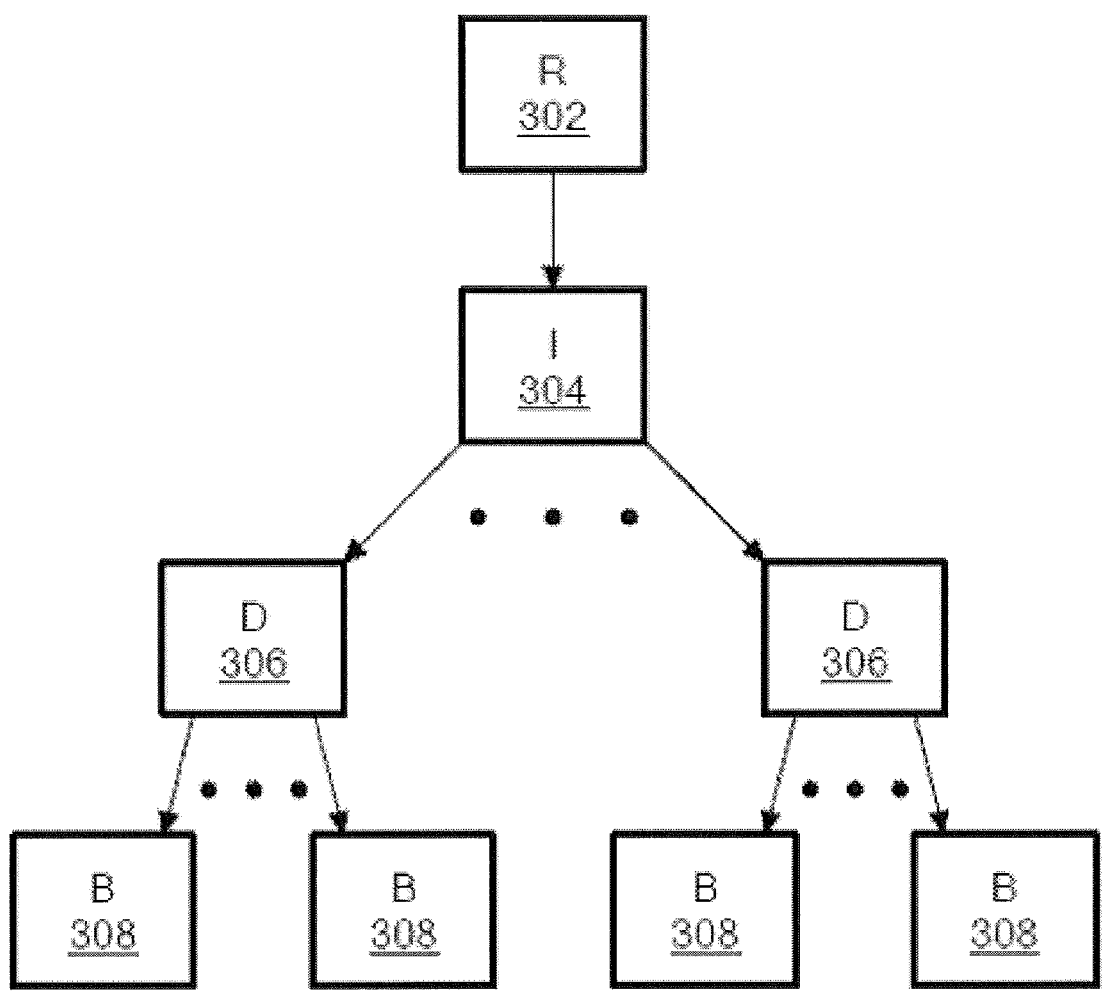
FIG. 3 is an exemplary schematic block diagram showing the general format of an object tree structure in accordance with exemplary embodiments of the present invention.

FIG. 3 is an exemplary schematic block diagram showing the general format of an object tree structure in accordance with an exemplary embodiment of the present invention. A root ("R") node 302 may point to various indirect ("I") nodes 304, each of which may point to a number of direct ("D") nodes 306, each of which may point to a number of storage blocks ("B") 308. In practice, object tree structures can vary widely, for example, depending on the size of the object.

Also, the tree structure of a particular object can vary over time as information is added to and deleted from the object. For example, nodes may be dynamically added to the tree structure as more storage space is used for the object, and different levels of indirection may be used as needed (e.g., an indirect node can point to direct nodes or to other indirect nodes).

When an object is created, an object root node is created for the object. Initially, the root node of such an "empty" object has no pointers to any indirect nodes, direct nodes, or data blocks. As data is added to the object, it is first of all put into data blocks pointed to directly from the root node. Once all the direct block pointers in the root node are filled, then a direct node is created with a pointer from the root node to the direct node. If the data in the object grows to fill all the data pointers in the direct node, then an indirect node is created.

Thus, over time, a root node may point to various indirect nodes, each of which may point to a number of direct nodes, each of which may point to a number of storage blocks. In practice, object tree structures can vary widely, for example, depending on the size of the object. Also, the tree structure of a particular object can vary over time as information is added to and deleted from the object. For example, nodes may be dynamically added to the tree structure as more storage space is used for the object, and different levels of indirection may be used as needed (e.g., an indirect node can point to direct nodes or to other indirect nodes).

The object root node includes a checkpoint number (sometimes referred to as second-type checkpoint number) to identify the checkpoint in which the object was last modified (the checkpoint number initially identifies the checkpoint in which the object was created and thereafter the checkpoint number changes each time the object is modified in a new checkpoint). Basically, the checkpoint number represents an indicator as to a past time at which, or past time period during which, an object has last been changed (created or modified).

Unless stated otherwise, the general term "checkpoint number" as used throughout this description means "second-type checkpoint number" and shall not be confused with a first-type checkpoint number as described later in connection with cloning and de-cloning of file system objects.

In exemplary embodiments, the checkpoint number at which the object was created can also be stored in the object root node. Such checkpoint number shall be referred to as "first-type checkpoint number" (or in other embodiments e.g. as "cloned-in checkpoint number" if assigned to objects in connection with cloning or de-cloning). Basically, a "first-type checkpoint number" is a type of checkpoint number representing an indicator as to a past time at which, or past time period during which, an object has been created.

Consequently, while the first-type checkpoint number and the second-type checkpoint number of an object may be the same number (such as for objects that have been created but have not been modified since their creation), the first-type checkpoint number and the second-type checkpoint number may become different as soon as an existing object is modified because the time of creation and the time of last modification become different.

The object root node also may include an area of storage referred to e.g. as the "enode" in which various types of object metadata are stored.

For the actual data to which the object root node corresponds, the object root node may include a separate pointer to each block of data associated with the corresponding object.

In general, pointers to up to 16 data blocks are stored in the object root node. For data going beyond 16 blocks, one or more direct nodes and/or indirect nodes are needed in the object tree, with appropriate pointers stored as needed in each node to link the various nodes. Such pointers may store the sector number of the on-disk block associated with the corresponding data block or node.

The direct node includes a checkpoint number and is arranged to store the locations of a certain number of blocks (e.g., about 60 or 61 blocks) pertinent to the object.

When a first direct node is fully utilized to identify data blocks, then one or more indirect nodes are used to identify the first direct node as well as additional direct nodes that have blocks of data corresponding to the object. In such a case, the object root node has a pointer to the indirect node, and the indirect node has pointers to corresponding direct nodes. When an indirect node is fully utilized, then additional intervening indirect nodes are employed as necessary. This structure permits fast identification of a part of a file, regardless of the file's fragmentation.

As discussed above, the indirect node provides a level of indirection between the root node and the direct node. One or more items of the following information may be stored in the indirect node in exemplary embodiments:

The checkpoint number (first-type checkpoint number and/or second-type checkpoint number).

Pointers to either indirect or direct nodes (e.g., up to 60 such pointers). In addition, it may indicate the checkpoint number(s) associated with the pointer(s) to the node(s) (first-type checkpoint number and/or second-type checkpoint number).

A CRC and various sanity dwords to allow the indirect node to be checked for validity.

As discussed above, the direct node provides direct pointers to data blocks on the disk. One or more items of the following information may be stored in the direct node in exemplary embodiments:

The checkpoint number (first-type checkpoint number and/or second-type checkpoint number).

A number of data block descriptors (e.g., up to 60 such descriptors). Each data block descriptor includes a pointer to a data block, the checkpoint number associated with the pointer to the block (first-type checkpoint number and/or second-type checkpoint number), and/or a bit to say whether the block is zero filled.

A CRC and various sanity dwords to allow the indirect node to be checked for validity.

Within each node (i.e., root, indirect, direct), each pointer to a block or other node is associated with a checkpoint number (at least second-type checkpoint number) to indicate the checkpoint associated with the block/node referenced by the pointer.

A checkpoint mechanism, for example, as described in U.S. Pat. No. 7,457,822, which was incorporated by reference above, and in U.S. Pat. No. 8,041,735, which is hereby incorporated herein by reference in its entirety, is included to make temporary copies and optional retained copies of the file system at various times.

Specifically, the processing of file system requests may be delineated by a series of checkpoints that are scheduled to occur no less frequently than some user specified interval, such as every 10 seconds. With respect to each successive checkpoint, there is stored, on disk, current file structure information that supersedes previously stored file structure information from the immediately preceding checkpoint. Checkpoints are numbered sequentially and are used to temporally group processing of file requests.

Each file system object is associated with the checkpoint in which it is created, and the creation checkpoint number is stored in the object root node.

For a variety of purposes, it may be useful to have knowledge of the file system structure at a selected point in time. This capability is provided by permitting storage of file system structure data associated with the currently saved checkpoint, which is referred to hereinafter for convenience as a retained checkpoint or snapshot.

The retained checkpoint may essentially be a read-only version of the file system structure at a particular checkpoint. Multiple retained checkpoints can be taken, and mechanisms are included for deleting a selected retained checkpoint or reverting the file system to a selected retained checkpoint (for example, to return the file system to a known state following a disaster).

3. CLONING AND DE-CLONING 3.1 Cloning of Files

In exemplary embodiments of the present invention, a file cloning mechanism, for example, as described in U.S. Patent Application Publication No. US 2012/0130949, which is hereby incorporated herein by reference in its entirety, can be included to allow for quickly creating copies (clones) of files within a file system, such as when a user makes a copy of a file. In exemplary embodiments, a clone of a source object is at least initially represented by a structure containing references to various elements of the source object (e.g., indirect onodes, direct onodes, and data blocks).

Both read-only and mutable clones can be created. The source data stream and the clone initially share such elements and continue to share unmodified elements as changes are made to the source data stream or mutable clone. None of the user data blocks or the metadata blocks describing the data stream (e.g., the indirect/direct onodes) associated with the source data stream need to be copied at the time the clone is created. At appropriate times, cloned files may be "de-cloned."

In exemplary embodiments, a file system object is cloned by first creating a new object that represents a read-only clone (snapshot) of the source object, referred to hereinafter as a "snapshot-file" ("DSS") or "snapshot-file" ("SF") object and then creating a mutable clone of the object. The block pointers and onode block pointer in the root onode of the clone objects are initially set to point to the same blocks as the source object.

Certain metadata from the source object (e.g., file times, security, etc.) and named data streams may not be copied to the clone object. Metadata is maintained in the source object and in the clone objects to link the snapshot-file object with the source object and the mutable clone object and also to link the source object and the mutable clone object with the snapshot-file object.

In exemplary embodiments, the snapshot-file object may be a "hidden" object in that it is not visible to the file system users.

Both the source object and the mutable clone object effectively may become writable versions of the DSS object (snapshot-file object) and effectively store their divergences from the DSS object.

Some characteristics of such file cloning include:

The data stream of a file system object can be effectively cloned quickly and in a relatively fixed amount of time regardless of the size of the source object's data stream, since none of the user data blocks from which the data stream is comprised need to be copied. Also, none of the metadata blocks describing the data stream (i.e., the indirect/direct onodes) needs to be copied.

A very small and constant number of metadata blocks are mutated.

The complexity of handling I/O to a cloned/clone object is equivalent to a regular object.

The number of times a file or clone can be cloned is limited only by the amount of free space in the file system.

The number of clones a file system can support is limited only by the amount free space in the file system.

This file cloning has an inherent file de-duplication characteristic in that, rather than creating full copies of a source file and later performing de-duplication, the clones are essentially created as de-duplicated files that share data and metadata blocks with the source file.

Corruption of a shared block would affect multiple files, although data corruption is mitigated through redundant storage (i.e., the RAID controller) and other mechanisms.

In exemplary embodiments, a file system object is cloned by first creating a new object that represents a read-only clone (snapshot-file) of the source object, referred to hereinafter as a "data-stream-snapshot" object or "DSS" or "snapshot-file" and then creating a mutable clone of the object.

The block pointers and onode block pointer in the root onode of the clone objects are initially set to point to the same blocks as the source object. Certain metadata from the source object (e.g., file times, security, etc.) and named data streams are not copied to the clone object.

Metadata is maintained in the source object and in the clone objects to link the data-stream-snapshot object with the source object and the mutable clone object and also to link the source object and the mutable clone object with the data-stream-snapshot object. In exemplary embodiments, the data-stream-snapshot object is a "hidden" object in that it is not visible to the file system users. Both the source object and the mutable clone object effectively become writable versions of the DSS object and effectively store their divergences from the DSS object.

Before creating the data-stream-snapshot object, the system preferably ensures that the source object is quiescent.

In an exemplary embodiment, this involves the following steps:

Step A1. Lock the source object against mutations.

Step A2. Perform a file system checkpoint, which effectively serializes the creation of clones on a given file system (although the creation rate will be limited by the rate at which the file system can commit the previous checkpoint to disk such that storage-side delays will result in longer create times). Then, after completion of the checkpoint, the system creates the data-stream-snapshot object, which involves the following steps:

Step A3. Create a data-stream-snapshot object (i.e. a snapshot-file).

Step A4. Copy the block pointers from the source object's root onode to the data-stream-snapshot object's root onode.

Step A5. Record the current checkpoint number in the source object's root onode. This is the object's cloned-in-checkpoint number ("CCN", an exemplary special embodiment of a first-type checkpoint number); it defines the earliest checkpoint in which the object's data stream can diverge from its associated data-stream-snapshot object's data stream (and the CCN as an exemplary special embodiment of a first-type checkpoint number basically indicates a time or time period of creation in step A3).

The system also maintains the following metadata to associate the source object with the data-stream-snapshot object:

Step A6. The handle of the data-stream-snapshot object is recorded in the source object's metadata.

Step A7. A reference count and list of objects referencing the data-stream-snapshot object is recorded in the data-stream-snapshot object's metadata.

If the source object was already a clone (i.e., a clone is being cloned) then there are two additional steps between steps 4 and 5:

Step A4a. Associate the new data-stream-snapshot object with the source file's current data-stream-snapshot object.

Step A4b. Record the source file's current cloned-in-checkpoint number in the new data-stream-snapshot object's root onode.

Further objects that have a mutable clone of the data-stream-snapshot object's data stream can be created as follows:

Step B1. Create a new file system object.

Step B2. Copy the block pointers from the data-stream-snapshot object's root onode to the new object's root onode.

Step B3. Record the current checkpoint number in the new object's root onode.

Step B4. Record the handle of the data-stream-snapshot object in the new object's metadata.

Step B5. Increment the data-stream-snapshot object's reference count and add the new object's handle to the data-stream-snapshot object's list of references.

It should be noted that the cloned-in-checkpoint number (CCN) is distinct from an object's checkpoint number (labeled "CN"), which records the checkpoint of the last modification of the object. Both are stored in the object root onode. Specifically, an object's checkpoint number (labeled "CN") represents an example of a second-type checkpoint number and the cloned-in-checkpoint number (CCN) represents a first-type checkpoint number.

In this connection, it is emphasized that the CCN of the live-file does not actually indicate the time or time period of creation but of cloning thereof. Such CCN of a live-file shall still be interpreted as a first-type checkpoint number because also the CCN of a live-file will diverge from the CN of the live-file as soon as the live-file is modified since the last cloning thereof.

When modifying a user data or metadata block, the file system considers whether the block has already diverged from the clone object's associated data-stream-snapshot object, when deciding whether the block must be written to new space:

A change to a user/metadata block through a pointer with a checkpoint number less than the clone's clone-in-checkpoint number (an un-diverged block) must be written to new space.

A change to a user/metadata block through a pointer with a checkpoint number greater than or equal to the clone's cloned-in-checkpoint number (a diverged block) follows the usual rules for objects in the "live" file system substantially as described above.

Figure 4:
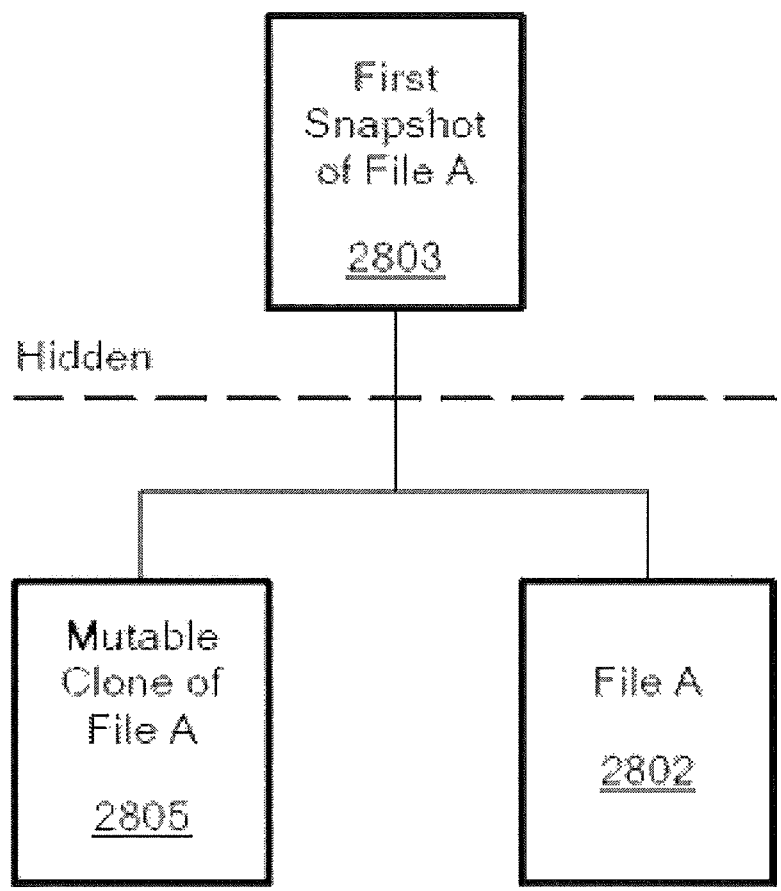
FIG. 4 schematically and exemplarily shows the relationship between a source object, a hidden snapshot-file object, and a mutable clone in accordance with exemplary embodiments.

FIG. 4 schematically shows the relationship between the source object (File A) 2802, the hidden snapshot-file object 2803, and the mutable clone 2805, in accordance with an exemplary embodiment.

As discussed above, after the source object is locked and the checkpoint is taken (steps A1 and A2), the data-stream-snapshot object 2803 is created (step A3), and the block pointers from the source object's root onode 2302 are copied to the data-stream-snapshot object 2803 root onode (step A4). The current checkpoint number is recorded in the source object 2802 root onode (step A5). The handle of the data-stream-snapshot object 2803 is recorded in the source object 2802 metadata (step A6). A reference count and list of objects referencing the data-stream-snapshot object 2803 is recorded in the data-stream-snapshot object 2803 metadata (step A7). At this point, only the source object 2802 references the data-stream-snapshot object 2803, and the reference count is (temporarily) set to one.

Also as discussed above, the mutable clone 2805 is created (step B1), and the block pointers from the data-stream-snapshot object 2803 root onode are copied to the object 2805 root onode (step B2). The current checkpoint number is recorded in the object 2805 root onode (step B3). The handle of the data-stream-snapshot object 2803 is recorded in the object 2805 metadata (step B4). The reference count in the data-stream-snapshot object 2803 is incremented and the handle of the object 2805 is recorded in the data-stream-snapshot object 2803 list of references (step B5).

It should be noted that when the mutable clone 2805 is created, information such as the block pointers could be copied from the source object 2802 rather than from the DSS object 2803, although copying from the DSS object 2803 is preferred and may allow the source object 2803 to be released from the quiescent state sooner (e.g., after creation of the DSS object 2803 but before creation of the mutable clone 2805).

If the source object 2802 is cloned again prior to being modified, a second mutable clone is created. Then, a second mutable clone is created, and the block pointers from the data-stream-snapshot object 2803 root onode are copied to the new clone object root onode. The current checkpoint number is recorded in the object (second mutable clone) root onode. The handle of the data-stream-snapshot object 2803 is recorded in the object (second mutable clone) metadata. The reference count in the data-stream-snapshot object 2803 is incremented and the handle of the object (second mutable clone) is recorded in the data-stream-snapshot object 2803 list of references.

Since the source object 2802 is effectively a mutable copy of the data-stream-snapshot object 2803, the source object 2802 may be modified over time, which causes the data stream of the source object 2802 to diverge from the data streams of the data-stream-snapshot object and other file clones. For example, with reference again to FIG. 4, modification of data blocks of the source object rooted at 2802 in a later checkpoint could result in a divergent tree structure with the root onode of object 2802 with root onodes of objects 2803 and 2805.

Similarly, mutable clones of the data-stream-snapshot object may be modified over time, which causes the data streams of the mutable copies to diverge from the data streams of the data-stream-snapshot object and other clones.

If, after the source object is modified, a copy of the modified source object is made, then a second data-stream-snapshot object is created for the modified source object using the process described above including the additional steps A4a and A4b, and then a mutable clone of the second data-stream-snapshot object is created.

It should be noted that the logic flows described above with reference to steps A1-A7 including steps A4a and A4b are used to demonstrate how the various objects are created and linked in an exemplary embodiment of the present invention. Implementationally, the optional steps A4a and A4b may be virtual steps in that common logic may be used for both an initial cloning and cloning a clone.

For example, each root onode may include an "up pointer" to refer to a hierarchically higher root onode. Initially, the up pointer in the source object is null because the source object does not refer to a hierarchically higher DSS object. When the source object is cloned, the common logic may copy the up pointer from the source object root onode into the newly created DSS object (i.e., the first DSS object) and then set the up pointer in the source object root onode to refer to the DSS object, and similarly may copy the current checkpoint number from the source object to the first DSS object and then record the current checkpoint number in the source object.

The source object may then be modified. When the modified source object is cloned, the common logic may copy the up pointer from the modified source object (which refers to the first DSS object) to the newly created second DSS object and then set the up pointer in the modified source object to refer to the second DSS object, and similarly may copy the checkpoint number from the modified object to the second DSS object and record the current checkpoint number in the modified object.

Thus, such common code effectively does not need to distinguish between cloning an uncloned file and cloning a cloned file, and such common code will create any number of hierarchical levels of linking. A particular advantage of such common code is ease of implementation in a hardware-based file system.

The DSS object can be linked to the source object and clone object(s), and vice versa, using the file handles associated with the various objects. Among other thing, such linking allows the storage system controller to quickly identify whether a particular file has been cloned and also to locate objects associated with a cloned file. It should be noted that the present invention is not limited to the use of file handles to link the root onodes. Rather, other information, such as object numbers, could be used in addition to, or in lieu of, file handles.

It should be noted that, the size attributed to a cloned file can be the size of the source file from which the clone was created. Thus, for example, cloning a 1 Gbyte file will result in 1 Gbyte being charged to the quotas associated with the cloned file. Quotas do not take into account any block sharing between clone files.

In terms of performance, reading and writing to a clone object should be in line with that of reading and writing regular non-clone files. As with non-cloned files, the hardware-based file system can auto-inquire and auto-respond NFS/CIFS operations against cloned files. Client-side deletion of a cloned file (e.g., using the "rm" command) can be completed immediately, with actual removal of the cloned file and DSS objects performed in the background.

It should be noted that a clone object may be owned by a different user and group and may be located in a different directory tree than the source object and other clones.

It should be noted that the file cloning structures described above are used for managing the files within the file system and do not affect how the file is accessed outside of the file system. As with non-cloned files, transfer of a cloned file (e.g., HSR/NDMP) transfers the entire file contents, resulting in a "fat" file at the destination.

It should be noted that the cloning logic described above is preferably implemented predominantly in hardware as part of the hardware-based file system, in exemplary embodiments of the invention.

3.2 De-Cloning of Cloned Files

As discussed above, in an exemplary embodiment, the DSS objects associated with a particular source object can remain in the file system until the source object and all clones are deleted.

Unless and until the source object diverges significantly from the snapshot versions of the object, the objects should share many data and metadata blocks and therefore maintaining the snapshot objects should not consume much storage space. If necessary or desirable, the snapshot objects could be removed, for example, through a de-cloning operation that essentially restructures the object to appear as an original (i.e., uncloned) object and removes the DSS objects and frees up data and metadata blocks from the DSS objects that are not shared with the object. Some or all of these functions may be performed as "background" tasks.

In an exemplary embodiment, such "de-cloning" can be performed as follows.

When a DSS object's reference count becomes one, and the surviving reference is a clone (not another DSS object), the clone may be "de-cloned" from the DSS object and the DSS object may be deleted.

In exemplary embodiments, such "de-cloning" is performed by transferring ownership of user data blocks from a DSS to its last-surviving live-file mutable clone.

In this regard, regarding the terms "ownership" and "transfer of ownership" in the sense of the present description, an object (e.g. DSS/snapshot-file or mutable file or clone) is deemed to own a block if the block pointer's checkpoint number is greater than or equal to the object's cloned-in-checkpoint number (where ownership means responsibility for freeing).

That is, "ownership" of a data block is associated with a file system object (mutable file/clone or snapshot-file) having a pointer to the respective data block if this pointer is associated with a checkpoint number (second-type checkpoint number) that is equal to or larger than the file system object's cloned-in checkpoint number (first-type checkpoint number).

Accordingly, if an object is deleted, among all data blocks pointed to by pointers of the object are freed if and only if the corresponding blocks are owned by the object to be deleted. And if plural objects share blocks in the sense that they both have pointers that respectively point to one or more same data blocks, only one of these objects shall own the data blocks and the data blocks are freed if and only if the actual owner thereof is deleted, while deleting one of the other objects pointing to the same data block (but not owning them) does not lead to freeing of the respective data blocks.

Ownership of a shared user data block may be transferred from the parent snapshot-file of the live-file to the live-file by:

1. Making the live-file's block pointer's checkpoint number:
    a. Greater than or equal to the live-file's cloned-in-checkpoint number.
    b. And less than the file system's current CP number (e.g., to ensure the block is preserved, for consistency-on-crash, if it is subsequently modified in the current checkpoint).
2. Making the DSS's block pointer sparse.

In exemplary embodiments, in order to meet the conditions in step 1, the live-file's cloned-in-checkpoint number can be used. A checkpoint is issued before altering any block pointers to ensure the cloned-in-checkpoint number is less than the file system's current CP number.

In exemplary embodiments, the order of these two steps is important, as the update to the DSS will potentially free some of the onodes it owns (and may have been sharing with the live-file, prior to step 1).

Transformations may be performed following the usual rules for preserving modified onodes. Specifically, whenever a block pointer is updated, the checkpoint number associated with the block pointer is updated to the current checkpoint number. Because the block pointer has been modified, the containing onode is written to new space. If that onode is a direct or indirect onode, then the block pointer to that onode in the parent onode is also updated such that the parent onode is modified and written to new space, and so on, until the root onode is processed. At the end of the transfer-of-ownership process from the parent snapshot-file of the live-file to the live-file, the live-file object and the DSS object (parent snapshot-file) no longer share any onodes.

Thus, in an exemplary embodiment, in order to transfer ownership of shared blocks from the DSS object to the live-file object, the live-file object is traversed, and for each region found that is shared and owned by the DSS object, the associated block pointers in the live-file object are "touched" (which updates the checkpoint number of the affected block pointers, similar to updating the checkpoint number when the corresponding block is written but without any data actually being written, so that the live-file object now owns these blocks), and the associated block pointers in the DSS object are made sparse (which makes the affected block pointers point at nothing and also updates the checkpoint number, in effect creating a "hole" in the DSS object, so that when the DSS object is finally deleted, it no longer points to the user data blocks that were transferred to the live-file object). The DSS object can be safely deleted once the block pointers for all shared user data blocks formerly owned by the DSS object have been transformed in this fashion.

The "de-cloning" process copes with the Live-file being concurrently changed, by transferring ownership of a limited number of user data blocks at a time while the Live-file is held locked. Also, if the Live-file is cloned during this process, the process is aborted. This "de-cloning" process potentially "dirties" many indirect/direct onodes, but no user data blocks. One beneficial by-product, though, is that it leaves the Live-file's previously shared onodes with the "correct" object-number and reuse count. After deleting all of Live-file's predecessor DSS objects, Live-file may be converted back into a regular (non-clone) file.

4. OBJECT-LEVEL REPLICATION OVERVIEW

As discussed above, in a data storage system, some or all objects of a source file system may be replicated to a target file system, for example, to allow for archiving, backup, maintenance, or disaster recovery. The target file system may be in the same file server as the source file system or may be in a separate file server than the source file system, as shown in FIG. 1.

Generally speaking, object-level replication involves creating, in the target file system, object structures that correspond to object structures in the source file system. For example, in order to replicate an entire source object in the target file system, the target generally builds an entire tree structure for the object including allocation of blocks of storage for the object data and metadata and creation of the various object onode (node) structures including the root onode (object root node) and any other nodes/blocks, based on information about the source object provided by the source.

It should be noted, however, that the actual layout of objects in the target file system may be (and generally is) different than the layout of the corresponding objects in the source file system because, among other things, replication generally involves the target managing checkpoints in the target file system independently of checkpoints in the source file system (e.g., the source file system may be at checkpoint number 100 while the target file system is at checkpoint number 200) and allocating blocks for onodes and data independently of the source file system For example, while the data blocks for a source object may have been allocated at different times and hence may have been allocated from non-contiguous storage, the data blocks for the target object may be allocated from contiguous storage when the object is first created in the target file system since the data blocks for the object generally are being allocated at substantially the same time.

Thus, replication is generally quite different from merely copying blocks of data from the source file system to the target file system (e.g., such as in mirroring).

In exemplary embodiments, replication generally is performed in cycles, where a replication cycle involves taking a new snapshot, scanning the indirection object in the new snapshot to identify any object that have changed since the previous snapshot associated with the last replication cycle (where changed objects include new objects created since the previous snapshot, existing objects that have been modified since the previous snapshot, and objects that have been deleted since the previous snapshot), and replicating the changed objects to the target file system.

In exemplary embodiments, new and modified objects are identified based on checkpoint numbers (specifically, a new object is one having a creation checkpoint number greater than the checkpoint number of the previous snapshot, while a modified object is one having a creation checkpoint number (first-type checkpoint number) less than or equal to the checkpoint number of the previous snapshot and a last modified checkpoint number (second-type checkpoint number) greater than the checkpoint number of the previous snapshot), while a deleted object is identified by the object's type (i.e., deleted objects have specific object type designations).

After the replication cycle, the new snapshot becomes the previous snapshot for the next replication cycle. Thus, each replication cycle effectively performs an incremental replication of only changed objects.

It should be noted that, although replication generally is performed in cycles, other exemplary embodiments may also permits full replication of the entire source file system, e.g., as the initial replication to the target file system.

It also should be noted that mechanisms for replication of objects described herein may be used in alternative embodiments for full or incremental replication on an object basis rather than on a file system basis, e.g., a selected object may be replicated to the target file system without the remainder of the source file system being replicated.

In certain exemplary embodiments, the indirection object is scanned in chunks by a number of indirection object scanner fibers (which may be referred to herein collectively as the "indirection object scanner") as discussed more fully below, although in alternative embodiments, the indirection object may be processed by a single scanner.

Specifically, a number of indirection object scanner fibers are spawned, and each indirection object scanner fiber scans a designated portion of the indirection object (e.g., a designated range of object numbers) to identify any modified or deleted objects in its respective chunk.

When an indirection object scanner fiber identifies a changed object in its respective chunk, it creates a work item as discussed more fully below in a corresponding Chunk Queue (where an exemplary embodiment maintains one Chunk Queue per indirection object chunk). For convenience, a work item for a new object is referred to as a CREATE work item, a work item for a modified object is referred to as a MODIFY work item, and a work item for a deleted object is referred to as a DELETE work item.

A number of reader fibers take work items off of the Chunk Queues and processes the work items, as discussed more fully below. Among other things, the use of multiple fibers to scan the indirection object and process the work items allows such scanning and processing to be performed in parallel.

Figure 5:
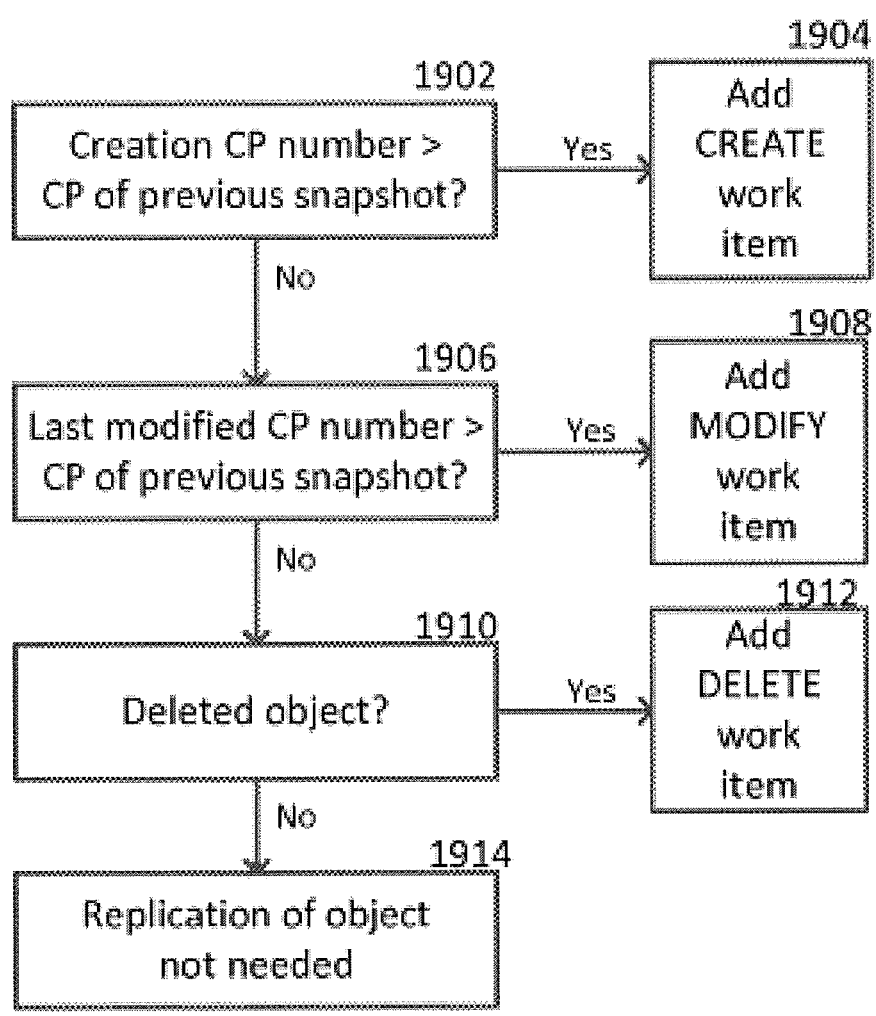
FIG. 5 is an exemplary logic flow diagram for generating work items for chunk queues in accordance with exemplary embodiments.

FIG. 5 is an exemplary logic flow diagram for generating work items for the Chunk Queues. The source examines each object in the indirection object. If the creation checkpoint number of an object is greater than the checkpoint number of the previous snapshot (YES in block 1902), then the object was newly created, and the source adds a CREATE work item to the appropriate Chunk Queue, in block 1904.

Otherwise (NO in block 1902), if the last modified checkpoint number of the object is greater than the checkpoint number of the previous snapshot (YES in block 1906), then the object is an existing object that was replicated to the target file system but has been modified since, and the source adds a MODIFY work item to the appropriate Chunk Queue, in block 1908.

Otherwise (NO in block 1906), if the object was deleted since the previous snapshot (YES in block 1910), then the source adds a DELETE work item to the appropriate Chunk Queue, in block 1912.

Otherwise (NO in block 1910), replication of the object is not needed in this replication cycle, in block 1914.

5. OBJECT-LEVEL REPLICATION OF CLONED OBJECTS

Replication of cloned objects is often handled by creating so-called "deep" copies of the cloned objects, i.e., while the cloned objects in the source file system often share various data and metadata blocks, the cloned objects are created in the target file system without such shared data and metadata blocks such that the cloned source objects are essentially de-cloned in the target file system.

For example, two objects that share a particular block in the source file system will not share that block in the target file system; instead, a separate block will be allocated for each of the objects. One disadvantage of using deep copies to replicate cloned objects it that the free space required to replicate the clones on the target file system will be greater than the space they occupy on the source file system.

Thus, while such "deep" replication of cloned objects is relatively simple from an implementation standpoint, some of the advantages of having cloned files (e.g., reduced storage space) are lost in the target file system when such "deep" replication is performed.

However, replication of cloned objects may be performed in such a way that the sharing of data and metadata blocks can be maintained for cloned objects created in the target file system. Because of the way snapshot-file objects (SFs) are used during the cloning process in certain exemplary embodiments as described in U.S. Patent Application Publication No. US 2012/0130949, objects associated with a snapshot-file tree generally must be replicated in a particular order, specifically ensuring that a parent snapshot-file object is replicated before any of its children are replicated.

Thus, when an entire snapshot-file tree is being replicated, replication generally may begin with the root snapshot-file and then replication processes the remainder of the snapshot-file tree in a recursive fashion.

5.1. Summary of Clone Replication Features

Object-level clone replication schemes described herein include some or all of the following features:

- Clones maintain their object properties over object replication by emulating the cloning mechanisms used on a live file system to create the clone objects on the target file system.
- Replicated clones use the same amount of space on the target. The user/metadata blocks shared between clones on the source file system are also shared on the target file system.
- The data transferred between the source and the target when replicating clones is minimized. The shared user/metadata blocks between multiple clones are transferred and written once on the target file system. Only diverged data is transferred and written for each clone object.
- The processing resources used to replicate clone objects and other types of objects are shared seamlessly.
- The method allows reusing all the existing mechanisms used by object replication to replicate other types of objects.
- A file system containing clones is replicated in a single pass replication, i.e., one indirection object scan is sufficient for the detection of all changed objects and their replication.
- Only the changed branches of a given snapshot-file tree are processed and replicated. The unchanged branches are not processed.
- New clone objects (i.e., a changed object with a creation checkpoint greater than the checkpoint number of the previous snapshot) are replicated starting from the roots of the new trees or branches.
- The roots of the new trees or branches are easily identified when processing changed objects by examining the creation checkpoint of the parent of new snapshot-files. For a replication session with N new snapshot-file object, the overhead this incurs is N access to enode metadata and N access to root onodes.
- Replication of new clone trees or branches by combining a parallelized level-order walk of the tree with a depth-first preorder walk of the tree depending on resource availability.
- There is no limitation on the number of clones processed during a replication, the size of their trees, or the number of clones referencing the same snapshot-file.
- The overhead incurred by the replication of a new clone on the target, compared to other types of objects, is a read access to the snapshot-file's root onode, issuing checkpoint if needed, and a write access to the clone's root onode.
- No overhead is incurred by the replication of a modified clone on the target compared to other types of objects (a modified object is a changed object with a creation checkpoint less than or equal to the checkpoint of the previous snapshot). Special cases where the clone was the source data stream, the parent snapshot-file has changed, or the clone was de-cloned may incur the transfer and writing of some additional data on the target file system. Such cases can be optimized further, although the additional processing may outweigh the benefits.
- No overhead is incurred by the replication of a deleted clone on the target compared to other types of objects (a deleted object is a changed object that exists in the previous snapshot but not in the current snapshot).
- Changes to a clone object are replicated in parallel using multiple fibers on both the source and target.
- Modified clones, new branches or the same snapshot-file, and new independent trees are replicated in parallel using multiple fibers on both the source and target.
- The number of clones processed in parallel is only limited by the overall resources allocated for the replication.

5.2. Clone Replication

The following is a description of clone replication concepts in accordance with an exemplary embodiment, including discussions of specific special cases of clone replication.

5.2.1. Replication of Deleted Clone Objects

When the source detects that an object has been deleted from the source file system, the source instructs the target to delete the corresponding object from the target file system, and the target deletes the object.

In certain situations, even though the object has been deleted from the target file system, certain blocks of the deleted object need to be retained such as for deletion or replication of any clones of the deleted object. In exemplary embodiments, the blocks of the deleted object are automatically retained as part of the snapshot mechanism used during replication and therefore such blocks will remain available until they are no longer being used by any object.

5.2.2. Replication of Newly Created Clone Objects

In the source file system, creating a clone involves creating its snapshot-file first, which is a read-only snapshot of the source data stream. During this process, the source data stream becomes a clone of the snapshot-file.

A mutable clone of the snapshot-file is then created. Each clone has a cloned-in-checkpoint number, which refers to the checkpoint number where it was associated with its snapshot-file. The clone initially shares all of its data blocks, and the onode tree's metadata blocks describing the data blocks, with its snapshot-file. When a clone's user/metadata block is modified for the first time, it gets written to new space and becomes a diverged block.

During replication, the source uses the cloned-in-checkpoint number to determine if a modified user block being replicated has diverged from the parent snapshot-file by comparing it to the block pointer checkpoint number; if the block pointer checkpoint number is greater than or equal to the cloned-in-checkpoint number, the user/metadata block is diverged and needs to be written to new space on the target file system.

In this exemplary embodiment, it is necessary to ensure that a new snapshot-file object is fully replicated (created and written) on the target file system before its clone is replicated (created and its diverged blocks written) on the target file system. This is to preserve the relationship between a clone's cloned-in-checkpoint number and user/metadata blocks checkpoint number, and therefore to preserve the clone's divergence over replication. This is not limited to regular file clones; it also applies to snapshot-file clones.

In the case, for example, of a clone CL' of a diverged clone CL, where SF' and SF are their respective snapshot-files, SF' shares some of its data blocks with its parent SF.

The relevant branch of the snapshot-file tree in this case looks like:

SF⇒CL
⇒SF'⇒CL'

If SF' and CL' were to be replicated before SF and then SF' is truncated to share its undiverged data blocks with its predecessor SF, these shared blocks would have a checkpoint number greater than the cloned-in-checkpoint number and therefore would be considered as diverged blocks for CL' while not the case.

In order to avoid replicating shared data blocks between related snapshot-files twice and to preserve the integrity of all elements in a snapshot-file tree, a snapshot-file is replicated on the target file system before any successor of any level is created on the target file system.

Figure 6:
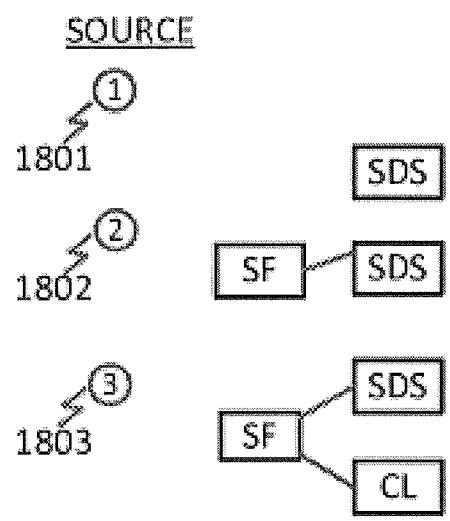
FIG. 6 is an exemplary schematic block diagram depicting the order of creation of a snapshot-file tree in the target file system compared to the order of creation of a snapshot-file tree in the source file system in accordance with exemplary embodiments.
Figure 6:
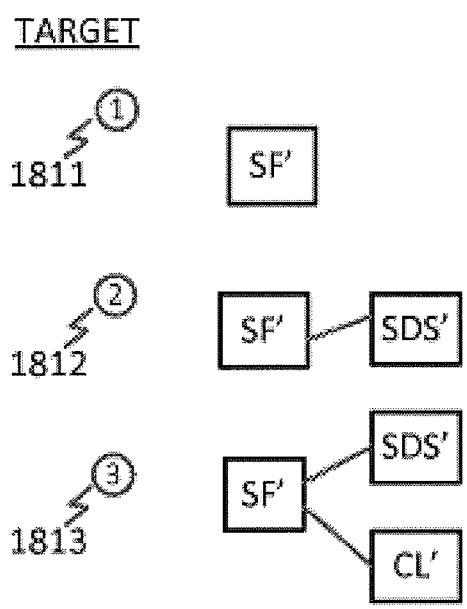

Thus, as depicted schematically in FIG. 6, while a snapshot-file tree in the source file system begins with a source data stream (SDS in step 1801) followed by creation of the snapshot-file object (SF, which effectively becomes a clone of SF, in step 1802) followed by creation of the mutable clone (CL in step 1803), replication of the snapshot-file tree in the target file system begins with creation of the snapshot-file object (SF' in step 1812) followed by creation of the source data stream (SDS' in step 1812) and creation of the mutable clone (CL' in step 1813); creation of the clones SDS' and CL' may be performed in either order.

When creating a new clone object other than a root snapshot-file object in the target file system (i.e., a clone object that at least initially shared blocks with a parent snapshot-file), the new clone object is initially made to be a clone of its parent snapshot-file object. The new clone object is then diverged as necessary, specifically by unlinking any blocks that are no longer shared with the parent snapshot-file object and adding any new blocks that have diverged from the parent snapshot-file object.

Importantly, when creating the new clone object, the target needs to ensure that the cloned-in-checkpoint (special embodiment of a first-type checkpoint number) of the new clone object is higher than the checkpoint number of all blocks in the parent snapshot-file object; otherwise, blocks shared by the clone and the snapshot-file object will appear to be diverged even though they are not.

Thus, in one exemplary embodiment, when creating the clone object, the target compares the last modified checkpoint of the parent snapshot-file object with the current checkpoint number in the target file system, and if these checkpoint numbers are equal, the target issues a checkpoint in order to advance the checkpoint number of the target file system and sets the cloned-in-checkpoint number (first-type checkpoint number) of the clone object to the advanced checkpoint number to ensure that the cloned-in-checkpoint number of the clone object is higher than the checkpoint of all blocks in the parent snapshot-file object (otherwise the target can simply set the cloned-in-checkpoint number to the current checkpoint number without issuing a checkpoint).

For example, using the above example, when creating a child of SF' in the target file system (e.g., SDS' or CL'), the child object is initially made to be a clone of SF', i.e., the child object initially shares all of the blocks of SF'. The child object is then diverged as necessary, specifically by unlinking any blocks that are no longer being shared with SF' and adding any new blocks that have diverged from SF' (sent to the target by the source).

When creating the child object, the target compares the last modified checkpoint of SF' with the current checkpoint number in the target file system, and if these checkpoint numbers are equal, the target issues a checkpoint in order to advance the checkpoint number of the target file system. The child object is assigned the advanced checkpoint number as its cloned-in-checkpoint number, which ensures that the cloned-in checkpoint number of the child object is higher than the checkpoint of all blocks in SF'.

Thus, in an exemplary embodiment, the following steps are used to replicate a new clone object on the target file system:

Create a new object using the enode information sent from the source. The created object references the parent snapshot-file, given that object numbers are preserved over object replication.

Form a root onode from the parent snapshot-file's root onode (which, by definition, already would have been replicated to the target file system in either the current replication cycle or a previous replication cycle because the parent snapshot-file object is created in the target file system before any of that snapshot-file object's children are created in the target file system).

Issue a checkpoint if the last modified checkpoint number of the parent snapshot-file is equal to the current checkpoint number of the target file system to advance the checkpoint number (the cloned-in-checkpoint number is a checkpoint number used to distinguish between diverged and undiverged user/metadata blocks; user/metadata blocks with a checkpoint number greater than or equal to the cloned-in checkpoint number are diverged).

Set the cloned-in-checkpoint number in the root onode to the current (advanced) checkpoint number.

Write the object's root onode to storage. The object now points to the same block pointers as the snapshot-file.

Write the diverged user/metadata blocks received from the source to new space. The source selectively reads and transfers the clone's diverged user/metadata blocks; that is, any block with a checkpoint number greater than or equal to the cloned-in checkpoint number of the object in the source file system.

A clone object can be either a regular file clone (i.e., a modifiable live copy) or a snapshot-file clone (i.e., a read only snapshot which is generated when cloning a diverged clone). In an exemplary embodiment, clones can be identified by examining a flag in the object's enode.

Creation of root snapshot-file objects (i.e., a snapshot-file generated when cloning a source data stream or an undiverged clone which doesn't have a parent snapshot-file) do not require the special handling described above; they are created on the target file system from scratch because the source data stream object from which to create the root snapshot-file object is not necessarily known in the target file system, and if known, may have moved from its state when it was cloned.

Figure 7:
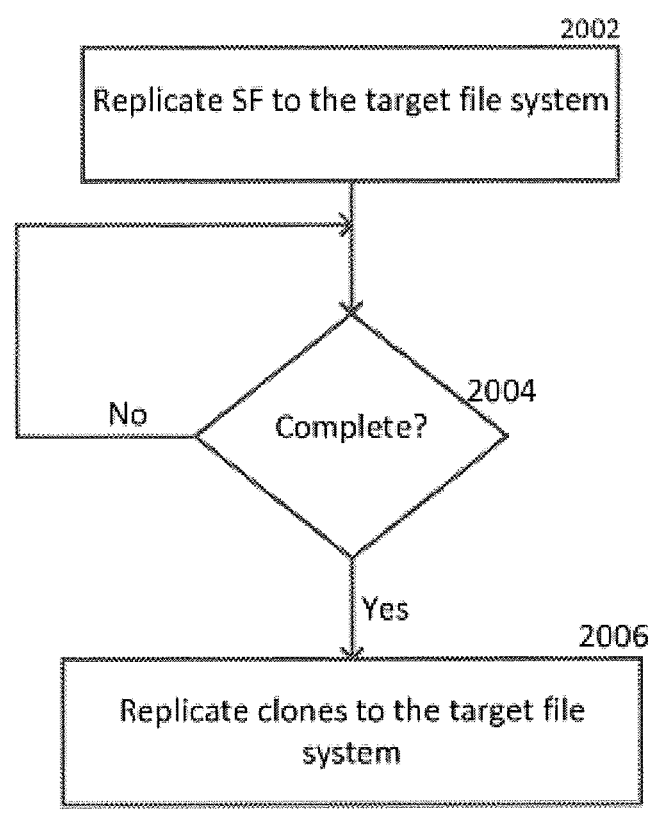
FIG. 7 is an exemplary logic flow diagram schematically showing replication of the snapshot-file tree rooted by SF in FIG. 6 to the target file system in accordance with exemplary embodiments.

FIG. 7 is an exemplary logic flow diagram schematically showing replication of the snapshot-file tree rooted by SF in FIG. 6 to the target file system. In block 2002, the snapshot-file object is replicated to the target file system. Upon completion of such replication of the snapshot-file object (YES in block 2004), clone(s) of the snapshot-file object are replicated to the target file system, in block 2006.

Figure 8:
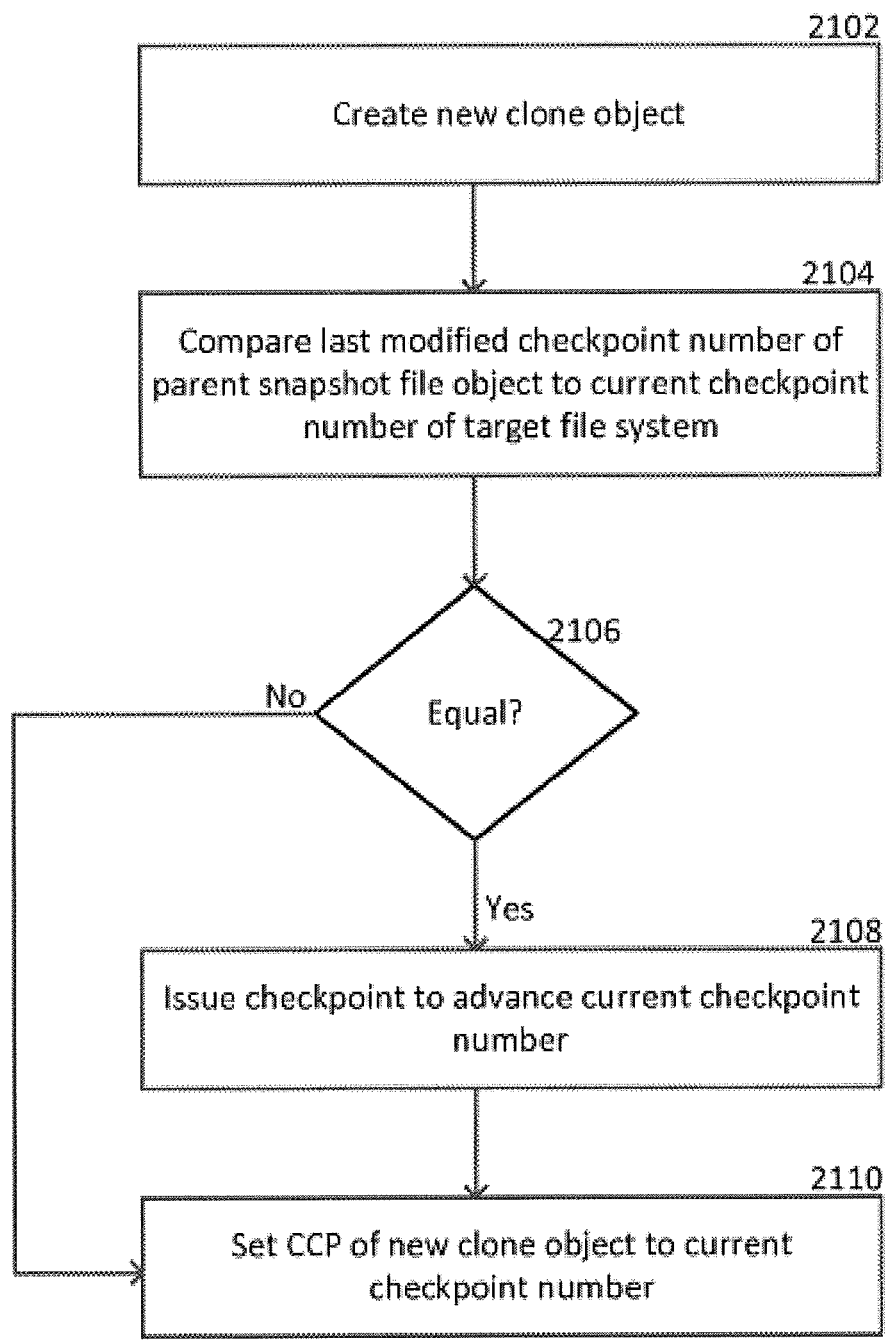
FIG. 8 is an exemplary logic flow diagram schematically showing creation of a new clone object by the target in accordance with exemplary embodiments.

FIG. 8 is an exemplary logic flow diagram schematically showing creation of a new clone object by the target, in accordance with an exemplary embodiment. In block 2102, the target creates the new clone object in the target file system. In block 2104, the target compares the last modified checkpoint number of the clone object's parent snapshot-file object to the current checkpoint number of the target file system.

If the checkpoint numbers are equal (YES in block 2106), then the target issues a checkpoint in the target file system to advance the current checkpoint number in the target file system, in block 2108. In block 2110, the target sets the cloned-in-checkpoint number of the clone object to the current checkpoint number, which will be the original current checkpoint number if arrived at block 2110 from NO in block 2106 or will be the advanced checkpoint number if arrived at block 2110 from block 2108.

The clone object is initially created as a clone of the parent snapshot-file objects, sharing all blocks with the parent, and then is diverged as necessary as directed by the source.

5.2.3. Object Becomes a Clone Since Previous Snapshot

A regular object that has been replicated to the target file system may gain the property of a clone since the previous snapshot. This can happen, for example, if the object is cloned since the previous snapshot or was in the process of being cloned when the last replication cycle occurred (in an exemplary embodiment, during creation of a clone object in the source file system, the object essentially is created as a regular object and then converted to a clone object that shares all of the user/metadata blocks of its parent snapshot-file, so it is possible for a replication cycle to occur after the object is created but before it has been completely converted into a clone such that the object would be replicated to the target file system as a regular object and then would be identified in the new replication cycle as a modified object that needs to be replicated to the target file system. The object may have diverged from its parent snapshot-file after gaining the property of a clone but before the new replication cycle.

The source can identify an object that has gained the properties of a clone since the previous snapshot (e.g., based on the cloned-in-checkpoint of the object being greater than or equal to the checkpoint number of the previous snapshot) and can determine that the object was in the process of being cloned when the last replication cycle occurred (e.g., if the object's parent snapshot-file is not a new object in the new replication cycle) and, in an exemplary embodiment, the source replicates the object by having the target recreate the object in the target file system as a clone that shares blocks with the parent snapshot-file object (which already has been replicated to the target file system), scanning the object to identify any diverged blocks (i.e., blocks having a checkpoint number greater than or equal to the cloned-in-checkpoint number of the object), and causing replication of the diverged blocks in the target file system.

In an exemplary embodiment, recreating the object in the target file system involves deleting the existing object from the target file system and creating the object anew. If, on the other hand, the object has gained the properties of a clone since the previous snapshot but the parent snapshot-file is new (indicating that the object was cloned since the last replication cycle), then the object will be replicated during replication of the parent snapshot-file object as discussed more fully below.

5.2.4. Simplification of Snapshot-File Tree

When a snapshot-file object has only one child clone, that snapshot-file may be deleted and the clone modified to depend from the parent of the snapshot-file being deleted so as to simplify the snapshot-file tree. For example, in the following, intermediate snapshot-file object SF1 has been deleted since the previous snapshot:

SF0←SF1←Clone has changed to SF0←Clone

The source can identify that such simplification has occurred since the previous snapshot based on the clone object's parent having changed since the previous snapshot.

In an exemplary embodiment, the source instructs the target to delete SF1 when processing its DELETE work item and instructs the target to replicate diverged blocks of the clone object relative to SF0 (the object's metadata has changed, since the object now has a new parent object number) when processing the clone's MODIFY work item.

Such replication of the clone object requires that any blocks that were shared with SF1 be available so that the target can traverse the onode structures of the clone object as part of the replication process. As discussed above, such shared blocks are automatically retained by the target as part of the snapshot mechanism so that, even if SF1 is deleted before the clone object is replicated, the shared blocks will still be available.

5.2.5. Clone Object Has Been De-Cloned

A clone may be de-cloned, which involves decoupling the object from its parent snapshot-file object and adding blocks to the object corresponding to blocks that previously were shared with the parent snapshot-file object. The source can identify that such de-cloning has occurred since the previous snapshot based on the object having been a clone in the previous snapshot but not being a clone in the new snapshot. The source could replicate the object by "deep copying" the object to the target file system.

5.3. Work Items and Reader Fibers

As mentioned above, in certain embodiments, the indirection object is scanned in chunks during an object-based replication to detect objects that have changed since the previous snapshot.

Generally speaking, when a changed object is detected, a work item containing the object number, checkpoint number, volume number, and object type is added to the corresponding Chunk Queue for the chunk. Specifically, a CREATE work item is added for a new object, a MODIFY work item is added for a modified object, and a DELETE work item is added for a deleted object.

A number of reader fibers take work items off of the Chunk Queues and processes the work items, as discussed more fully below.

In certain exemplary embodiments, processing of the CREATE and MODIFY work items may generate additional work items that are managed using two queues referred to herein as the "pending map" and the "clones queue". Work items placed in the pending map are essentially placeholders that must be moved (promoted) to the clones queue in order to be executed. Work items placed in the clones queue are executed by a pool of process fibers (threads). The work items placed in the clones queue can be executed in any order, and therefore the pending map is used to "stage" how and when work items are promoted to the clones queue to be executed.

When a particular work item is executed, the source interacts with the target to cause replication of the corresponding file system object in the target file system; this involves, among other things, the source passing object data and/or metadata to the target and the target creating or updating the object, as described more fully below. In certain exemplary embodiments, the pending map and the clones queue are logical queues that are part of a single physical fixed-length queue.

In general, the source transmits instructions to replicate an object of the source file system to the target file system, wherein such instructions to replicate may include instructions to create an object in the target file system corresponding to a created object in the source file system (e.g. based on a CREATE work item), instructions to modify an object in the target file system corresponding to a modified object in the source file system (e.g. based on a MODIFY work item), and instructions to delete an object in the target file system corresponding to a deleted object in the source file system (e.g. based on a DELETE work item).

Figure 9:
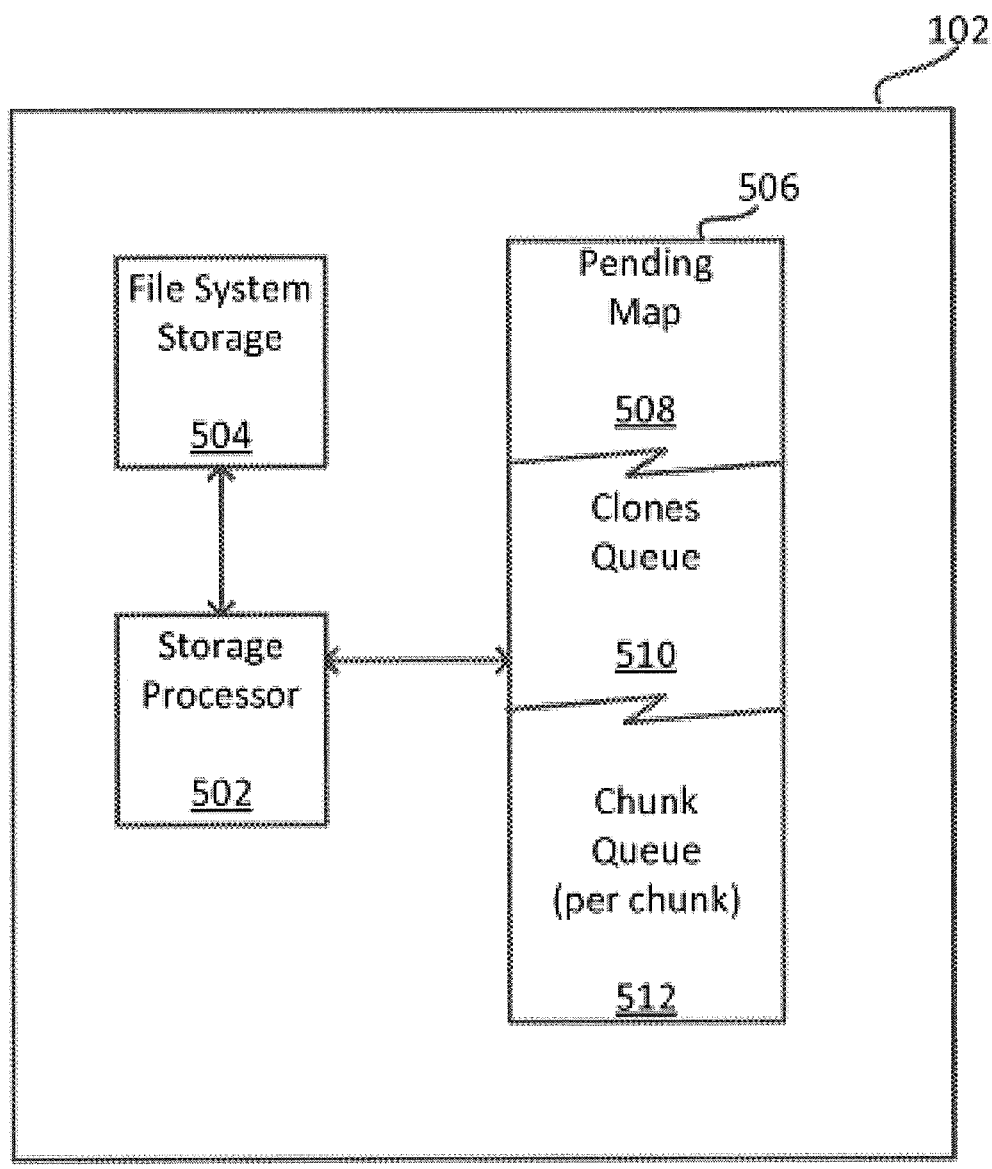
FIG. 9 is an exemplary schematic block diagram showing relevant components of a file server in accordance with exemplary embodiments.

FIG. 9 is a schematic block diagram showing relevant components of a file server 102 in accordance with an exemplary embodiment of the present invention. Among other things, the file server 102 includes a storage processor 502, file system storage 504, a global logical queue 506 that is created and maintained on-demand and contains various sub-queues including the pending map 508, the clones queue 510, and a number of Chunk Queues 512 (typically one queue per indirection object chunk) for implementing the chunk-based indirection object scanning as mentioned immediately above. For the sake of convenience and simplicity, details of the storage processor 502 are omitted, although the storage processor 502 generally manages one or more file systems in the file system storage 504 and generally includes substantial hardware and software resources as discussed above.

In an exemplary embodiment, clones can be identified by examining a flag in the object's enode. Also, in exemplary embodiments, it can be determined whether an object has been de-cloned by determining that the corresponding flag has changed since the last checkpoint and now indicates "no clone".

5.3.1. The DELETE Work Item

When processing a DELETE work item, the source sends an inquiry to the target to delete the object from the target file system.

5.3.2. The CREATE Work Item

When processing a CREATE work item and the object is a clone or a root snapshot-file, it is necessary to determine whether the object will be replicated by the current fiber or whether it will be replicated as part of its parent snapshot-file's tree and should be ignored by the current fiber.

This is done as follows:

a. If the object is a clone and its parent snapshot-file is a new object, the object's replication is omitted by the current fiber.

b. If the object is a root snapshot-file or a clone with an old parent, the object is replicated by the current fiber. If the clone is a snapshot-file, a SPAWN work item to replicate its clones is added to the pending map. When the replication of the snapshot-file is complete, the source adds the pending SPAWN work item to the clones queue for processing.

In the case of a full replication where all objects are new, this process can be simplified as follows:

If the object is a root snapshot-file, the object is replicated as in (b) above.

Otherwise the object's replication is omitted by the current fiber.

5.3.3. The SPAWN Work Item

When a fiber pulls a SPAWN work item from the clones queue to replicate the successors of a snapshot-file, the fiber will try to spawn the remaining branches of the snapshot-file tree if there is space in the queue to do so. It will then replicate the successor due for replication.

A SPAWN work item contains all the information necessary to replicate the clones of a given snapshot-file; for instance the snapshot-file's object number, the reference count (the reference count of a snapshot-file is the number of its immediate clones), the reference list (the reference list of a snapshot-file is the list of its immediate clones), and the reference offset (the reference offset of a snapshot-file is the index of the clone to replicate next in the reference list).

For convenience, a SPAWN work item for a snapshot-file "SF" and a reference offset "refOffset" will be represented by SPAWN(SF,refOffset). This work item will perform replication of child number "refOffset" of snapshot-file "SF."

A SPAWN(SF,refOffset) work item is processed as follows:

1. Generate any new work items required to finish the replication of the snapshot-file tree, which is done first to allow other available fibers to process other parts of the snapshot-file tree in parallel:

a. If the clone is a regular file and is not the last clone, a new SPAWN (SF,refOffset+1) work item to replicate the remaining clones is added to the clones queue.

b. If the clone is a snapshot-file and it is the last clone, a SPAWN(clone,O) work item is added to the pending map to replicate the children of the clone starting with child O.

c. If the clone is a snapshot-file and it is not the last clone and the total queue is full, a new ACTIVE (SF,refOffset, clone,O) work item is added to the pending map.

d. If the clone is a snapshot-file but it is not the last clone and the total queue is not full, a SPAWN(clone,O) work item is added to the pending map to replicate the children of the clone starting with child O, and a SPAWN (SF,refOffsett+1) work item is added to the queue to replicate the remaining clones of SF.

2. Replicate the clone.

In one exemplary embodiment, the worker fiber determine if an object is the last successor by comparing the reference offset against a reference count 'refCount' of the parent snapshot-file.

In one exemplary embodiment, in order to avoid having to visit the reference list of the snapshot-file multiple times, the reference list of the snapshot-file as well as the reference count of the snapshot-file are cached.

5.3.4. The ACTIVE Work Item

When a fiber pulls an ACTIVE work item from the clones queue, the fiber will continue replicating objects in the root snapshot-file tree following a depth-first traversal while allowing some degree of parallel processing when resources allow. If the clone to replicate is a snapshot-file and the queue has a free entry, it adds a separate work item to replicate its tree to the pending map.

An ACTIVE work item contains the information required to complete the replication of a partially replicated snapshot-file tree, including:

1. The snapshot-file SF[O], its reference count, list and offset refOffset[O]; and
2. The snapshot-file SF[n] of the branch being replicated, its reference count, list and offset refOffset[n].

The clone replicated by this work item is clone number refOffset[n] of snapshot-file SF[n].

For convenience, an ACTIVE work item will be represented by ACTIVE(SF[O], refOffset[O], SF[n],refOffset[n]). An ACTIVE(SF[O], refOffset[O], SF[n],refOffset[n]) work item is processed as follows:

1. If the clone is a regular file and it is not the last clone, add an ACTIVE (SF[O], refOffset[O], SF[n],refOffset[n]+1) work item to the clones queue.
2. If the clone is a regular file and it is the last clone, iterate over the intermediate parents of SF[n] until:
   a. SF[O] is reached (which means that SF[O] was replicated in its entirety so no work items need to be generated); or
   b. A snapshot-file SF[i], where O<i<n, which isn't the last clone of its snapshot-file SF[i−1], is found—If SF[i] is a direct clone of SF[O], it adds a SPAWN (SF[O], refOffset[O]+1) to the queue, otherwise it adds an ACTIVE(SF[O], refOffset[O], SF[i−1],refOffset[i−1]+1) work item to the queue as SF[i−1] was already replicated.
3. If the clone is a snapshot-file and the queue is full, it adds an ACTIVE (SF[O], refOffset[O], clone, O) work item to the pending map.
4. If the clone is a snapshot-file and the queue has a free entry, it adds a SPAWN(clone, O) to the pending map and then iterates over the intermediate parents of SF[n] until:
   a. SF[O] is reached (which means that SF[O] was replicated in its entirety so no work items need to be generated); or
   b. A snapshot-file SF[i], where O<i<n, which isn't the last clone of its snapshot-file SF[i−1], is found—If SF[i] is a direct clone of SF[O], it adds a SPA WN (SF[O], refOffset[O]+1) to the queue, otherwise it adds an ACTIVE(SF[O], refOffset[O], SF[i−1],refOffset[i−1]+1) work item to the queue as SF[i−1] was already replicated.
5. Replicate the clone.

In one exemplary embodiment, in order to avoid reading the enode and reference list of SF[n] each time a successor or SF[n] is replicated, the list of its successors and its reference count is cached.

5.3.5. The MODIFY Work Item

The MODIFY work item applies to objects that already have been replicated to the target file system but have changed since the previous snapshot. Modifications to a regular file clone object on a live file system result from:

1. De-cloning the object when all its user/metadata blocks become diverged, which can result in the deletion of the parent snapshot-file if the object was its last clone;
2. Changing its parent:
   a. When a snapshot-file tree is simplified, when its reference count drops to 1, resulting in the deletion of intermediate snapshot-files. The cloned-in checkpoint number in this case is less than the checkpoint number of the previous snapshot; or
   b. When a clone is de-cloned and then cloned again. The cloned-in checkpoint number in this case is greater than or equal to the checkpoint number of the previous snapshot;
3. Cloning the source data stream that is a regular file object, which generates two new objects, namely the snapshot-file and the new clone—the source data stream becomes a clone of the snapshot-file, and has a cloned-in-checkpoint number greater than or equal to the checkpoint number of the previous snapshot; or
4. Simply diverging additional user/metadata blocks of the object—the cloned-in checkpoint number in this case is lower than the checkpoint number of the previous snapshot.

When a source data stream that has already been replicated to the target file system is cloned, a snapshot-file and a clone object will be created, as represented by the following:

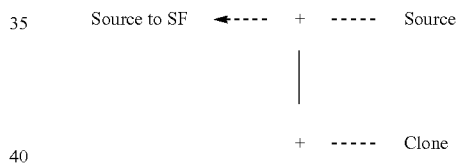

In this case, when scanning the indirection object, the indirection object scanner fiber would see Source as being a modified object and add a MODIFY work item for it, SF as being a new object, and Clone as being a new object. However, in this case, Source should be replicated as part of the replication of SF and thus the reader fiber executing the MODIFY work item for Source will not proceed with replication of Source, as set forth below.

The reader fiber can determine that Source is the source data stream by checking the cloned-in-checkpoint number of Source, and if the cloned-in-checkpoint number is greater than the previous file system snapshot's checkpoint, then Source is the source data stream.

When processing a MODIFY work item from a chunk queue, such transitions are detected and can be handled specifically:

1. If a non-clone regular file object was a clone in the previous snapshot, the object was de-cloned. Such an object can be deep copied, that is, all its user/metadata blocks are replicated.
2. If the object's cloned-in-checkpoint number is greater than the checkpoint number of the previous snapshot:
   If the parent snapshot-file is a new object, the object is either a clone that was the source data stream or a clone that was de-cloned then cloned. In both cases, the objects will be replicated from scratch as part of the replication of their parent snapshot-file. The replication of such objects is omitted by the processing fiber.

Otherwise, the object is recreated on the target. This is possible if the previous snapshot was taken when the clone was partially cloned; that is, the snapshot-file was created in the previous snapshot but the clone was cloned after that.

3. If the object is a clone with a cloned-in-checkpoint number is less than the checkpoint number of the previous snapshot and a different parent from the previous snapshot, the clone's parent has changed. All the diverged user/metadata blocks from the new parent are replicated.

4. Otherwise, if the object is a clone, it is a more diverged clone and it is replicated like any other objects. Only the changed diverged user/metadata blocks are replicated in this case.

Unlike on the target file system, some of the special cases covered in (1), (2) and (3) above involve some degree of user/metadata blocks transfer between objects on a live file system.

For example, in the case where a snapshot-file tree is simplified, the user/metadata blocks owned by the intermediate deleted parents are transferred to the clone. If such user/metadata blocks have not changed since the previous snapshot, these could be reused instead of being transferred and written to new space on the target file system.

Also, in the case where the object is the source data stream, its user/metadata blocks are transferred to the snapshot-file it has cloned. If these user/metadata blocks have not changed since the previous snapshot, they could be reused instead of being transferred and rewritten to new space on the target file system.

Although it is possible to optimize these scenarios, the overall added benefit does not always outweigh the additional processing involved.

6. REMOVING SNAPSHOT-FILES 6.1 Snapshot-File Tree Summary

As discussed above under section 3, when a file is cloned for the first time, a "snapshot-file" object is created in the file system, which assumes ownership of all the metadata and user data blocks that are pointed to by pointers of the file's nodes (e.g. indirect and/or direct nodes). In embodiments, the created "snapshot-file" object may be made read-only, while the file remains mutable/writable. In addition, another copy of the cloned file is created referred to as a clone of the file, see FIG. 4 and the description thereof. Also, the clone may be mutable/writable.

Immediately after the cloning process, before the live-file and the clone thereof are modified, all three objects, i.e. the cloned file, the newly created clone and the newly created parent snapshot-file, do share the same data blocks, namely, all data blocks that have been pointed to by pointers of the file prior to the cloning process.

Moreover, since the pointers have been copied or, more preferably, since the same pointers are used, when the root nodes of the three objects point to the same (uncopied) indirect and/or direct nodes, based on the cloned file's pointers all respective pointers have the checkpoint numbers according to the pointers' checkpoint numbers prior to the cloning.

However, only the newly created snapshot-file may own all or some of the blocks (unless all blocks are still owned by one or more previous snapshot-files, i.e. by ancestors of the newly created snapshot-file) and the clone and the file do not own any blocks as long as they remain unmodified.

As discussed above, ownership of a data block by a certain object is indicated by the cloned-in checkpoint number (as an example of a first-type checkpoint number) of the certain object being equal to or larger than the checkpoint number (as an example of a second-type checkpoint number) of the respective pointer.

At the time of cloning, the cloned-in checkpoint number (CCN) of both writable files, i.e. the cloned file and the newly created clone (clone file), can be set to the current checkpoint number of the file system. The cloned-in checkpoint number of the newly created snapshot-file can be set to the previous cloned-in checkpoint number of the file before cloning.

By such setting, the newly created snapshot-file automatically owns the specific blocks to be owned and the clone and file do not own any of the blocks. Only, if one or more new blocks are pointed to by pointers of the file at the current or later checkpoint numbers due to modification of the file, the ownership condition above will be fulfilled for those blocks pointed to by pointers of the file so that the then modified file will then own the blocks associated with the modification. The same applies for the clone, when modified. Accordingly, the original file and the clone own blocks that are modified subsequent to the cloning operation.

Furthermore, if the file and/or the clone is cloned again after modification since the last cloning operation, another snapshot-file is created and will then reference the previously created snapshot-file, while the cloned file (or cloned clone) will reference the newly created snapshot-file. This newly created snapshot-file will then again assume ownership of all blocks that have diverged since the last cloning operation, while the other (unmodified blocks) will remain to be owned by the previously created snapshot-file or by an ancestor thereof.

Figure 10:
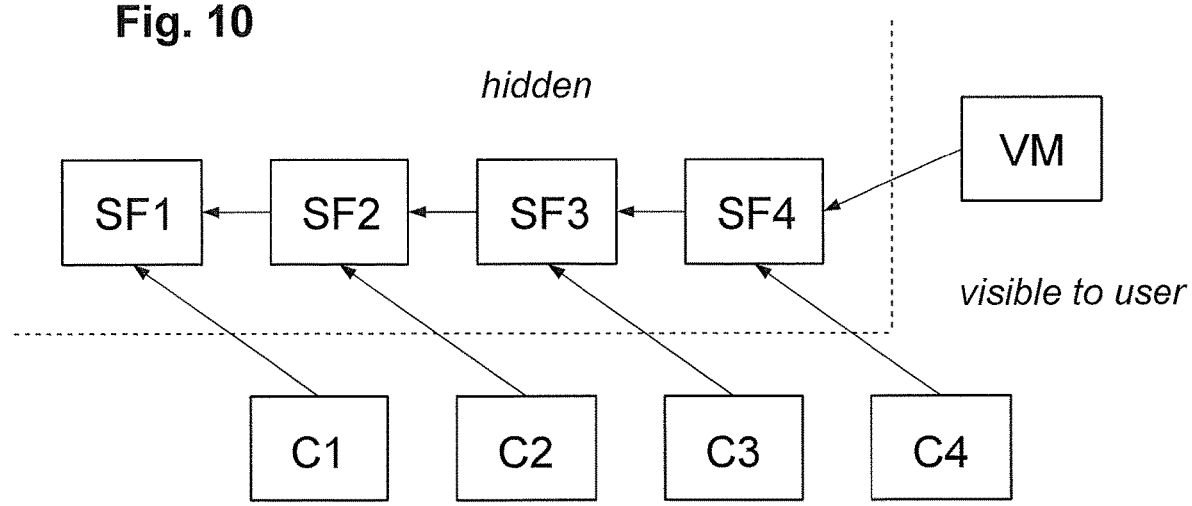
FIG. 10 shows an example of a snapshot-file tree.

As an example, FIG. 10 shows a snapshot-file tree according to which an original file labeled "VM" has been modified and cloned four times, thereby creating clones C1 (may represent a backup file VM-backup1), C2 (may represent a backup file VM-backup2), C3 (may represent a backup file VM-backup3) and C4 (may represent a backup file VM-backup4) and the snapshot-files SF1, SF2, SF3 and SF4.

In FIG. 10, it may be assumed that the file has been modified between each of the cloning operations, and that also the clones may have been modified. For example, if the file is not modified before cloning again since the previous cloning operation, the newly created clone may, alternatively to the structure of FIG. 10, also reference the same existing parent snapshot-file of the previous cloning operation and no new snapshot-file needs to be created.

The dashed line in FIG. 10 separates the hidden snapshot-file objects SF1 to SF4 from the user visible objects like the file VM and the clones C1 to C4. Of course, if one or more of the clones are cloned, the tree of snapshot-files (also herein referred to as a "snapshot-file tree") may become more complex in structure compared to the rather simple structure of a single chain of snapshot-files SF1 to SF4 in FIG. 10, please see e.g. the tree in FIG. 11.

Figure 11:
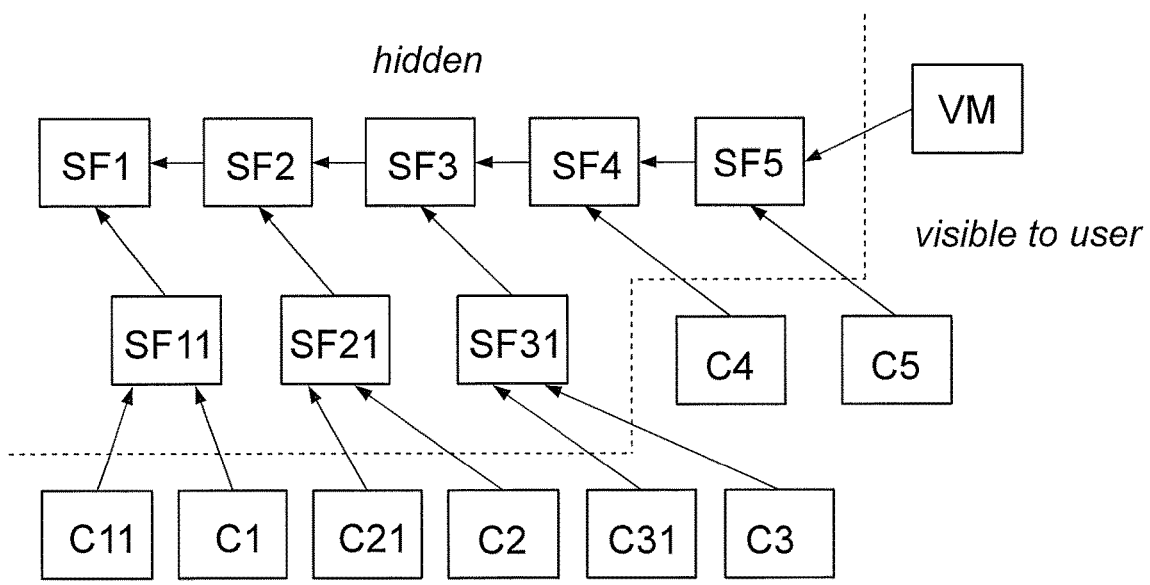
FIG. 11 shows an example of the snapshot-file tree of FIG. 10 at a later time.

In the example of FIG. 11, the snapshot-file tree comprises the snapshot-files SF1 to SF4 similar to the tree of FIG. 10, but new snapshot-files SF11, SF21 and SF31 have been added by cloning the clones C1 to C3 and creating clones thereof referred to as C11, C21 and C31 in FIG. 11. In addition, file VM has been cloned again by creating another snapshot-file SF5 and a new clone C5.

With reference to the example of FIG. 11, the relationship terms between snapshot-files shall be exemplarily specified as follows. A direct successor is referred to as "child", "child snapshot-file", "successor" "successor snapshot-file". For example, in FIG. 11, SF2 and SF11 are the children of SF1 and SF5 is the child of SF4.

Please note that the term "successor" and "child" may be used with the same meaning in the sense that a "successor" of a certain snapshot-file directly references the certain snapshot-file, while later related generations may be referred to as "indirect successors", e.g., while SF3 is not the successor of SF1 because it directly references SF2 and not SF1, SF3 may still be referred to as an indirect successor of SF1.

Vice versa, a direct ancestor is referred to as "parent" or "parent snapshot-file" so that SF1 is the parent of SF11 and SF2 and SF4 is the parent of SF5. The term "ancestor" or "ancestor snapshot-file" refers to all snapshot-file of earlier generations being directly or indirectly related (i.e. in direction of the arrows of FIG. 11).

Accordingly, the root snapshot-file SF1 (a "root snapshot-file" being the single snapshot-file of the tree that does not itself reference another parent snapshot-file, i.e. the snapshot-file of the tree without parent) is an ancestor of all other snapshot-files SF2 to SF5, SF11, SF21 and SF31. SF3 is only ancestor for SF4, SF5 and SF31, while having its own ancestors SF1 and SF2. Also, SF2 has only one ancestor, namely, its own parent SF1.

6.2 Changing Snapshot-File Parents

As mentioned above, when a clone is deleted, although the reference count of the snapshot-file referenced to by the clone will decrease, as a hidden and read-only object that cannot be manually deleted by the user because it is hidden, the respective snapshot-file will not be removed and may therefore remain in the file system, unless additional functions of removing snapshot-file and/or changing parent snapshot-files are implemented. Such situation may lead to a configuration in which blocks that have been only shared between the respective snapshot-file and the clone prior to deletion of the clone will still be pointed to by the respective snapshot-file although not pointed to by any user visible object.

Figure 12A:
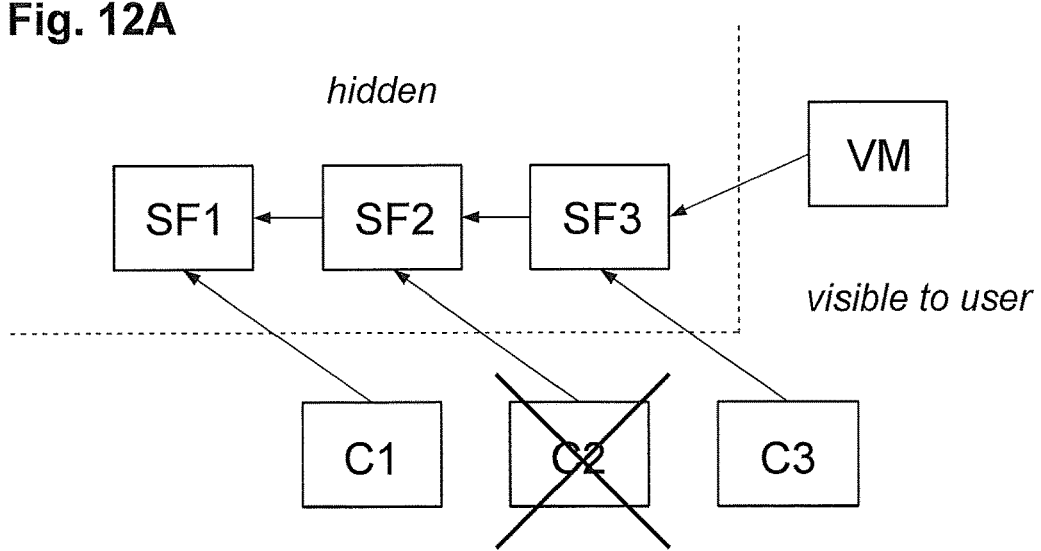
FIGS. 12A to 12C exemplarily illustrate an example of removing a snapshot-file SF2 and changing a parent snapshot-file of another snapshot-file SF3 in accordance with exemplary embodiments.
Figure 12B:
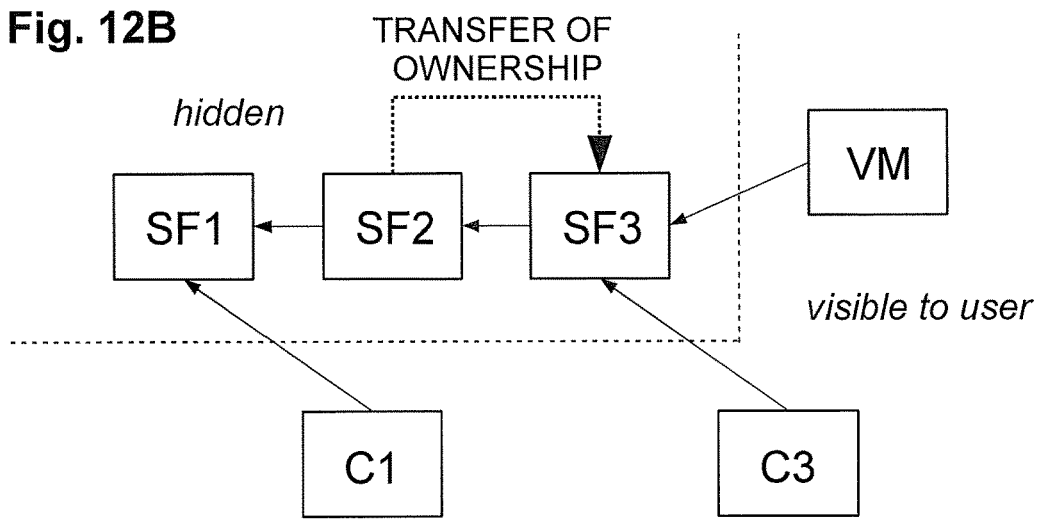
Figure 12C:
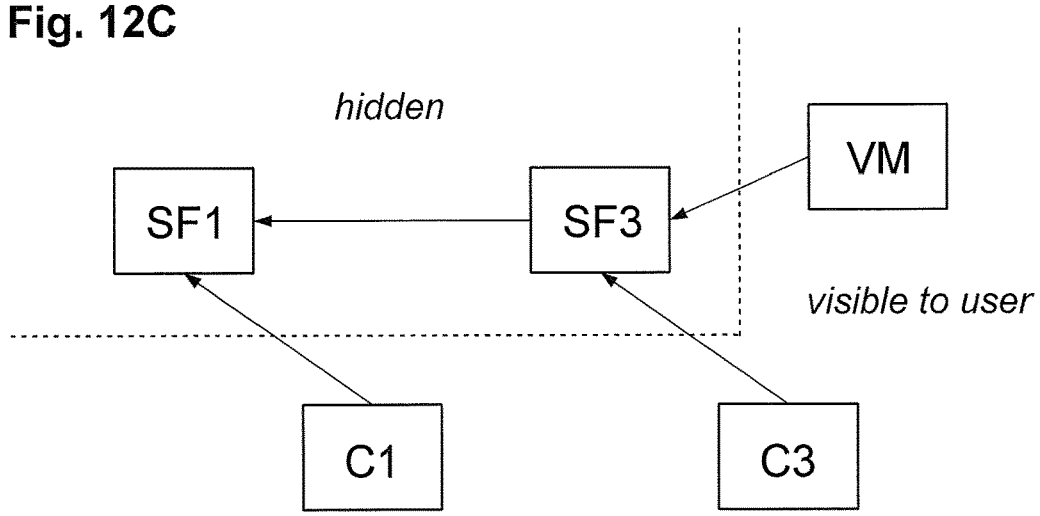

An example of such situation is illustrated with respect to FIGS. 12A to 12C. In a chain of snapshot-files SF1 to SF3 as shown in FIG. 12A and having clones C1 to C3 e.g. due to three times performing a cloning operation of a file VM, if the clone C2 is deleted (see FIGS. 12A and 12B), e.g. by a user, the snapshot-file SF2 that was previously referenced by the deleted clone C2 may become obsolete, because no visible object references the snapshot-file SF2 (see FIG. 12B), and it may be desirable to delete the snapshot-file SF2 to free blocks of storage space and to simplify the tree structure so as to arrive at a structure such as shown in FIG. 12C.

In order to increase storage space efficiency, a mechanism may be implemented according to which a parent snapshot-file of a certain snapshot-file is changed by removing the parent and making the previous closest indirect ancestor the new parent snapshot-file.

However, before deleting the snapshot-file SF2 and thereby freeing all of the data blocks owned by the snapshot-file SF2, the ownership of the data blocks that are shared with the child (in this case snapshot-file SF3) are transferred from the snapshot-file SF2, which is to be deleted, to its child snapshot-file SF3 as indicated by the arrow "transfer of ownership" in FIG. 12B. This makes sure that all data blocks needed (pointed to) by the child snapshot-file SF3 and potentially also by its direct and indirect successors are not unintentionally freed, while all data blocks that are owned by the snapshot-file SF2, which is to be deleted, but which are not shared (unshared data blocks) with the child snapshot-file SF3 will be freed automatically upon deletion of the snapshot-file SF2.

Accordingly, according to embodiments of the invention, there can be provided a process of removing a first snapshot-file of a snapshot-file tree in a file system which has a second snapshot-file as child snapshot-file. It is to be noted that removing a first snapshot-file of a snapshot-file tree in a file system which has a second snapshot-file as child snapshot-file is to be distinguished from "de-cloning of a file" as explained above and as disclosed in US 2012/0130949 A1 in which "de-cloning of a file" refers to removing a snapshot-file in a file system which has a mutable file as child, wherein ownership of shared blocks is transferred to a mutable file in contrast of transfer of ownership from a snapshot-file to another child snapshot-file thereof as in the process described in this section.

Figure 13:
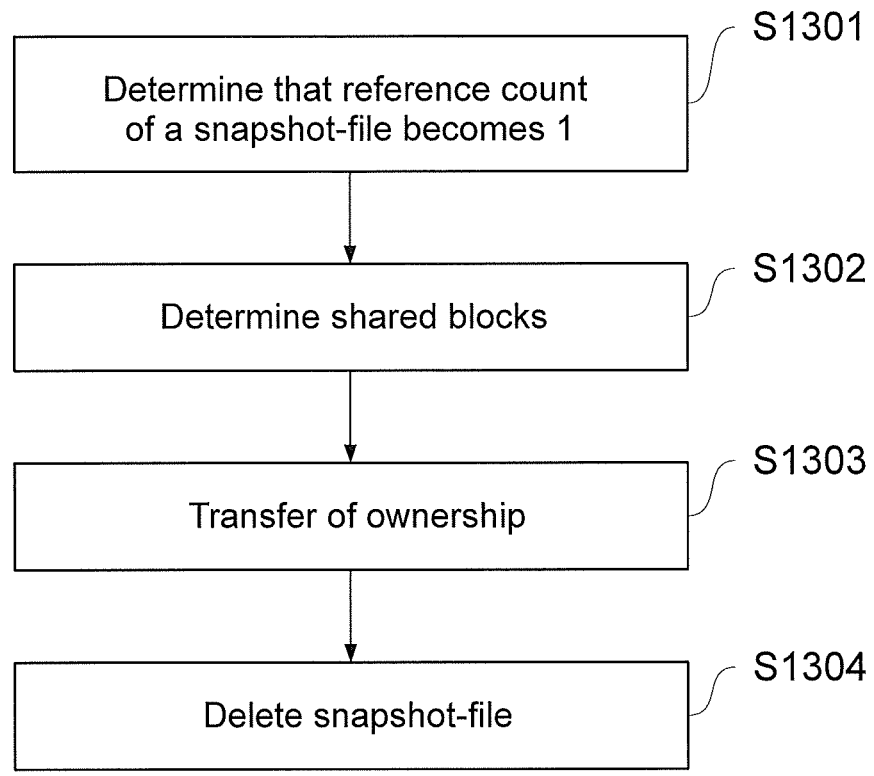
FIG. 13 is an exemplary logic flow diagram schematically showing removing a snapshot-file and/or changing a parent snapshot-file in accordance with exemplary embodiments.

An example of a process of removing a first snapshot-file of a snapshot-file tree in a file system which has a second snapshot-file as child snapshot-file is illustrated with reference to the exemplary flow chart of FIG. 13. In step S1301, it is determined that the reference count of a certain snapshot-file, which is referenced by at least one other snapshot-file, has become 1, e.g. as in FIGS. 12A and 12B in which the reference count of snapshot-file SF2 has become 1 after deletion of clone C2 due to the only remaining referencing by its child snapshot-file SF3.

Here, in some embodiments, the step S1301 may be executed such that a walker fiber may repeatedly analyze the reference counts of the snapshot-files of a snapshot-file tree to trigger the process (or create a job in a job queue to instruct the process) as soon as it is determined by the walker fiber that a reference count of one of the snapshot-files has become 1. In other embodiments, it is also possible, that deletion of a clone (identified for example by a flag indicating that it is a clone) triggers the process (or create a job in a job queue to instruct the process).

In step S1302, the process determines, among the one or more blocks owned by the certain snapshot-file of step S1301, the one or more data blocks that are shared between the certain snapshot-file of step S1301 and its child snapshot-file. For example, in FIG. 12B, it is determined which of the block(s) owned by SF2 are shared with its child SF3.

In step S1303, the ownership of the one or more data blocks that are shared between the certain snapshot-file of step S1301 and its child snapshot-file as determined in step S1302 is transferred to the child snapshot-file.

Accordingly, after execution step of step S1303, the child snapshot-file will own the one or more data blocks that are shared between the certain snapshot-file of step S1301 and its child snapshot-file (unless owned by an ancestor of the certain snapshot-file of step S1301, because the ownership of those blocks would not be transferred but remains with the respective ancestor of the certain snapshot-file of step S1301).

According to some embodiments, transfer of ownership of data blocks from one snapshot-file to another snapshot-file can be performed according to a process as exemplarily illustrated with reference to the exemplary of FIG. 14. This process is more advantageous than the process for transfer of ownership as discussed above under section 3.2 above because it dirties less metadata.

It is to be noted that the process for transfer of ownership as discussed below can replace the method under section 3.2 and can be used also for de-cloning of files in some embodiments instead of the method under section 3.2 in order to reduce dirtying of metadata.

Generally, the process of transferring ownership may comprise a first step of setting the checkpoint number (second-type checkpoint number) of the pointers of the snapshot-file to be deleted (e.g. SF2 in FIG. 12B) that point to unshared blocks equal to or larger than the cloned-in checkpoint number (first-type checkpoint number) of its child snapshot-file (e.g. the CCN of SF3 in FIG. 12B) to which the ownership is to be transferred. In addition, after the above first step, in a second step the cloned-in checkpoint numbers (first-type checkpoint number) of the two snapshot-files are swapped.

Namely, the cloned-in checkpoint number of the snapshot-file to be deleted is increased to the value of the cloned-in checkpoint number of its child so that the unshared blocks of the first step will still be owned by the snapshot-file to be deleted, and the cloned-in checkpoint number of the child snapshot-file is decreased to the previous cloned-in checkpoint number of the snapshot-file to be deleted so that it assumes ownership of the shared blocks previously owned by the snapshot-file to be deleted (for which the pointer's CNs remain unchanged).

Thereafter, the ownership transfer is completed and the snapshot-file to be deleted can be deleted, thereby freeing the blocks still owned by it (i.e. the blocks for which the CN has changed in the first step above).

Figure 14A:
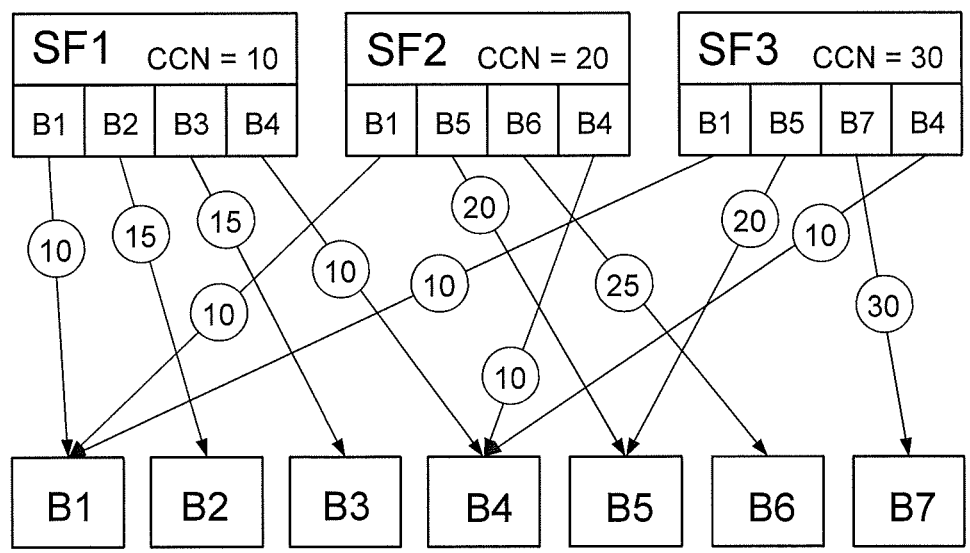
FIGS. 14A to 14C exemplarily illustrate an example of transfer of ownership in accordance with exemplary embodiments.

An example thereof is illustrated in connection with exemplary FIGS. 14A to 14C. FIG. 14A shows examples of the three snapshot-files SF1 having a CCN=10, SF2 having a CCN=20 and SF3 having a CCN=30. Exemplarily, each snapshot-file has four pointers to blocks, wherein the pointers of SF1 point to blocks B1 to B4, respectively, and the pointers to blocks B1 and B4 have CN=10, respectively, and the pointers to blocks B2 and B3 have CN=15, respectively.

Accordingly, since all of SF1's pointers' CNs are equal or larger than the CCN of SF1, SF1 owns all blocks B1 to B4. The pointers of SF2 point still to blocks B1 and B4 with unchanged CNs but SF2's remaining pointers point to blocks B5 with CN=20 and B6 with CN=25. Accordingly, since SF2's pointers to blocks B5 and B6 have CNs that are equal or larger than the CCN of SF2, SF2 owns the blocks B5 and B6, while it furthermore shares blocks B1 and B4 with SF1 that owns these blocks.

The pointers of SF3 point still to blocks B1, B4 and B5 with unchanged CNs so that it shares blocks B1 and B4 with SF1 and SF2 that are owned by SF1, and so that it still shares block B5 with SF2 which is still owned by SF2. However, the fourth pointer of SF3 points to the block B7 having a CN=30 so that it owns the block B7 because its CNN=30 is equal to the CN=30 of the pointer to block B7.

Figure 14B:
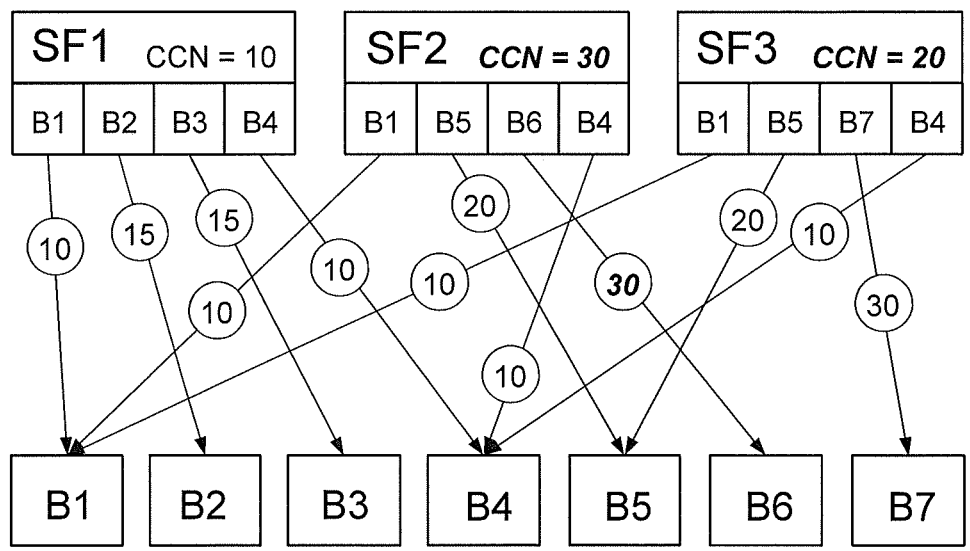

After the transfer of ownership as discussed above, the assignment of CCNs of SF1, SF2, and SF3 and CNs of their block pointers are changed to the numbers as exemplarily indicated in FIG. 14B. Namely, the CCNs of SF2 and SF2 have swapped (SF2 now having the CNN=30 and SF3 now having the CNN=20) and the CN of the block pointer to the unshared data block B6 is made equal to the previous CNN of SF3, i.e. the checkpoint number of the pointer to the unshared block B6 is made CN=30 (it could also be made larger in other embodiments noting however that it should preferably be kept, similar to all other checkpoint numbers, less than or equal to the current checkpoint number of the file system).

In this situation, the blocks B1 to B4 are still owned by SF1 and the block B7 is still owned by SF3, however, SF3 now also additionally owns the shared block B5 because its pointer's CN is now equal to the CNN of SF3. Accordingly, regarding to the shared block B5 (which was previously not owned by SF1 and never was shared with SF1 but was/is shared among SF2 and SF3) a transfer of ownership has occurred. The block B6 is however owned still by SF2.

Figure 14C:
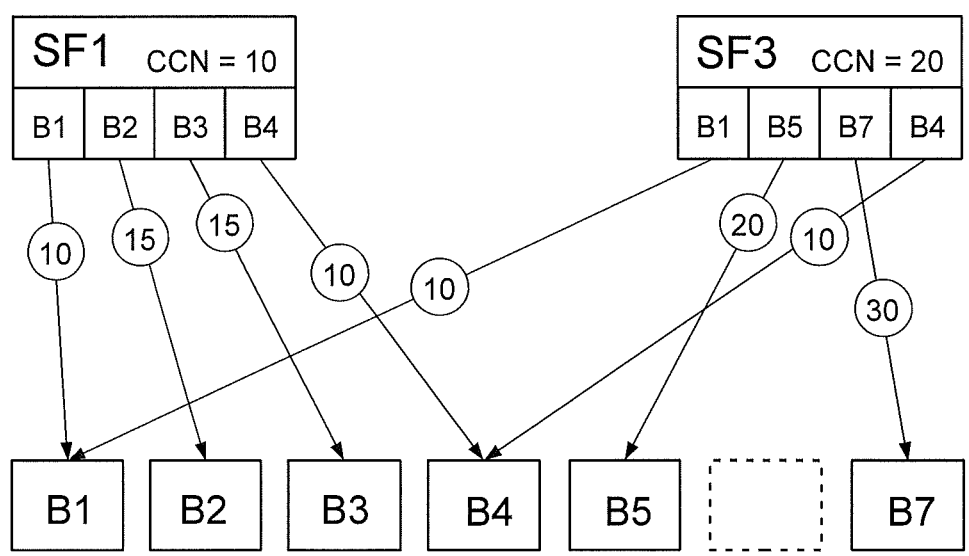

FIG. 14C shows an example after deletion of SF2 which also has the effect that block B6 has been made free as it was owned by SF2 at the time of deletion (indicated as a dashed box). Accordingly, by easy and simple algorithm and without significantly dirtying related metadata, the snapshot-file tree can be simplified and storage space can be managed more efficiently due to reliable and efficient freeing of unneeded data blocks.

6.3 Removing a Root Snapshot-File

Figure 15A:
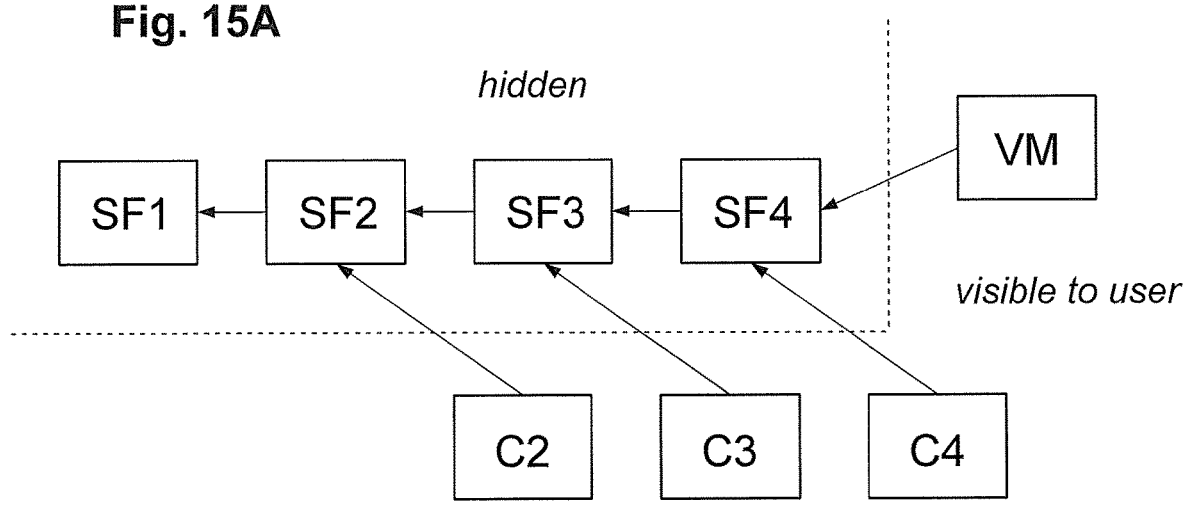
FIGS. 15A and 15B exemplarily illustrate an example of removing a root snapshot-file SF1 in accordance with exemplary embodiments.
Figure 15B:
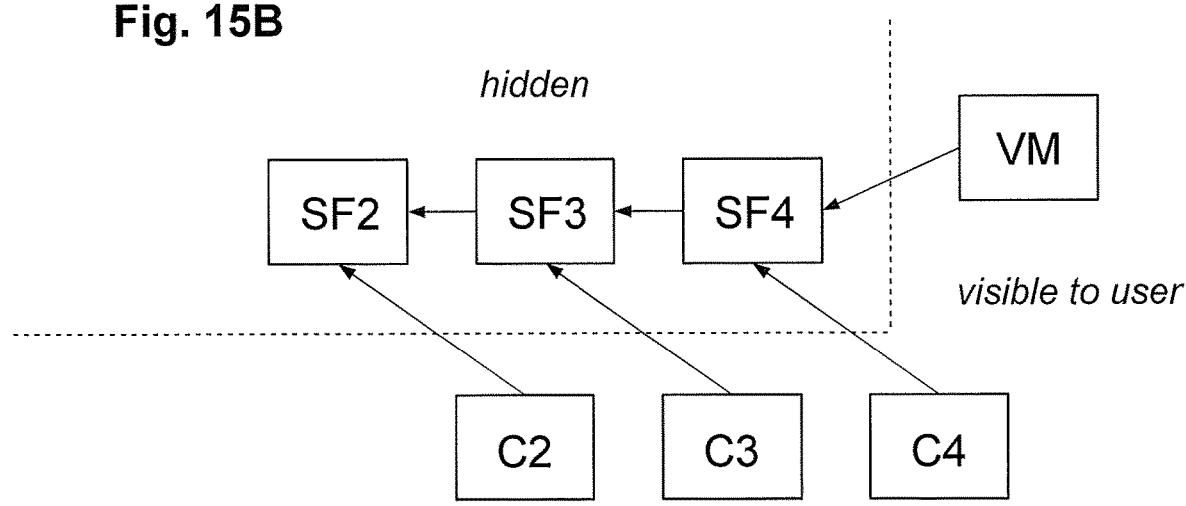

In some embodiments, there may be provided a de-cloning function in connection with de-cloning of snapshot-file in file systems in which the one or more oldest clones are manually or automatically deleted, e.g. with the intent to free storage space. For example, referring again to a snapshot-file tree as exemplarily shown in FIG. 10, if the oldest clone, i.e. clone C1, is deleted, a tree structure as shown in FIG. 15A arises which can be simplified to a tree structure as shown in FIG. 15A by removing the root snapshot-file SF1 after deletion of clone C1 upon which process the child snapshot-file SF2 of the former root snapshot-file SF1 becomes the new root snapshot-file SF2.

Similar to the terminology of "de-cloning a file" as discussed above, such process may be referred to as "de-cloning of a snapshot-file", specifically de-cloning of snapshot-file SF2, performed by removing the parent (while in the process of section 6.2 above, the term "de-cloning" might be inappropriate because the parent is changed and not removed in the sense that there is no parent after completing the process).

An example of a process of removing a root snapshot-file of a snapshot-file tree in a file system which has a second snapshot-file as child snapshot-file of the root snapshot-file is illustrated with reference to the exemplary flow chart of FIG. 16. In step S1601, it is determined that the reference count of a root snapshot-file, which is referenced by at least one other snapshot-file, has become 1, e.g. as in FIG. 15A in which the reference count of root snapshot-file SF1 has become 1 after deletion of clone C1 due to the only remaining referencing by its child snapshot-file SF2.

The steps S1602 of determining shared blocks between the root snapshot-file and its child snapshot-file, S1603 of transferring ownership of shared blocks from the root snapshot-file to its child snapshot-file, and S1604 of deleting the root snapshot-file after the transfer of ownership can be executed similar to steps S1302 to S1304 as explained in connection with FIG. 13 above.

Specifically, according to some embodiments, transfer of ownership of data blocks from one snapshot-file to another snapshot-file can be performed according to the process as exemplarily illustrated with reference to the exemplary of FIG. 14.

Figure 16:
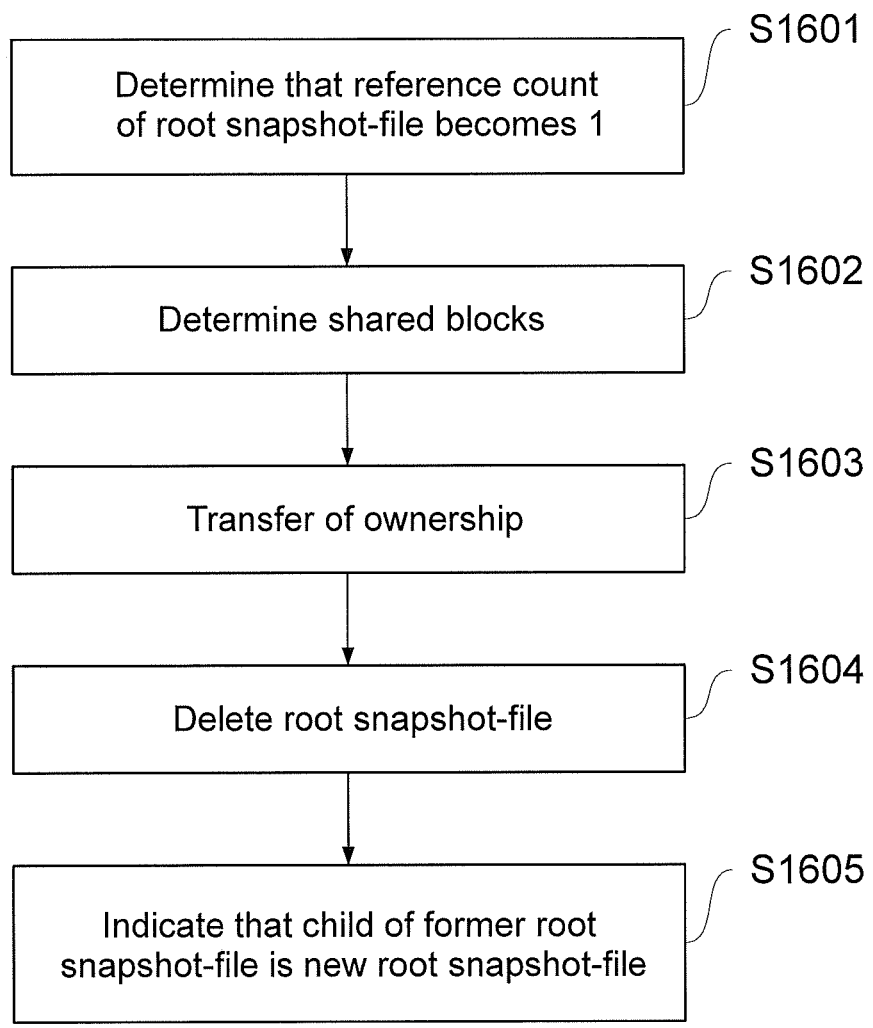
FIG. 16 is an exemplary logic flow diagram schematically showing removing a root snapshot-file in accordance with exemplary embodiments.

In addition, the process of FIG. 16 comprises an additional step S1605 of indicating that the child snapshot-file of the former root snapshot-file (that has been deleted in step S1604) is the new root snapshot-file of the snapshot-file tree. Such step may be performed, for example, by setting a respective flag (or alternatively unsetting a respective flag) associated with the new root snapshot-file to a value indicating that the new root snapshot-file is the root snapshot-file of the tree.

6.4 Removing a Chain of Snapshot-Files

In some embodiments, there may be provided a tree simplifying function in connection with a chain of multiple snapshot-files in file systems in which the plural subsequent clones are manually or automatically deleted (e.g. automatically removing the N oldest clones with N being two or more, or also automatically removing N multiple subsequent older clones, with N being two or more, but at the same time keeping the M oldest clones with M being one or more), e.g. with the intent to free storage space.

For example, referring again to a snapshot-file tree as exemplarily shown in FIG. 10, if the three oldest clones, i.e. clones C1 to C3, are deleted, a tree structure would arises in which the chain of connected snapshot-files SF1 to SF3 of the snapshot-file tree each have reference count 1 only, and the tree structure can be simplified to a structure in which SF4 will represent the root snapshot-file and only files VM and C4 will exist in the user visible domain of the file system.

Figure 17A:
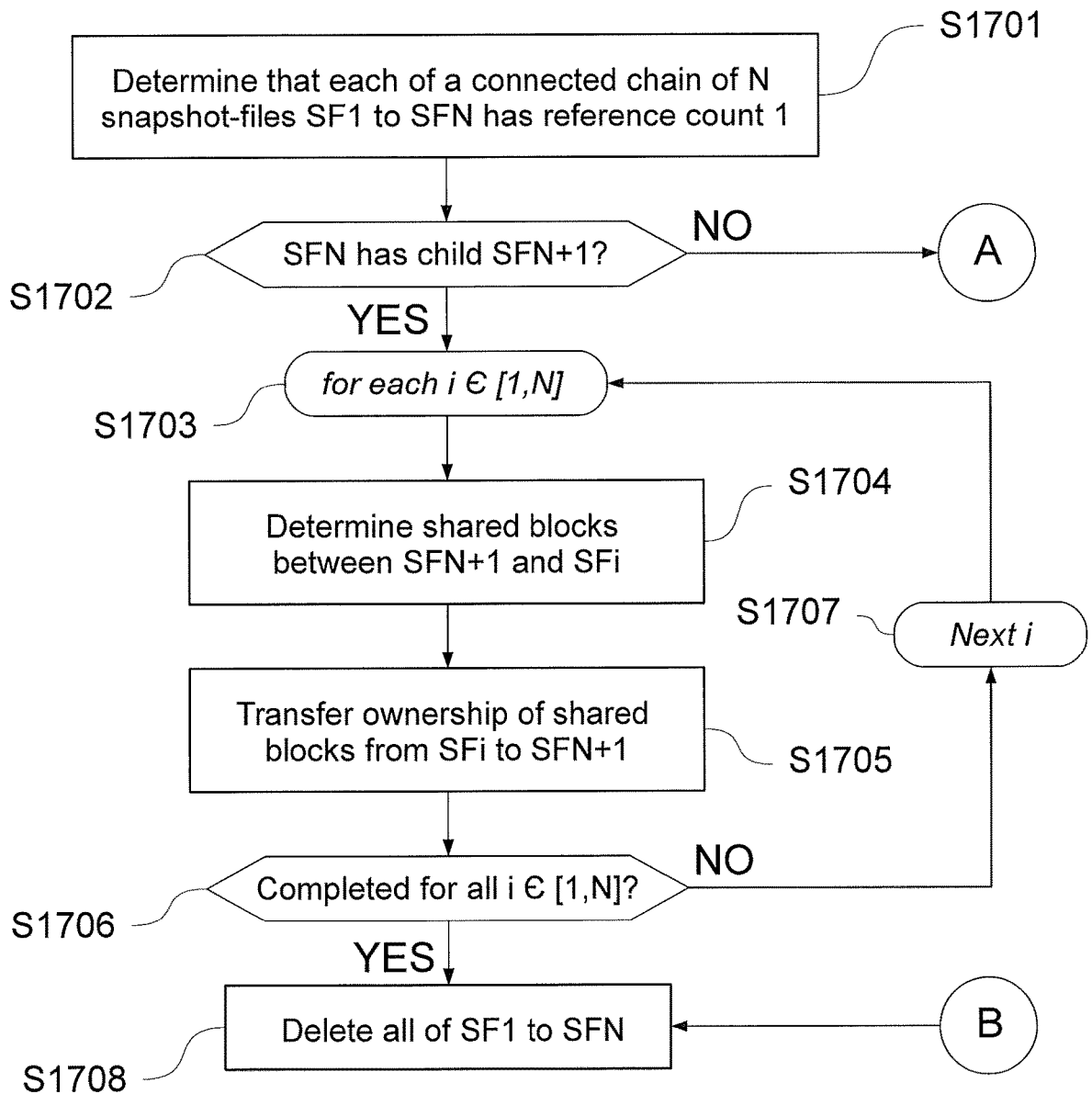
FIGS. 17A and 17B exemplarily illustrate an exemplary logic flow diagram schematically showing removing a connected chain of snapshot-files in accordance with exemplary embodiments.
Figure 17B:
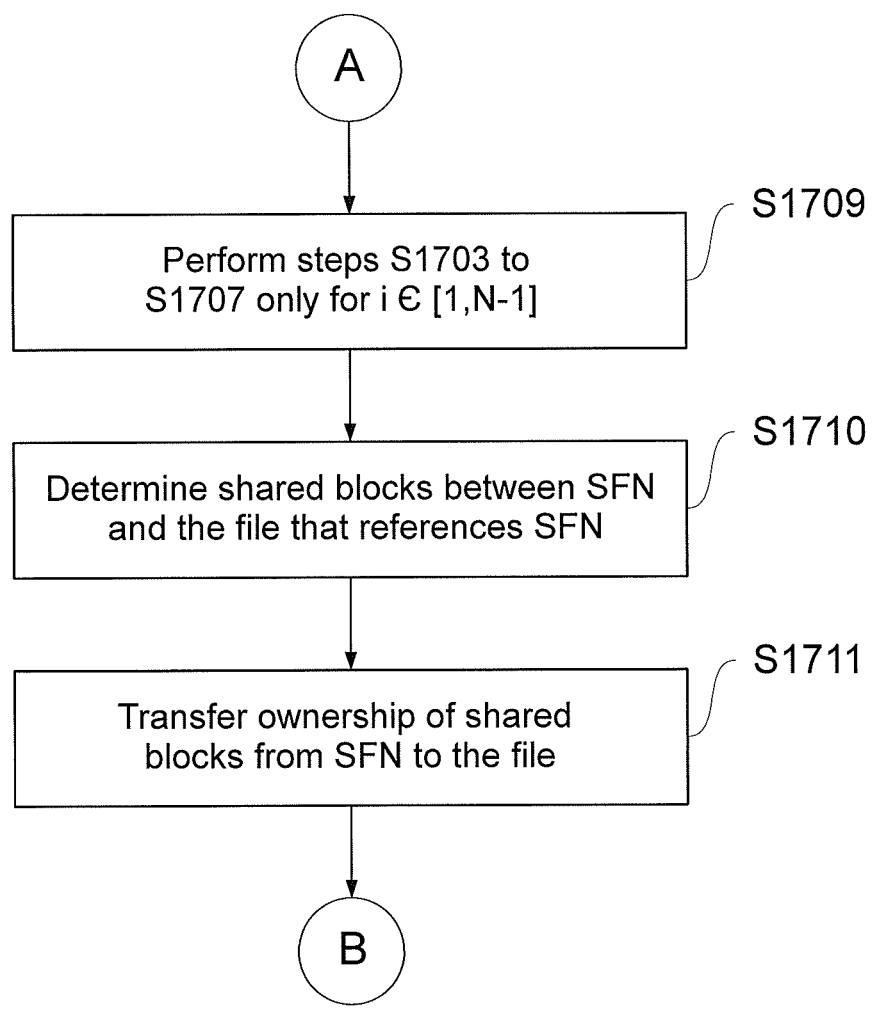

FIGS. 17A and 17B exemplarily illustrate an embodiment in which a chain of plural N interconnected snapshot-files SF1 (may be but is not necessarily a root snapshot-file) to SFN is removed from a snapshot-file tree in a file system. The term "chain" means that SFN is the child of SFN-1, SFN-1 is the child of SFN-2, . . . , and SF2 is the child of SF1, or in other words, all of SF1 to SFN-1 are connected ancestors of SFN (SFN-1 being the parent of SFN, SFN-2 being the parent of SFN-1, etc.), if each of the snapshot-files of the chain of plural N interconnected snapshot-files SF1 to SFN has reference count 1.

In step S1701, it is determined that each of the snapshot-files of the chain of plural N interconnected snapshot-files SF1 to SFN has reference count 1, and it is checked in step S1702 whether the newest (youngest) snapshot-file SFN of the chain has a child snapshot-file SFN+1 or not. If step S1702 returns YES (i.e. SFN has a child snapshot-file SFN+1), the process continues with step S1703, or if step S1702 returns NO (i.e. the child of SFN is a single live-file of the file system, that is a non-hidden mutable/writable file, for example), the process continues with step S1709 of FIG. 17B described further below. It is to be noted however that theoretically, there is no need to specify the case in which S1702 returns NO, since it does not matter if the object that receives ownership of the shared blocks is another snapshot-file or a live file as the algorithm can be applied to both (see the exemplary embodiment of FIG. 17C).

In step S1703, the process goes through each i being from the set [1, N], i.e. i=1, 2, . . . , N–1, N. In some embodiments, the set [1, N], i.e. i=1, 2, . . . , N–1, N is iteratively walked through starting at i=N and going down to i=1 iteratively. In the step S1704, for the current i from the set [1, N], the blocks that are shared between the snapshot-file SFi and the snapshot-file SFN+1 are determined, and step S1705 transfers ownership of the blocks determined in step S1704 from the snapshot-file SFi to the snapshot-file SFN+1 (e.g. similar to the transfer of ownership processes as described above under sections 6.2 and/or 6.3).

Here, it may be noted that in some file systems it may not be possible to determine the number of ancestors of a snapshot-file without finding all the parents. Then, the "for all"-loop (steps S1703 through S1706) may be achieved by a corresponding while-loop, e.g. remaining in the loop by going to the next parent as long as the root snapshot-file is not reached, i.e. step S1706 returns YES if the root snapshot-file is reached. Such algorithm may preferably be applied especially in file systems which automatically remove the N oldest clones (with N being two or more), thereby leaving a chain of N oldest snapshot-files (including the root snapshot-file) with reference count 1 (see the exemplary embodiment of FIG. 17C).

In step S1706, it is checked whether steps S1704 and S1705 are executed already for each i being from the set [1, N]. If the step returns YES, the step S1708 deletes all snapshot-files SF1 to SFN and thereby frees all blocks that are still owned by one of snapshot-files SF1 to SFN, and the process ends.

In this connection, it is to be noted that instead of deleting all snapshot-files SF1 to SFN together in one single step S1708, it may be even more advantageous to delete each respective parent snapshot-file directly after its ownership transfer has completed (i.e. within the loop and respectively after step S1705 or at least before step S1707 for each single snapshot-file of the loop) for the reasons that: (i) the parent snapshot-file is no longer needed and (ii) the number of snapshot-files is theoretically unbound and saving them in a list or table or other log should preferably be avoided. Therefore, iterating to the next snapshot-file in step S1707 within the loop is in the more preferable embodiments performed after deleting the respective single snapshot-file of the current iteration (see the exemplary embodiment of FIG. 17C).

It is to be further noted that in embodiments in which i is iteratively walked through starting at i=N and going down to i=1 iteratively, the step S1706 returns YES if it is determined that i=1. Accordingly, as mentioned above, the loop may represent a while-loop (e.g. while the snapshot-file of the current iteration is not yet the root snapshot-file, see the exemplary embodiment of FIG. 17C).

However, in other embodiments, it is possible to parallelize the steps S1704 and S1705 so that these steps can be performed in parallel for different i, thereby even further increasing the efficiency of the process.

For example, the step S1705 of transfer of ownership can be executed according to another algorithm as described in the following.

Generally, the process comprises plural first steps, one first step for each i being from the set of [1, N], of setting the checkpoint number (second-type checkpoint number) of the pointer's of the snapshot-file SFi to be deleted that point to unshared blocks equal to or larger than the cloned-in checkpoint number (first-type checkpoint number) of the snapshot-file SFN+1 to which the ownership is to be transferred.

In addition, after the above first steps, in a second step, the cloned-in checkpoint number (first-type checkpoint number) of the snapshot-file SFN+1 is set as the cloned-in checkpoint number (first-type checkpoint number) of the oldest snapshot-file SF1 to be deleted, and the cloned-in checkpoint number (first-type checkpoint number) of the snapshot-files SF1 to SFN are set to the previous cloned-in checkpoint number (first-type checkpoint number) of the snapshot-file SFN+1.

Namely, the cloned-in checkpoint numbers of the snapshot-files SF1 to SFN to be deleted are increased to the value of the cloned-in checkpoint number of the snapshot-file SFN+1 so that the respective unshared blocks (unshared with SFN+1, but not necessarily unshared among each other) of the first steps will still be owned by the respective snapshot-files SF1 to SFN to be deleted, and the cloned-in checkpoint number of the snapshot-file SFN+1 is decreased to the previous cloned-in checkpoint number of the oldest snapshot-file SF1 to be deleted so that it assumes ownership of all shared blocks previously owned by one of the snapshot-files SF1 to SFN to be deleted.

Accordingly, all of the N first steps to be executed for each of SF1 to SFN can be executed in ordered sequence (e.g. from i=1 to i=N, or in reverse order from i=N to i=1) or in any unordered sequence, and more preferably, the steps can be parallelized (e.g. in that plural working fibers execute first steps in parallel and independent from each other).

Thereafter, after executing the first steps for all i and executing the second step, the ownership transfer is completed and all snapshot-files SF1 to SFN to be deleted can be deleted, thereby freeing the blocks still owned by them (i.e. the blocks for which the CN has changed in the first steps above).

Referring to FIG. 17B, if step S1702 of FIG. 17A returns NO because the snapshot-file SFN is referenced by a file but does not have a child snapshot-file, the process continues with step S1709 in which all steps S1703 to S1707 are executed in accordance with the above, however, with the difference that these steps S1703 to S1707 are executed only for each i being from the set [1, N−1] but not for i=N.

Regarding SFN, it is determined in step S1710 which blocks owned by SFN (after the execution of all steps S1705 for i being from the set [1, N−1]) are shared with the file that references the snapshot-file SFN, and based on the determination, ownership of all those shared blocks determined in step S1710 is transferred from SFN to the file in step S1711 (e.g. as described above in connection with de-cloning of files).

Then, the method continues with step S1708 and deletes all snapshot-files SF1 to SFN. Of course, in embodiments, in which the snapshot-files SF1 to SFN−1 are already being deleted directly and respectively after or within step S1709 (i.e. between steps S1705 and S1707 of the current iteration for each item), step S1708 only deletes the remaining snapshot-file SFN.

In the exemplary embodiment of FIG. 17C, the algorithm is modified according to a preferable example for file systems in which one or more oldest clones are automatically deleted, such as e.g. described in connection with FIG. 16.

In step S1701' it is determined that the reference count of a snapshot-file SFN has become 1. That means that SFN and its potential ancestors, if any, may be deleted after transfer of ownership of shared blocks to its child (which may be another snapshot-file SFN+1 or the live file). Then, for i=N (step S1703') the process goes to step S1704' and determines all shared blocks that are shared between snapshot-file SFi and its child (snapshot-file SFN+1 or the live file), and the ownership of the shared blocks may be transferred according to one of the above algorithms.

In the next step S1706' it is checked whether the snapshot-file SFi was the root snapshot-file (e.g. by determining whether a root flag is set or whether a non-root flag is unset or by determining whether SFi references a parent snapshot-file), and if step S1706' returns NO, the process deletes the snapshot-file SFi in step S1707' and goes to the next i→i−1 in step S703' to execute the next iteration in the loop.

However, if step S1706' returns YES, the process deletes the snapshot-file SFi in step S1708' and indicates, only if the child of SFN was not the live file, that the snapshot-file SFN+1 is the new root snapshot-file and ends. For example, regardless of whether the child of SFN is a live file/clone or a snapshot-file, its state (e.g. by setting and/or unsetting one or more flags) can be changed to indicate that it is no longer a cloned object. Exemplarily, in the above, a root flag may be set or a non-root flag may be unset in metadata of the snapshot-file SFN+1, or it may be indicated that the snapshot-file SFN+1 does not reference any parent snapshot-file.

7. REPLICATING REMOVING SNAPSHOT-FILES

While the above section 6 relates to the general aspects and embodiments in connection with removing snapshot-file in a snapshot-file tree in a file system, such process may be completely independent of replication and function without performing replication thereof.

Specifically, the processes and embodiments described above under section 6 can be performed in a file system that is not replicated or also in a file system that represents a source file system being replicated to one or more target file systems.

Exemplarily, the present section 7 assumes that one or more of the processes as described in section 6 are executed at the source file system. Accordingly, the present section 7 relates to replicating one or more file system objects from a source file system of a source side to a target file system of a target side in a data storage system.

The file system object to be replicated may comprise or represent a snapshot-file (target snapshot-file) that already exists in the target file system but the corresponding source snapshot-file has been modified in the source file system since the last replication snapshot in that a parent snapshot-file thereof has been removed in the source file system.

That is, the corresponding target snapshot-file still has a parent snapshot-file in the target file system which has no corresponding source snapshot-file anymore. Below embodiments relate to replication of the removal of the corresponding parent snapshot-file in the target file system.

However, embodiments below are proposed to reliably and efficiently make sure that ownership of blocks shared between the respective target snapshot-file and its parent snapshot-file in the target file system is executed before removing the parent snapshot-file in the target file system.

Figure 18:
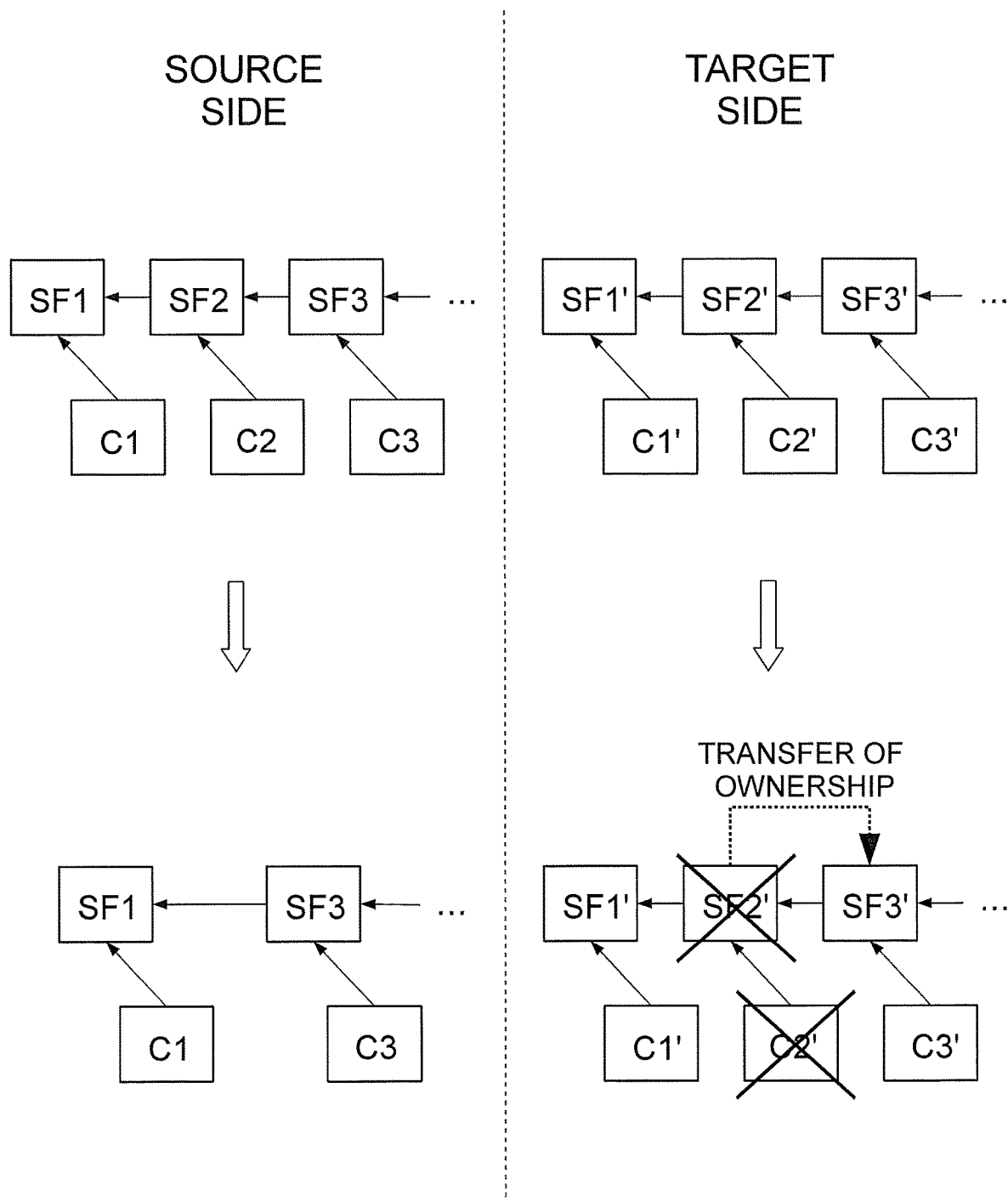
FIG. 18 exemplarily illustrates an example of replicating removing a snapshot-file at a target side in accordance with exemplary embodiments.

An exemplary situation is illustrated in FIG. 18, in which a source file system has a snapshot-file tree that comprises a chain of snapshot-files SF1 to SF3, wherein each of the snapshot-files SF1 to SF3 is referenced by its respective child and a respective clone C1, C2 and C3 (wherein it is not important for the below example(s) whether SF3 is referenced by another snapshot-file SF4 or the live file VM in addition to clone C3).

The same snapshot-file tree is already replicated on the target side with target snapshot-files SF1', SF2' and SF3' and clones C1', C2' and C3'. However, since the last snapshot, the source snapshot-file SF2 has been removed after deletion of clone C2, wherein ownership of shared blocks has been transferred to snapshot-file SF3 (e.g. according to one of the above described processes) and SF2 has been deleted so that the parent snapshot-file of SF3 has been changed to SF1.

Accordingly, also in the target side file system, the removal of SF2' needs to be replicated, including deleting SF2' and C2' but also transferring ownership of blocks owned by SF2' and shared with SF3' to SF3' before deleting SF2'. While the source side may know or be able to determine that replication of removal of SF2' in the target side must include transfer of ownership of blocks shared with SF3' also on the target side, it could instruct explicitly the single steps of the transfer of ownership in a new replication instruction.

However, such process would make it necessary to add further protocol messages between the source side and the target side, and it makes it difficult to manage source and target at different and independent checkpoint numbers, so that managing replication may lead to more inefficient replication and/or more overhead in communication between source and target.

Accordingly, it is an underlying idea of some embodiments, that the target side executes autonomously the transfer of ownership, once a snapshot-file shall be replicated that has been modified since the last snapshot at the source by removing/changing the parent snapshot thereof in the source file system.

However, even if the target side autonomously executes the transfer of ownership, it needs to be made sure that the corresponding block(s) previously owned by the target snapshot-file to be deleted/removed have not been freed yet, so that a deletion of the snapshot-file to be deleted should not yet have been replicated.

Accordingly, it is another underlying idea of some embodiments, that the source side orders instructions to replicate according an ordering in which an instruction (second instruction) to replicate the deletion of a source snapshot-file (e.g. based on a DELETE work item as discussed above) is transmitted to the target side after an instruction (first instruction) to replicate the modification of the snapshot-file being the child of the source snapshot-file to be deleted (e.g. based on a MODIFY work item as discussed above), which may trigger autonomous transfer of ownership at the target side from the corresponding target snapshot-file to be deleted to its child snapshot-file.

Figure 19A:
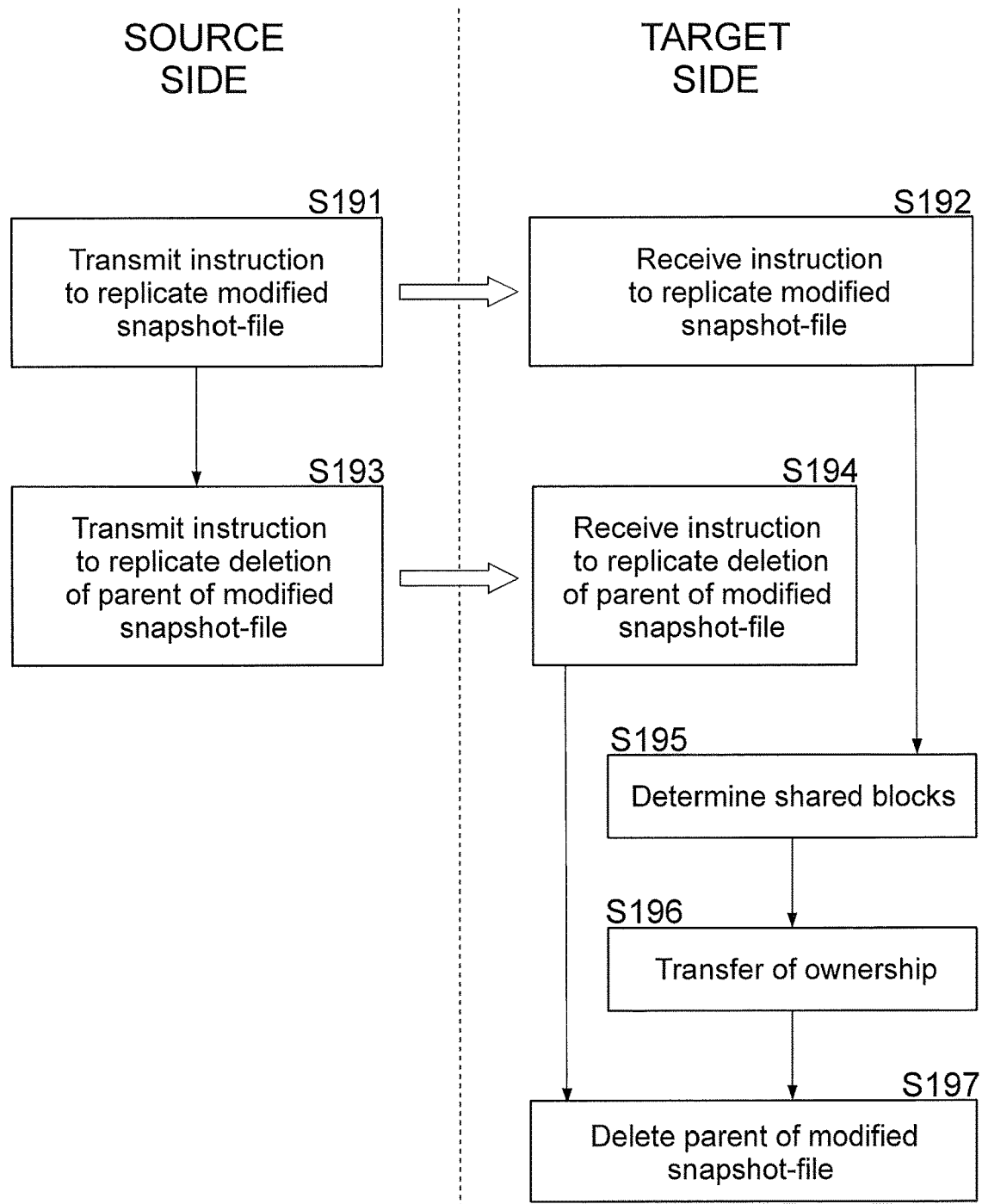
FIG. 19A is an exemplary logic flow diagram schematically showing replicating removing one or more snapshot-file at a target side in accordance with exemplary embodiments.

For example, FIG. 19A shows an exemplary flow chart in connection with a process for replicating removing/changing a parent snapshot-file of a snapshot-file. In a step S191, the source side transmits to the target side an instruction (first instruction) to replicate a modified snapshot-file (such as replicating the modification of SF3 to SF3' in FIG. 18) and thereafter, in a step S192, the source side transmits to the target side an instruction (second instruction) to replicate a deletion of the parent snapshot-file of the modified snapshot-file (such as replicating the deletion of SF3 by deletion of SF3' in FIG. 18).

On the target side, when the instruction (first instruction) to replicate a modified snapshot-file (such as replicating the modification of SF3 to SF3' in FIG. 18) is received, the target side continues with step S195 and determines all blocks that are shared between the respective target snapshot-file, e.g. SF3', and its parent snapshot-file, e.g. SF2', in the target file system and then transfers ownership of the determined shared blocks from this parent snapshot-file, e.g. SF3', in the target file system to the respective target snapshot-file, e.g. SF3'.

It should be noted that another step performed on the target side may follow after step S192 in which it is checked, at the target side, whether a source parent snapshot-file of the corresponding source snapshot-file that has been modified (and is addressed in the instruction of step S192) has been changed or has been removed.

Such analysis on the target side can be performed, e.g., by analyzing one or more flags of the respective snapshot-file that has been modified, e.g., by comparison of modified metadata included in the received instruction and metadata of the corresponding target snapshot-file. Such flag(s) may indicate, for example, whether a parent of the source parent snapshot-file has been removed since the last snapshot, whether a parent of the source parent snapshot-file has been changed since the last snapshot, whether the source parent snapshot-file has become a root snapshot-file since the last snapshot (indicating that the former root snapshot-file and basically all ancestors of the source parent snapshot-file have been removed), and/or whether the source parent snapshot-file has been de-cloned since the last snapshot (i.e. all its former one or more ancestor snapshot-files were deleted since the last snapshot) etc.

In the meantime, or after execution of step S196, the target side receives the instruction (second instruction) to replicate the deletion of the parent snapshot-file of the modified snapshot-file (such as replicating the deletion of SF3 by deletion of SF3' in FIG. 18) as transmitted from the source side in step S193, and upon receipt thereof in step S196 and upon completion of step S196 relating to the transfer of ownership, the target side executes the instruction of step S194 and deletes the parent snapshot-file, e.g. SF3', in the target file system.

It is to be noted that in preferred embodiments, the deletion of the parent snapshot-files can be made independent form the de-cloning of the snapshot-file so that the following steps can be made independent: S192 and S194, and/or S196 and S197, e.g. as shown in FIG. 19B.

Figure 19B:
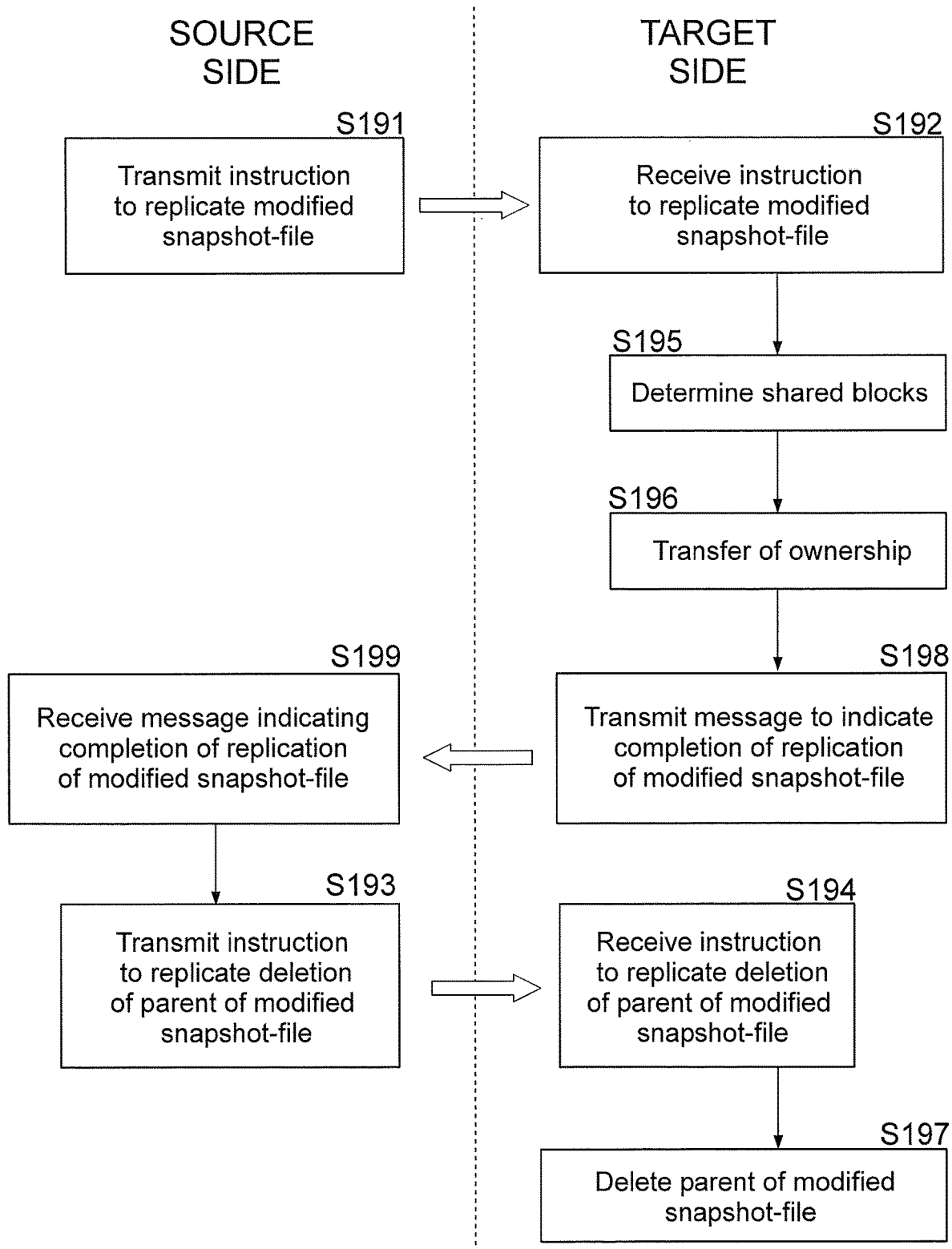
FIG. 19B is another exemplary logic flow diagram schematically showing replicating removing one or more snapshot-file at a target side in accordance with exemplary embodiments.

Specifically, in some embodiments, as shown in FIG. 19B, at the end of step S196, the target may send a message to the source to indicate that the replication of the snapshot-file has been completed (step S198), which is received in step S199 at the source side. Then, it is possible that the source may perform step S193 thereafter as shown in FIG. 19B.

In general, replicating distinct objects independently on the target as, for example, shown in FIG. 19B, is more optimal and may help to simplify the work of the target end and the management of its buffers, and also may minimize their required capacity to hold the object messages/instructions. Noting that it's possible to just delete the parent after the ownership transfer, without instruction from the source however this is unnecessary in embodiments in which the source will anyway send instruction to do that. The source cannot easily establish that a given deleted object was the parent of de-cloned snapshot-file in order to skip sending the instruction to delete it. Therefore overall, it is more optimal to let the source drive the deletion of the parents.

In the above, transfer of ownership (step S196) can be executed again according to processes as described above, e.g. under sections 6.2 to 6.4.

Figure 20A:
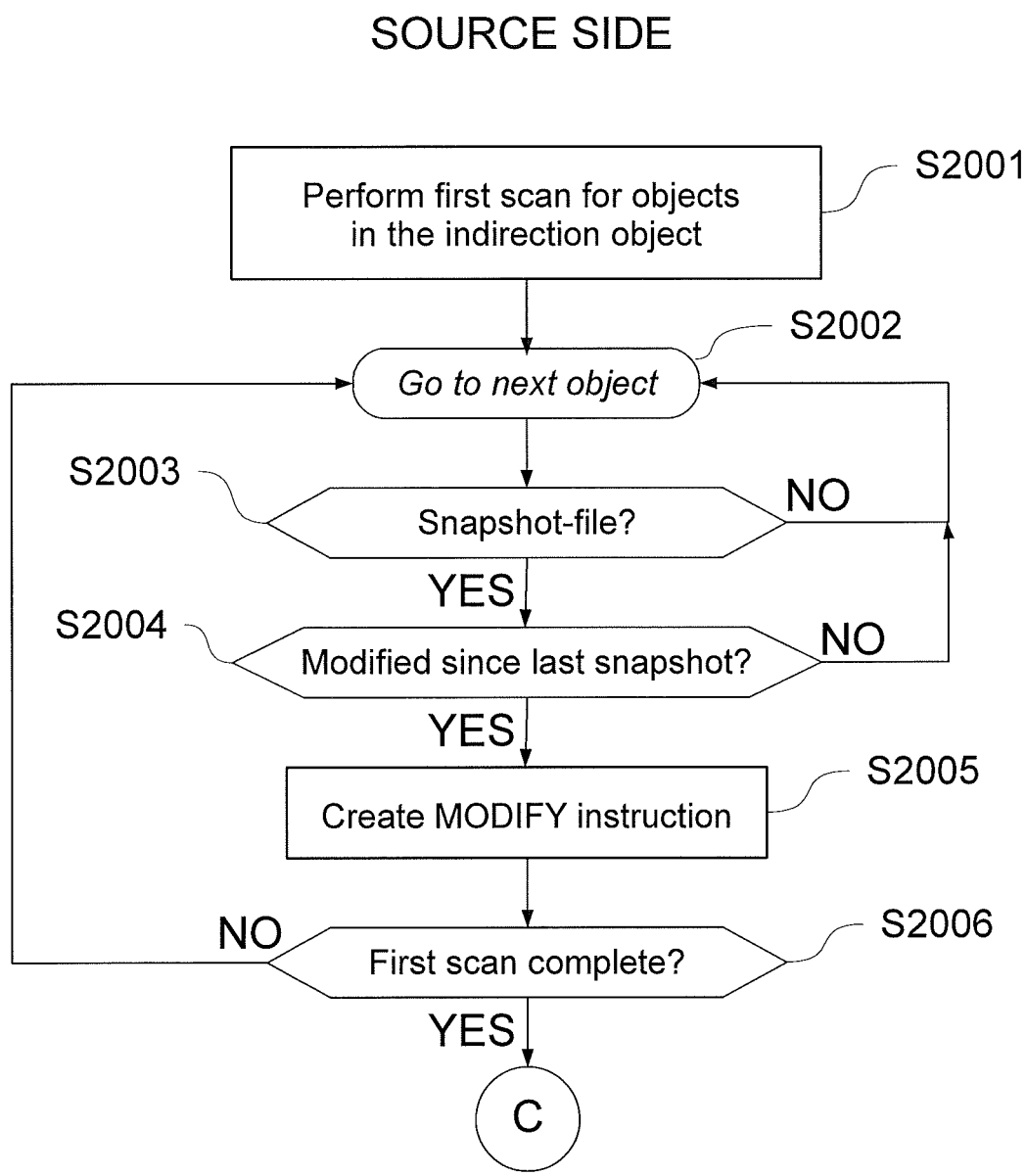
FIGS. 20A and 20B exemplarily illustrate an exemplary logic flow diagram schematically showing a source side process for replicating removing one or more snapshot-file at a target side in accordance with exemplary embodiments.
Figure 20B:
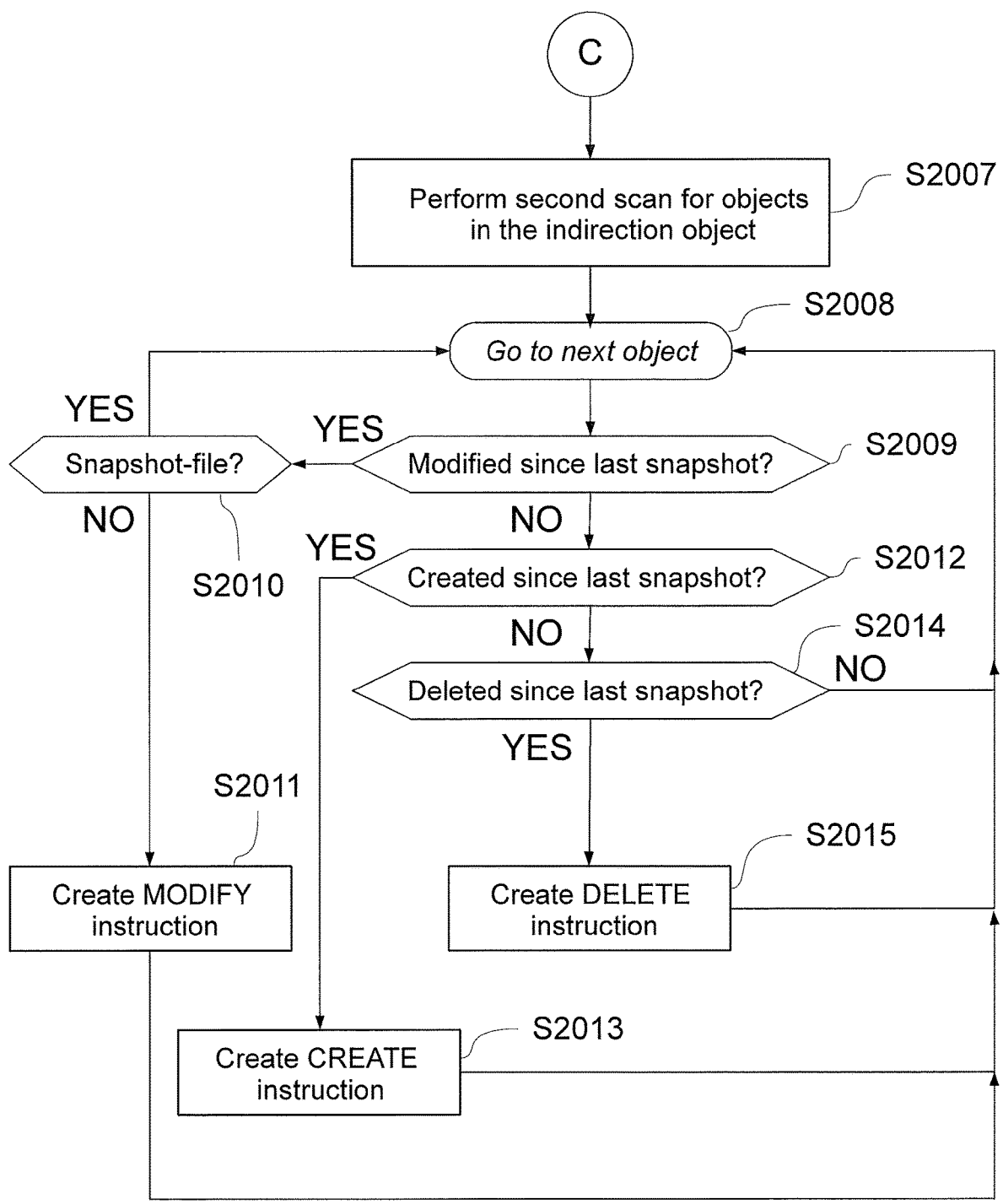

FIGS. 20A and 20B show an exemplary flow chart in connection with an embodiment of processing the creation of instructions to replicate that shall be transmitted to the target side.

In step S2001 of FIG. 20A, a first scan of an indirection object (e.g. as described above under sections 1, 2 and/or 3) of the source file system is performed in which the indirection object is either scanned as a whole or in chunks by plural work fibers in parallel.

The first scan according to FIG. 20A exemplarily comprises steps S2002 to S2006 and exemplarily starts with a step S2002 of going to a next object (or first object in the first iteration), wherein it is checked whether the object is a snapshot-file in step S2003. If step S2003 returns NO, the first scan goes to the next object (step S2002). If step S2003 returns YES, it is checked whether the object/snapshot-file has been modified since the last snapshot in step S2004. If step S2004 returns NO, the first scan goes to the next object (step S2002).

Accordingly, based on steps S2003 and S2004, the first scan ignores all objects other than snapshot-files that have been modified since the last snapshot, which includes ignoring all mutable/writable files and/or clones, ignoring any snapshot-files which remain unchanged since the last snapshot, ignoring any snapshot-files which have been created since the last snapshot, and, most importantly, ignoring any snapshot-files which have been deleted since the last snapshot.

However, if both of steps S2003 and S2004 return YES, i.e. if the object is a snapshot-file that has been modified since the last snapshot, the process creates a MODIFY instruction (e.g. embodying a first instruction) in step S2005 and goes to the next object (step S2002) if the first scan is not completed yet for all objects of the indirection object (or for all objects of the chunk of the indirection object to be scanned) when step S2006 returns NO. Otherwise, if the first scan is complete (step S2006 returns YES), the process continues with step S2007 of FIG. 20B in which a second scan of the indirection object is performed (e.g. as described above under sections 1, 2 and/or 3).

In some embodiments in which plural fibers perform the first scan in parallel, e.g. by independently scanning respective chunks of the indirection object in parallel, it is still important that one fiber does not start a second scan before the first scan is completed for all objects/all chunks.

It is to be noted that an even more advantageous algorithm for the first scan can be provided by using two separate pools of fibers for parallelization purposes. An exemplary flow chart of such parallelized process is shown in FIG. 20C.

Figure 20C:
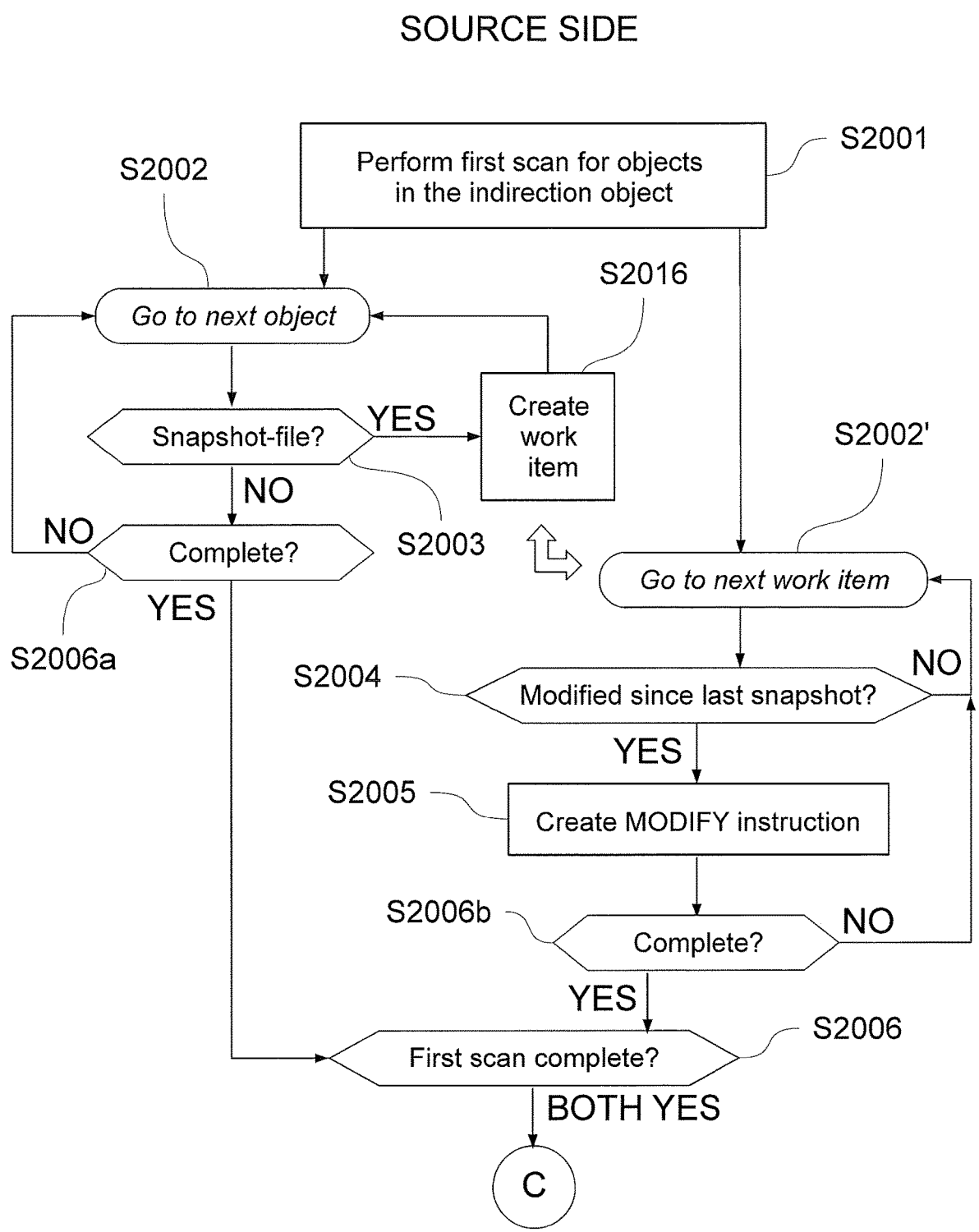
FIG. 20C exemplarily illustrate another exemplary logic flow diagram schematically showing a source side process for replicating removing one or more snapshot-file at a target side in accordance with exemplary embodiments.

In step S2001 of FIG. 20C, a first scan of an indirection object (e.g. as described above under sections 1, 2 and/or 3) of the source file system is performed in which the indirection object is either scanned as a whole or in chunks by plural work fibers in parallel.

The first scan according to FIG. 20C exemplarily comprises steps S2002 and S2003 similar to FIG. 20A. However, in case step S2003 returns YES, instead of directly executing step S2004 by the same pool of fibers or even the same fiber, a work item in step S2016 for a second separate pool of fibers is created for instructing to process the found snapshot-file.

After creating the work item for the respective snapshot-file in step S2016 or in case step S2003 returns NO, the process returns to step S2002 (unless the scan is complete when all objects in the indirection object or the respective chunk are scanned and step S2006 a returns YES) without directly performing steps S2004 and S2005 as in FIG. 20A above.

Instead, a separate pool of fibers may work through all work items as created in step S2016 and start by going to the next work item in step S2002'. Then, for the respective snapshot-file identified by the work item, step S2004 is performed, i.e. it is checked whether the respective object/snapshot-file has been modified since the last snapshot. If step S2004 returns NO, the first scan goes to the next work item (step S2002'). If step S2004 returns YES, the process creates a MODIFY instruction (e.g. embodying a first instruction) in step S2005 and goes to the next work item (step S2002') until all created work items are processed (step S2006b returns YES) and the first scan is completed (BOTH of steps S2006a and S2006b have returned YES).

Accordingly, based on steps S2003 and S2004 (even if now performed independently by different pools of fibers), the first scan still also in FIG. 20C ignores all objects other than snapshot-files that have been modified since the last snapshot, which includes ignoring all mutable/writable files and/or clones, ignoring any snapshot-files which remain unchanged since the last snapshot, ignoring any snapshot-files which have been created since the last snapshot, and, most importantly, ignoring any snapshot-files which have been deleted since the last snapshot.

However, similar to FIG. 20A, if both of steps S2003 and S2004 return YES, i.e. if the object is a snapshot-file that has been modified since the last snapshot, the process still creates the MODIFY instruction (e.g. embodying a first instruction) in step S2005 and goes to the next object (steps S2002 and S2002') if the first scan is not completed yet for all objects of the indirection object (or for all objects of the chunk of the indirection object to be scanned) when step S2006 waits for both parallel processes to be completed. If the first scan is complete (step S2006 returns YES), the process continues with step S2007 of FIG. 20B in which a second scan of the indirection object is performed (e.g. as described above under sections 1, 2 and/or 3).

In this connection, it is to be noted that step S2003 does not require reading metadata of the snapshot-file, while step S2004 may require reading the metadata of the snapshot-file, so that FIG. 20C provides an optimization in terms of processing because the fibers of the pool executing the loop of steps S2002 to S2006a does not need to access metadata of the identified snapshot-files and can scan the whole indirection object faster.

The second scan of step S2007 comprises steps S2008 through S2015 for all objects of the first scan according to repeating step S2008 of going to the next object similar to step S2002 for the first scan until all objects have been scanned and the second scan is complete.

Step S2009 determines whether the object has been modified since the last snapshot, and if the step S2009 returns YES, step S2010 determines whether the object is a snapshot-file, and when the step S2010 returns YES, the process goes to the next object in step S2008 because the object has been processed for creating an instruction to replicate already during the step S2005 in the first scan.

However, if step S2010 returns NO, e.g. if the object is a file that has been modified since the last snapshot, a corresponding MODIFY instruction to replicate the modified object is created in step S2011.

If step S2009 returns NO, step S2012 checks whether the object has been created since the last snapshot. If step S2012 returns YES, a CREATE instruction (e.g. based on a CREATE work item as described above) is created in step S2013 as an instruction to replicate creating the respective object, be it a file or a snapshot-file.

If step S2012 returns NO, step S2014 checks whether the object has been deleted since the last snapshot. If step S2014 returns YES, a DELETE instruction (e.g. based on a DELETE work item as described above) is created in step S2015 as an instruction to replicate deleting the respective object, be it a file or a snapshot-file.

It is to be noted that similar to the optimization of FIG. 20C for the first scan, also the second scan can be optimized by having a first pool of fibers only create work items for changed objects, and the second pool of fibers accessing metadata (and user data if necessary) of the changed objects and replicates them by creating the instructions of steps S2011, S2013 and S2015. The processing fibers of the second pool can check if the object is a de-cloned snapshot-file and does not replicate it (because it already was replicated by step S2005 during the first scan).

By the above process, instructions to replicate an object can be created for any object in the source file system that needs replication, however, it is guaranteed that instructions to replicate modification of a snapshot-file (first instruction) as created in step S2005 of the first scan can be separated from the instructions to replicate deletion of a snapshot-file (second instruction) as created in step S2015 of the second scan. Then, the instructions to replicate modification of a snapshot-file (first instruction) for the modified snapshot-files can be transmitted to the target side prior to instructions to replicate deletion of a snapshot-file (second instruction) for the deleted snapshot-files.

Either the instructions to replicate modification of a snapshot-file (first instruction) for the modified snapshot-files can be sent as a first package of instructions prior to sending a second package of instructions including all the instructions to replicate deletion of a snapshot-file (second instruction) for the deleted snapshot-files, or, in other embodiments, both types of instructions can be transmitted in one package of instructions, wherein the instructions are ordered in sequence so that the instructions to replicate modification of a snapshot-file (first instruction) for the modified snapshot-files are ordered in front of the instructions including all the instructions to replicate deletion of a snapshot-file (second instruction) for the deleted snapshot-files.

In both cases, the target side can process instructions to replicate modification of a snapshot-file (first instruction) for the modified snapshot-files prior to instructions including all the instructions to replicate deletion of a snapshot-file (second instruction) for the deleted snapshot-files, including executing transfer of ownership to modified snapshot-files before deleting the parents thereof.

In the above embodiments, the first scan and the second scan are performed for the indirection object, or at least for chunks of the indirection object. Even more efficient embodiments may be provided in which the source side stores a log memory portion (e.g. a list or table) in which snapshot-files are entered, if a parent thereof is changed or removed according to any of the processes described in any of the sections 6.2 to 6.4. It is to be noted that such list of de-cloned snapshot-files may be maintained per snapshot, so if there is no snapshot, the list is empty. If there are snapshots, each snapshot "snapX" contains the list of de-cloned snapshot-files after the snapshot "snapX" and before a subsequent snapshot "snapY" (i.e. snapX+1), if any.

Then, in contrast to scanning the indirection object, the first scan could scan through the objects as entered in the log memory portion (thereafter clearing the log memory for modified snapshot-files being modified after the current snapshot for the next replication cycle).

In the second scan, which may scan all objects in the indirection object, all objects processed already based on the first scan of the log memory portion would be ignored in the second scan similar to steps S2009 and S2010 in the second scan of FIG. 20B.

8. REPLICATING REMOVING CHAINS OF SNAPSHOT-FILES

In replication of removing and/or changing parents of snapshot-files, it is possible to provide further embodiments allowing for even more efficient replication, e.g. in replicating removing a chain of snapshot-files as described under section 6.4 above, namely, in that also the target side transfers ownership from multiple ancestors to the modified (e.g. de-cloned) snapshot-file to be replicated in one step, maybe even in parallel as discussed in connection with the description of FIGS. 17A, 17B and 17C above.

For example, if the metadata of a snapshot-file indicates whether the snapshot-file is a root snapshot-file or not, e.g. by means of a flag, the target side can determine, when receiving an instruction to replicate a snapshot-file, which has been modified in the source file system since the last snapshot, whether the respective snapshot-file has become a root snapshot-file since the last snapshot or not, by comparing the modified flag according to the received replication instruction (first instruction) and the corresponding flag in the metadata of the corresponding target snapshot-file.

Figure 21A:
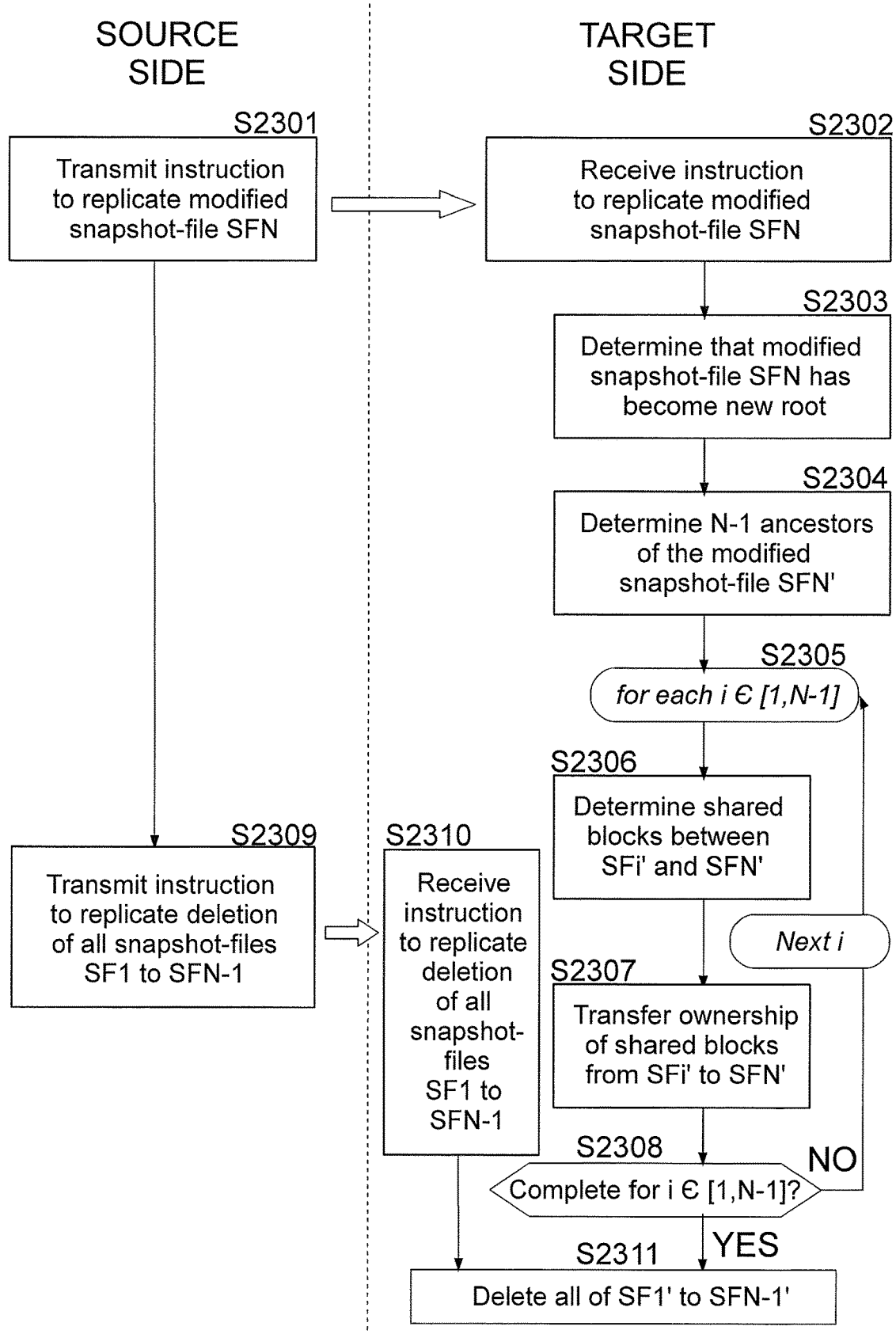
FIG. 21A is another exemplary logic flow diagram schematically showing replicating removing one or more snapshot-file (in particular a connected chain of snapshot-files) at a target side in accordance with exemplary embodiments.

Then, if it is determined that the snapshot-file to be replicated has become the new root snapshot-file, the exemplary process according to the flow chart of FIG. 21A can be provided.

Steps S2301 and S2302 correspond to steps S191 and S192 of FIG. 19A described above. However, in a next step S2303, the target side determines that the source snapshot-file SFN, which has been modified since the last snapshot, has become the new root snapshot-file of the snapshot-file tree in the source file system in step S2303.

Then, regarding the structure of the target file system, the target side determines in step S2304 that the corresponding target snapshot-file SFN' has N−1 ancestor snapshot-files (N being three or more, for example, because if N=2, the process is the similar process as in FIG. 19A).

In connection with step S2305, the target side goes through all i being comprised in the set of [1, N−1] similar to step S1703 above, and for each i being comprised in the set of [1, N−1] the steps S2306 and S2307 are performed similar to steps S1704 and S1705 above, in which the blocks that are owned by snapshot-file SFi' and shared between SFi' and SFN' are determined (step S2306) and then ownership thereof is transferred from snapshot-file SFi' to snapshot-file SFN'.

The process continues with repeating steps S2306 and S2307 for all i being comprised in the set of [1, N−1] (again in sequence, or more preferably in parallel, similar to steps S1704 and S1705 as described above) until step S2308 returns YES, if all i being comprised in the set of [1, N−1] have been considered.

Thereafter, and after receiving the (second) instructions to replicate deletion of the snapshot-files SF1 to SFN-1 in step S2310 (steps S2309 and S2310 corresponding basically to steps S193 and S194 above, except that deletion of multiple snapshot-files is instructed in one instruction message or in plural distinct instruction messages), the target side deletes the snapshot-files SF1' to SFN-1' in step S2311.

Figure 17C:
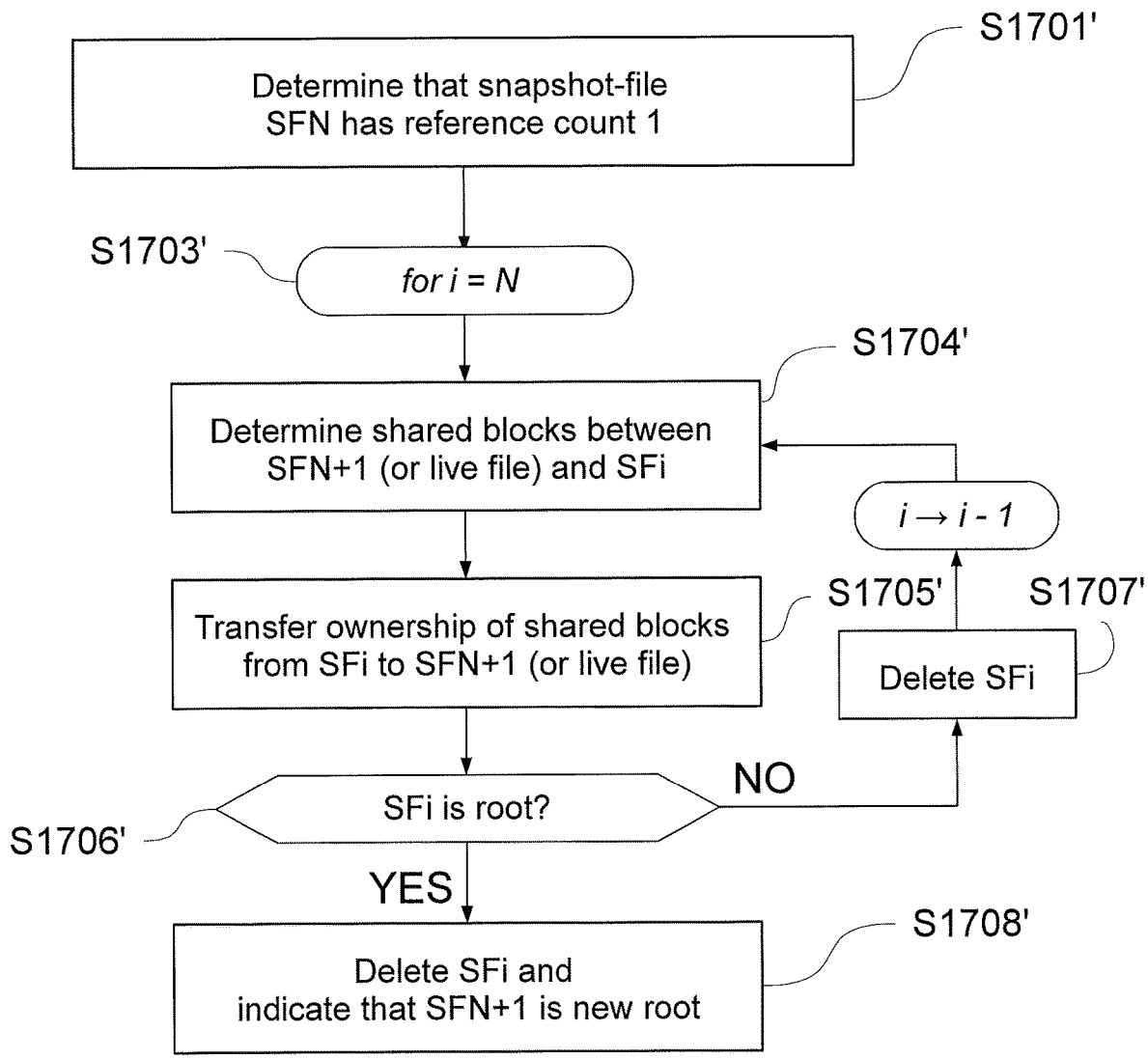
FIG. 17C exemplarily illustrates another exemplary logic flow diagram for removing a connected chain of snapshot-files in accordance with exemplary embodiments in accordance with exemplary embodiments.
Figure 21B:
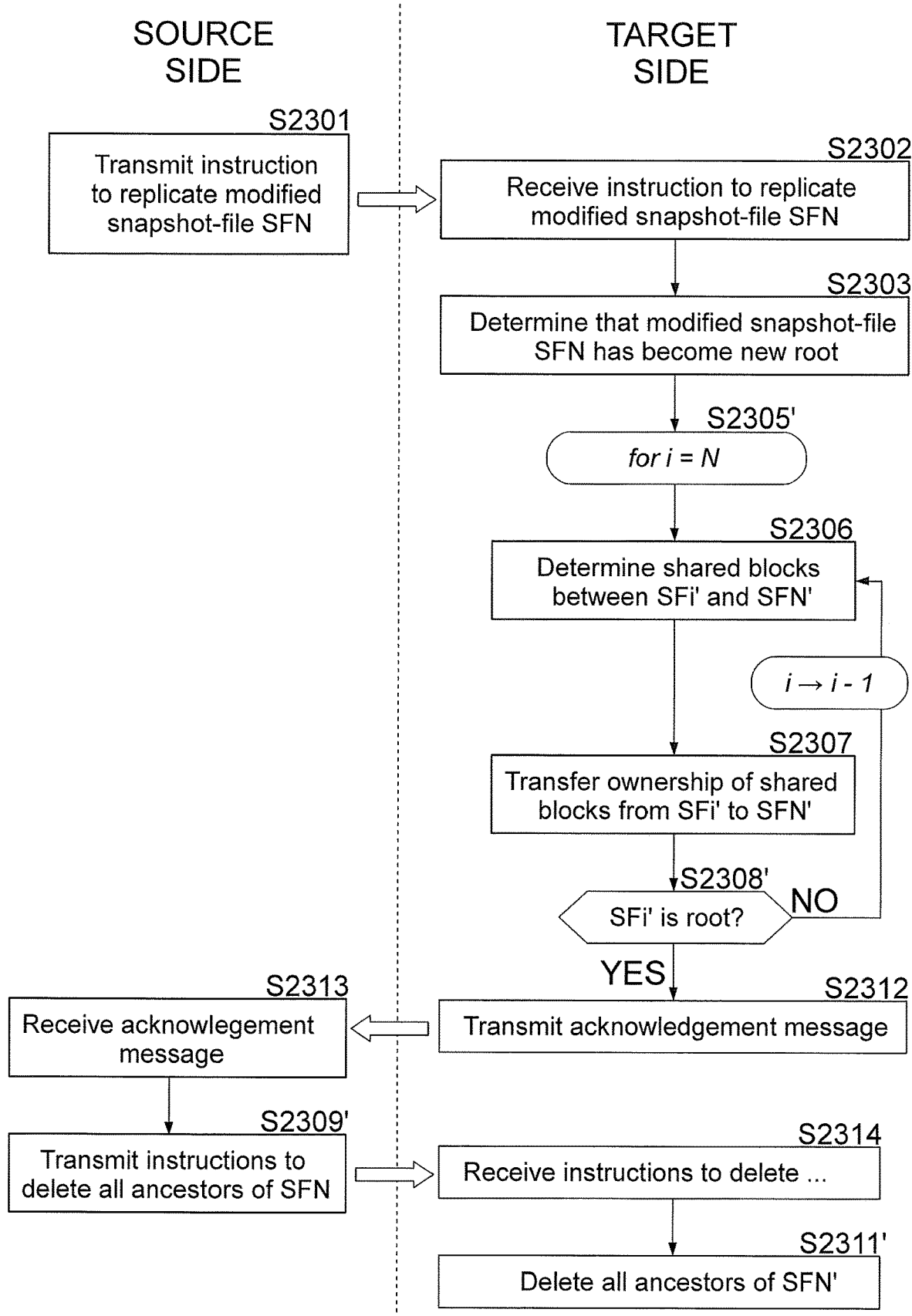
FIG. 21B is another exemplary logic flow diagram schematically showing replicating removing one or more snapshot-file (in particular a connected chain of snapshot-files) at a target side in accordance with exemplary embodiments.

Of course, the steps may be modified according to the modifications of FIG. 19B compared to FIG. 19A (i.e. making the deletion of snapshot objects independent from the transfer of ownership processes), and/or according to the modifications of FIG. 17C compared to FIGS. 17A and 17B (i.e. introducing a while-root-not-reached loop). By doing both modifications, an algorithm as shown in the example of FIG. 21B may be provided.

Steps S2301 and S2302 correspond to steps S191 and S192 of FIG. 19A described above, and in the next step S2303, the target side determines that the source snapshot-file SFN, which has been modified since the last snapshot, has become the new root snapshot-file of the snapshot-file tree in the source file system in step S2303 and goes to i=N−1 in step S2305'.

Then the steps S2306 to S2307 are performed for SFi' similar to the process of FIG. 21A, and in the next step S2308' it is determined whether the snapshot file SFi' is the root snapshot file in the snapshot-file tree of the target file system (similar to step S1706' in FIG. 17C above).

If step S1706' returns NO, the process goes to i→i−1 and repeats steps S2306 to S2308' for the new i in the while-loop until step S2308' returns YES. Then, the target sends a message to the source confirming that the snapshot-file SFN has been replicated in a step S2312, wherein the message is received at the source in step S2313.

Upon receipt of the confirmation/acknowledgement message that the modified snapshot-file SFN has been replicated in the target file system, the method continues with step S2309 and sends the instructions to delete all snapshot-file ancestors of the snapshot-file SFN in the target file system.

Upon receipt of the instructions at the target side in step S2314, the target file system deletes all snapshot-file ancestors of the snapshot-file SFN' in the target file system.

9. FURTHER OPTIMIZATIONS

In further embodiments of the invention, there is provided a functionality to disable one or more of the above process functionalities, at the source side and/or at the target side in connection with replication of removing one or more snapshot-files, e.g. in order to be able to disable the additional processing in a first full replication (in which the source file system is fully replicated to the target side).

For example, additional processing on the source side in connection with the separate first and second scans may be disabled in a first full replication so that only one scan of the indirection object of the source file system is performed (and CREATE work item related instructions are created in connection with any object of the source file system). In addition, the additional processing on the target side may be disabled in cases in which no clones exist in the target file system, because then no de-cloned snapshot-files or changing/removing of parent snapshot-files may occur in the current replication session.

10. ASPECTS OF EXAMPLES AND EMBODIMENTS

According to an aspect of embodiments, there may be provided a computer program product comprising computer-readable program instructions which, when running on or loaded into a computer or when being executed by one or more processors of the computer, cause the computer to execute a method for replicating one or more file system objects from a source file system of a source side to a target file system of a target side in a data storage system.

The method in the above aspect may comprise: receiving, at the target side, a first instruction to replicate a first target snapshot-file of a target snapshot-file tree of the target file system, the first target snapshot-file of the target file system being preferably associated with a first source snapshot-file of the source file system which has been modified in the source file system; identifying, at the target side, one or more data blocks which are owned by a second target snapshot-file and which are shared between the first target snapshot-file and the second target snapshot-file, the second target snapshot-file preferably being an ancestor of the first target snapshot-file in the target snapshot-file tree; and/or transferring ownership, at the target side, of the one or more identified data blocks from the second target snapshot-file to the first target snapshot-file.

In some embodiments, the method may further comprise: receiving, at the target side, a second instruction to replicate the second target snapshot-file of the target snapshot-file tree of the target file system, the second target snapshot-file of the target file system being preferably associated with a second source snapshot-file of the source file system which has been deleted in the source file system; and/or deleting, at the target side, the second target snapshot-file after executing the transfer of ownership of the one or more identified data blocks from the second target snapshot-file to the first target snapshot-file.

In some embodiments, the second instruction may preferably be received after receiving the first instruction.

In some embodiments, the method may further comprise: performing, at the source side, a first source file system scan for identifying one or more source file system objects having changed in the source file system; identifying, at the source side and among the identified one or more changed source file system objects, one or more source snapshot-files which have been modified in the source file system; creating, at the source side and for each of the identified one or more source snapshot-files, a respective first instruction to replicate a respective associated target snapshot-file in the target file system; and/or transmitting the one or more created first instructions to the target side, including transmitting the first instruction to replicate the first target snapshot-file of the target snapshot-file tree of the target file system.

In some embodiments, the method may further comprise: performing, at the source side, a second source file system scan (first scan) for identifying, at the source side and among the identified one or more changed source file system objects, one or more changed second source file system objects other than the source snapshot-files which have been modified in the source file system; creating, at the source side and for each of the identified one or more changed second source file system objects, a second instruction to replicate a respective associated target file system object in the target file system; and/or transmitting the one or more created second instructions to the target side after transmitting the one or more created first instructions to the target side.

In some of the above embodiments, transmitting the one or more created second instructions to the target side may include transmitting the second instruction to replicate the second target snapshot-file of the target snapshot-file tree of the target file system.

In some of the above embodiments, the identified one or more changed second source file system objects other than the source snapshot-files, which have been modified in the source file system, may comprise one or more source snapshot-files, which have been deleted in the source file system, and/or one or more source snapshot-files, which have been created in the source file system.

In some of the above embodiments, the method may further comprise: transferring ownership, at the source side, of one or more data blocks from one or more ancestor source snapshot-files in the snapshot-file tree of the source file system, preferably including a parent snapshot-file of the first source snapshot-file, to the first source snapshot-file, and/or deleting the one or more ancestor source snapshot-files in the snapshot-file tree of the source file system; and/or adding a data entry into a log memory portion, the data entry being preferably associated with the first source snapshot-file and indicating that the one or more ancestor source snapshot-files have been removed for the first source snapshot-file; wherein the first source file system scan is preferably performed on the basis of entries of the log memory portion, and/or the first instruction to replicate the first target snapshot-file of the target snapshot-file tree of the target file system is preferably created on the basis of the data entry being associated with the first source snapshot-file.

In some embodiments, the method may further comprise: identifying, at the target side, one or more data blocks which are owned by a third target snapshot-file and which are shared between the first target snapshot-file and the third target snapshot-file, the second target snapshot-file being preferably a parent of the first target snapshot-file in the target snapshot-file tree and the third target snapshot-file being preferably a parent of the second target snapshot-file in the target snapshot-file tree; and/or transferring ownership, at the target side, of the one or more identified data blocks from the third target snapshot-file to the first target snapshot-file.

In some of the above embodiments, the method may further comprise: receiving, at the target side, a second instruction to replicate the third target snapshot-file of the target snapshot-file tree of the target file system, the third target snapshot-file of the target file system being preferably associated with a third source snapshot-file of the source file system which has been deleted in the source file system; and/or deleting, at the target side, the third target snapshot-file after executing the transfer of ownership of the one or more identified data blocks from the third target snapshot-file to the first target snapshot-file.

In some of the above embodiments, transferring ownership, at the target side, of the one or more identified data blocks from the third target snapshot-file to the first target snapshot-file is preferably executed in parallel with transferring ownership of the one or more identified data blocks from the second target snapshot-file to the first target snapshot-file.

In some of the above embodiments, the method may further comprise: identifying, at the target side and for each target snapshot-file being an ancestor of the first target snapshot-file in the target snapshot-file tree, one or more data blocks which are owned by the respective ancestor target snapshot-file and which are shared between the first target snapshot-file and the respective ancestor target snapshot-file; and/or transferring ownership, at the target side and for each target snapshot-file being an ancestor of the first target snapshot-file in the target snapshot-file tree, of the one or more identified data blocks from the respective ancestor target snapshot-file to the first target snapshot-file.

In some of the above embodiments, the method may further comprise: receiving, at the target side, second instructions to replicate each target snapshot-file being an ancestor of the first target snapshot-file in the target snapshot-file tree, each of the ancestor target snapshot-files of the target file system being preferably associated with a respective source snapshot-file of the source file system which has been deleted in the source file system; and/or deleting, at the target side, the respective ancestor target snapshot-files preferably after executing the transfers of ownership of the one or more identified data blocks from the respective ancestor target snapshot-files to the first target snapshot-file.

In some of the above embodiments, transferring ownership, at the target side, of the one or more identified data blocks from the respective ancestor target snapshot-files to the first target snapshot-file are preferably executed in parallel.

In some embodiments or independent aspects (e.g. independent of replication), each snapshot-file (e.g. of the target system) is preferably associated with a first-type checkpoint number and each pointer of each snapshot-file (e.g. of the target system) to one data block is associated with a second-type checkpoint number, wherein, among all data blocks pointed to by pointers of a respective snapshot-file, a respective data block is preferably indicated to be owned by the respective snapshot-file if the respective second-type checkpoint number associated with the respective data block is equal to or larger than the respective first-type checkpoint number associated with the respective snapshot-file.

In some embodiments or independent aspects (e.g. independent of replication), transferring ownership of data blocks from an ancestor (target) snapshot-file to the first (target) snapshot-file preferably comprises: (1) setting the first-type checkpoint number associated with the respective ancestor (target) snapshot-file equal to or larger than the first-type checkpoint number associated with the first (target) snapshot-file; (2) setting the first-type checkpoint number associated with the first (target) snapshot-file equal to or smaller than the first-type checkpoint number associated with the respective ancestor (target) snapshot-file (before it was re-set as above in step (1), i.e. equal to or smaller than the previous first-type checkpoint number that was previously associated with the respective ancestor (target) snapshot-file); and/or (3) setting, among the data blocks (previously) owned by the respective ancestor (target) snapshot-file, the second-type checkpoint numbers of all data blocks that are unshared between the respective ancestor (target) snapshot-file and the first (target) snapshot-file to equal to or larger than the newly set first-type checkpoint number associated with the respective ancestor (target) snapshot-file.

For example, transferring ownership of data blocks from an ancestor (target) snapshot-file to the first (target) snapshot-file preferably comprises: (1) setting the first-type checkpoint number associated with the respective ancestor (target) snapshot-file equal to the first-type checkpoint number associated with the first (target) snapshot-file; (2) setting the first-type checkpoint number associated with the first (target) snapshot-file equal to the first-type checkpoint number associated with the respective ancestor (target) snapshot-file (before it was re-set as above in step (1), i.e. equal to the previous first-type checkpoint number that was previously associated with the respective ancestor (target) snapshot-file); and/or (3) setting, among the data blocks (previously) owned by the respective ancestor (target) snapshot-file, the second-type checkpoint numbers of all data blocks that are unshared between the respective ancestor (target) snapshot-file and the first (target) snapshot-file to equal to or larger than the previous first-type checkpoint number associated with the first (target) snapshot-file.

In some of the above embodiments or independent aspects, if transfer of ownership of data blocks to the first target snapshot-file is executed for plural ancestor target snapshot-files, the first-type checkpoint number associated with the first target snapshot-file is preferably set to equal to the smallest first-type checkpoint number among the first-type checkpoint numbers associated with the plural ancestor target snapshot-files.

In some of the above embodiments or independent aspects, deleting the respective target snapshot-file preferably includes freeing all data blocks that are, after executing transfer of ownership to the first target snapshot-file, still owned by the respective deleted target snapshot-file.

In some embodiments, the method preferably may comprise: determining, based on a comparison of the received first instruction and metadata stored for the first target snapshot-file, that one or more ancestor snapshot-files of the first source snapshot-file have been removed in the source snapshot-file tree of the source file system; wherein identifying one or more data blocks which are owned by a second target snapshot-file and which are shared between the first target snapshot-file and the second target snapshot-file, and/or transferring ownership of the one or more identified data blocks from the second target snapshot-file to the first target snapshot-file is preferably performed after determining that one or more ancestor snapshot-files of the first source snapshot-file have been removed in the source snapshot-file tree of the source file system.

According to an independent aspect, independent of all of the aspects and embodiments mentioned above or also being combined with one or more of the above aspects, there may be provided a computer program product comprising computer-readable program instructions which, when running on or loaded into a computer or when being executed by one or more processors of the computer, cause the computer to execute a method for replicating one or more file system objects from a source file system of a source side to a target file system of a target side in a data storage system, the method comprising performing, at the source side, a first source file system scan (first scan) for identifying one or more source file system objects having changed in the source file system; identifying, at the source side and among the identified one or more changed source file system objects, one or more source snapshot-files which have been modified in the source file system; creating, at the source side and for each of the identified one or more source snapshot-files, a respective first instruction to replicate a respective associated target snapshot-file in the target file system; transmitting the one or more created first instructions to the target side; performing, at the source side, a second source file system scan (second scan) for identifying, at the source side and among the identified one or more changed source file system objects, one or more changed second source file system objects other than the source snapshot-files which have been modified in the source file system; creating, at the source side and for each of the identified one or more changed second source file system objects, a second instruction to replicate a respective associated target file system object in the target file system; and/or transmitting the one or more created second instructions to the target side after transmitting the one or more created first instructions to the target side.

According to an independent aspect, independent of all of the aspects and embodiments mentioned above or also being combined with one or more of the above aspects, there may be provided a method for replicating one or more file system objects from a source file system of a source side to a target file system of a target side in a data storage system, the method comprising: receiving, at the target side, a first instruction to replicate a first target snapshot-file of a target snapshot-file tree of the target file system, the first target snapshot-file of the target file system being associated with a first source snapshot-file of the source file system which has been modified in the source file system; identifying, at the target side, one or more data blocks which are owned by a second target snapshot-file and which are shared between the first target snapshot-file and the second target snapshot-file, the second target snapshot-file being an ancestor of the first target snapshot-file in the target snapshot-file tree; and/or transferring ownership, at the target side, of the one or more identified data blocks from the second target snapshot-file to the first target snapshot-file.

According to an independent aspect, independent of all of the aspects and embodiments mentioned above or also being combined with one or more of the above aspects, there may be provided method for replicating one or more file system objects from a source file system of a source side to a target file system of a target side in a data storage system, the method comprising: performing, at the source side, a first source file system scan for identifying one or more source file system objects having changed in the source file system; identifying, at the source side and among the identified one or more changed source file system objects, one or more source snapshot-files which have been modified in the source file system; creating, at the source side and for each of the identified one or more source snapshot-files, a respective first instruction to replicate a respective associated target snapshot-file in the target file system; transmitting the one or more created first instructions to the target side; performing, at the source side, a second source file system scan for identifying, at the source side and among the identified one or more changed source file system objects, one or more changed second source file system objects other than the source snapshot-files which have been modified in the source file system; creating, at the source side and for each of the identified one or more changed second source file system objects, a second instruction to replicate a respective associated target file system object in the target file system; and/or transmitting the one or more created second instructions to the target side after transmitting the one or more created first instructions to the target side.

According to an independent aspect, independent of all of the aspects and embodiments mentioned above or also being combined with one or more of the above aspects, there may be provided a method including identifying, in a file system, one or more data blocks which are owned by a second snapshot-file and which are shared between a first snapshot-file (or a file/clone) and the second snapshot-file, the second snapshot-file being an ancestor of the first snapshot-file (or of the file/clone) in the snapshot-file tree of the file system; and/or transferring ownership, in the file system, of the one or more identified data blocks from the second snapshot-file to the first snapshot-file (or to the file/clone). Thereafter, the method may comprise deleting the second snapshot-file and/or deleting metadata of the second snapshot-file.

According to an independent aspect, independent of all of the aspects and embodiments mentioned above or also being combined with one or more of the above aspects, there may be provided a storage system configured to manage a source file system at a source side and a target file system at a target side, the data storage system being configured to execute replication of one or more file system objects from the source file system to the target file system and/or the data storage system comprising a first file server configured to manage the target file system and/or a second file server configured to manage the source file system. The first file server may be configured to execute: receiving, from the second file server, a first instruction to replicate a first target snapshot-file of a target snapshot-file tree of the target file system, the first target snapshot-file of the target file system being associated with a first source snapshot-file of the source file system which has been modified in the source file system, identifying one or more data blocks which are owned by a second target snapshot-file and which are shared between the first target snapshot-file and the second target snapshot-file, the second target snapshot-file being an ancestor of the first target snapshot-file in the target snapshot-file tree, and transferring ownership of the one or more identified data blocks from the second target snapshot-file to the first target snapshot-file. The second file server may be configured to manage the source file system, the second file server being preferably configured to execute: performing a first source file system scan for identifying one or more source file system objects having changed in the source file system, identifying, among the identified one or more changed source file system objects, one or more source snapshot-files which have been modified in the source file system, creating, for each of the identified one or more source snapshot-files, a respective first instruction to replicate a respective associated target snapshot-file in the target file system, transmitting, to the first file server, the one or more created first instructions, performing a second source file system scan for identifying, among the identified one or more changed source file system objects, one or more changed second source file system objects other than the source snapshot-files which have been modified in the source file system, creating, for each of the identified one or more changed second source file system objects, a second instruction to replicate a respective associated target file system object in the target file system, and/or transmitting, to the first file server, the one or more created second instructions after transmitting the one or more created first instructions to the first file server. Also, the above-mentioned first and second file servers may be provided independently from each other.

11. MISCELLANEOUS

It should be noted that headings are used above for convenience and readability of the detailed description and are not to be construed as limiting the present invention in any way.

As will be appreciated by one of skill in the art, the present invention, as described hereinabove and the accompanying figures, may be embodied as a method (e.g., a computer-implemented process, a business process, or any other process), apparatus (including a device, machine, system, computer program product, and/or any other apparatus), or a combination of the foregoing.

Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system" Furthermore, embodiments of the present invention may take the form of a computer program product on a computer-readable medium having computer-executable program code embodied in the medium.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions.

Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

Embodiments of the present invention are described hereinabove with reference to flowchart illustrations and/or block diagrams of methods and apparatuses, and with reference to a number of sample views of a graphical user interface generated by the methods and/or apparatuses. It will be understood that each block of the flowchart illustrations and/or block diagrams, and/or combinations of blocks in the flowchart illustrations and/or block diagrams, as well as the graphical user interface, can be implemented by computer-executable program code.

The computer-executable program code may be provided to a processor of a general purpose computer, special purpose computer, or other programmable data processing apparatus to produce a particular machine, such that the program code, which executes via the processor of the computer or other programmable data processing apparatus, create means for implementing the functions/acts/outputs specified in the flowchart, block diagram block or blocks, figures, and/or written description.

These computer-executable program code may also be stored in a computer-readable memory that can direct a computer or other programmable data processing apparatus to function in a particular manner, such that the program code stored in the computer readable memory produce an article of manufacture including instruction means which implement the function/act/output specified in the flowchart, block diagram block(s), figures, and/or written description.

The computer-executable program code may also be loaded onto a computer or other programmable data processing apparatus to cause a series of operational steps to be performed on the computer or other programmable apparatus to produce a computer-implemented process such that the program code which executes on the computer or other programmable apparatus provides steps for implementing the functions/acts/outputs specified in the flowchart, block diagram block(s), figures, and/or written description. Alternatively, computer program implemented steps or acts may be combined with operator or human implemented steps or acts in order to carry out an embodiment of the invention.

It should be noted that terms such as "server" and "processor" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions.

Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium.

Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message.

Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention.

Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator).

Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code maybe converted (e.g., via a translator, assembler, or compiler) into a computer executable form.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Computer program logic implementing all or part of the functionality previously described herein may be executed at different times on a single processor (e.g., concurrently) or may be executed at the same or different times on multiple processors and may run under a single operating system process/thread or under different operating system processes/threads.

Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies.

The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Any suitable computer readable medium may be utilized. The computer readable medium may be, for example but not limited to, an electronic, magnetic, optical, electromagnetic, infrared, or semiconductor system, apparatus, device, or medium.

More specific examples of the computer readable medium include, but are not limited to, an electrical connection having one or more wires or other tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device.

The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies.

The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

While certain exemplary embodiments have been described and shown in the accompanying drawings, it is to be understood that such embodiments are merely illustrative of and are not restrictive on the broad invention, and that the embodiments of invention are not limited to the specific constructions and arrangements shown and described, since various other changes, combinations, omissions, modifications and substitutions, in addition to those set forth in the above paragraphs, are possible.

Those skilled in the art will appreciate that various adaptations, modifications, and/or combination of the just described embodiments can be configured without departing from the scope and spirit of the invention. Therefore, it is to be understood that, within the scope of the appended claims, the invention may be practiced other than as specifically described herein. For example, unless expressly stated otherwise, the steps of processes described herein may be performed in orders different from those described herein and one or more steps may be combined, split, or performed simultaneously.

Those skilled in the art will also appreciate, in view of this disclosure, that different embodiments of the invention described herein may be combined to form other embodiments of the invention.

The invention claimed is:

1. A non-transitory computer-readable storage medium comprising computer-readable program instructions which, when running on or loaded into a computer or when being executed by one or more processors of the computer, cause the computer to execute a method for replicating one or more file system objects from a source file system of a source side to a target file system of a target side in a data storage system, the method comprising:
   receiving, at the target side, a first instruction to replicate a first target snapshot-file of a target snapshot-file tree of the target file system, the first target snapshot-file of the target file system being associated with a first source snapshot-file of the source file system which has been modified in the source file system;
   identifying, at the target side, one or more data blocks which are owned by a second target snapshot-file and which are shared between the first target snapshot-file and the second target snapshot-file, the second target snapshot-file being an ancestor of the first target snapshot-file in the target snapshot-file tree;
   transferring ownership, at the target side, of the one or more identified data blocks from the second target snapshot-file to the first target snapshot-file;
   receiving, at the target side, a second instruction to replicate deletion of a second source snapshot-file of the source file system which has been deleted in the source file system and being associated with the second target snapshot-file of the target snapshot-file tree of the target file system; and
   deleting, at the target side, the second target snapshot-file after executing the transfer of ownership of the one or more identified data blocks from the second target snapshot-file to the first target snapshot-file.

2. The non-transitory computer-readable storage medium according to claim 1, the method further comprising:
   performing, at the source side, a first source file system scan for identifying one or more source file system objects having changed in the source file system;
   identifying, at the source side and among the identified one or more changed source file system objects, one or more source snapshot-files which have been modified in the source file system;
   creating, at the source side and for each of the identified one or more source snapshot-files, a respective first instruction to replicate a respective associated target snapshot-file in the target file system; and
   transmitting the one or more created first instructions to the target side, including transmitting the first instruction to replicate the first target snapshot-file of the target snapshot-file tree of the target file system.

3. The non-transitory computer-readable storage medium according to claim 2, the method further comprising:
   performing, at the source side, a second source file system scan for identifying, at the source side and among the identified one or more changed source file system objects, one or more changed second source file system objects other than the source snapshot-files which have been modified in the source file system;
   creating, at the source side and for each of the identified one or more changed second source file system objects, a second instruction to replicate a respective associated target file system object in the target file system; and
   transmitting the one or more created second instructions to the target side after transmitting the one or more created first instructions to the target side.

4. The non-transitory computer-readable storage medium according to claim 1, wherein
   transmitting the one or more created second instructions to the target side includes transmitting the second instruction to replicate the deletion of a second source snapshot-file associated with the second target snapshot-file of the target snapshot-file tree of the target file system.

5. The non-transitory computer-readable storage medium according claim 2, the method further comprising:
   transferring ownership, at the source side, of one or more data blocks from one or more ancestor source snapshot-files in the snapshot-file tree of the source file system, including a parent snapshot-file of the first source snapshot-file, to the first source snapshot-file, and deleting the one or more ancestor source snapshot-files in the snapshot-file tree of the source file system; and
   adding a data entry into a log memory portion, the data entry being associated with the first source snapshot-file and indicating that the one or more ancestor source snapshot-files have been removed for the first source snapshot-file;
   wherein the first source file system scan is performed on the basis of entries of the log memory portion, and the first instruction to replicate the first target snapshot-file of the target snapshot-file tree of the target file system is created on the basis of the data entry being associated with the first source snapshot-file.

6. The non-transitory computer-readable storage medium according to claim 1, the method further comprising:
   identifying, at the target side, one or more data blocks which are owned by a third target snapshot-file and which are shared between the first target snapshot-file and the third target snapshot-file, the second target snapshot-file being a parent of the first target snapshot-file in the target snapshot-file tree and the third target snapshot-file being a parent of the second target snapshot-file in the target snapshot-file tree; and
   transferring ownership, at the target side, of the one or more identified data blocks from the third target snapshot-file to the first target snapshot-file.

7. The non-transitory computer-readable storage medium according to claim 6, the method further comprising:
   receiving, at the target side, a second instruction to replicate the third target snapshot-file of the target snapshot-file tree of the target file system, the third target snapshot-file of the target file system being associated with a third source snapshot-file of the source file system which has been deleted in the source file system; and deleting, at the target side, the third target snapshot-file after executing the transfer of ownership of the one or more identified data blocks from the third target snapshot-file to the first target snapshot-file.

8. The non-transitory computer-readable storage medium according to claim 6, wherein
transferring ownership, at the target side, of the one or more identified data blocks from the third target snapshot-file to the first target snapshot-file is executed in parallel with transferring ownership of the one or more identified data blocks from the second target snapshot-file to the first target snapshot-file.

9. The non-transitory computer-readable storage medium according to claim 1, the method further comprising:
identifying, at the target side and for each target snapshot-file being an ancestor of the first target snapshot-file in the target snapshot-file tree, one or more data blocks which are owned by the respective ancestor target snapshot-file and which are shared between the first target snapshot-file and the respective ancestor target snapshot-file; and
transferring ownership, at the target side and for each target snapshot-file being an ancestor of the first target snapshot-file in the target snapshot-file tree, of the one or more identified data blocks from the respective ancestor target snapshot-file to the first target snapshot-file.

10. The non-transitory computer-readable storage medium according to claim 9, the method further comprising:
receiving, at the target side, second instructions to replicate each target snapshot-file being an ancestor of the first target snapshot-file in the target snapshot-file tree, each of the ancestor target snapshot-files of the target file system being associated with a respective source snapshot-file of the source file system which has been deleted in the source file system; and
deleting, at the target side, the respective ancestor target snapshot-files after executing the transfers of ownership of the one or more identified data blocks from the respective ancestor target snapshot-files to the first target snapshot-file.

11. The non-transitory computer-readable storage medium according to claim 9, wherein
transferring ownership, at the target side, of the one or more identified data blocks from the respective ancestor target snapshot-files to the first target snapshot-file are executed in parallel.

12. The non-transitory computer-readable storage medium according to claim 1, wherein
each snapshot-file of the target system is associated with a first-type checkpoint number and each pointer of each snapshot-file of the target system to one data block is associated with a second-type checkpoint number,
wherein, among all data blocks pointed to by pointers of a respective snapshot-file, a respective data block is indicated to be owned by the respective snapshot-file when the respective second-type checkpoint number associated with the respective data block is equal to or larger than the respective first-type checkpoint number associated with the respective snapshot-file; and
wherein transferring ownership of data blocks from an ancestor target snapshot-file to the first target snapshot-file comprises:
setting the first-type checkpoint number associated with the respective ancestor target snapshot-file equal to or larger than the first-type checkpoint number associated with the first target snapshot-file,
setting the first-type checkpoint number associated with the first target snapshot-file equal to or smaller than the first-type checkpoint number previously associated with the respective ancestor target snapshot-file, and
setting the second-type checkpoint numbers of all data blocks that are unshared between the respective ancestor target snapshot-file and the first target snapshot-file equal to or larger than the newly set first-type checkpoint number associated with the respective ancestor target snapshot-file.

13. The non-transitory computer-readable storage medium according to claim 12, wherein,
when transfer of ownership of data blocks to the first target snapshot-file is executed for plural ancestor target snapshot-files, the first-type checkpoint number associated with the first target snapshot-file is set to equal to the smallest first-type checkpoint number among the first-type checkpoint numbers associated with the plural ancestor target snapshot-files.

14. The non-transitory computer-readable storage medium according to claim 1, the method further comprising:
determining, based on a comparison of the received first instruction and metadata stored for the first target snapshot-file, that one or more ancestor snapshot-files of the first source snapshot-file have been removed in the source snapshot-file tree of the source file system; wherein
identifying one or more data blocks which are owned by a second target snapshot-file and which are shared between the first target snapshot-file and the second target snapshot-file, and transferring ownership of the one or more identified data blocks from the second target snapshot-file to the first target snapshot-file is performed after determining that one or more ancestor snapshot-files of the first source snapshot-file have been removed in the source snapshot-file tree of the source file system.

15. A data storage system including at least one processor and a memory and configured to manage a source file system at a source side and a target file system at a target side, the data storage system being configured to execute replication of one or more file system objects from the source file system to the target file system, the data storage system comprising:
a first file server configured to manage the target file system, the first file server being configured to execute:
receiving a first instruction to replicate a first target snapshot-file of a target snapshot-file tree of the target file system, the first target snapshot-file of the target file system being associated with a first source snapshot-file of the source file system which has been modified in the source file system,
identifying one or more data blocks which are owned by a second target snapshot-file and which are shared between the first target snapshot-file and the second target snapshot-file, the second target snapshot-file being an ancestor of the first target snapshot-file in the target snapshot-file tree,
transferring ownership of the one or more identified data blocks from the second target snapshot-file to the first target snapshot-file,
receiving a second instruction to replicate deletion of a second source snapshot-file of the source file system which has been deleted in the source file system and being associated with the second target snapshot-file of the target snapshot-file tree of the target file system; and deleting the second target snapshot-file after executing the transfer of ownership of the one or more identified data blocks from the second target snapshot-file to the first target snapshot-file.

* * * * *